(12) United States Patent
Hayashi et al.

(10) Patent No.: US 11,112,958 B2
(45) Date of Patent: Sep. 7, 2021

(54) INFORMATION PROCESSING SYSTEM, SERVICE PROVIDING SYSTEM, AND FLOW SETTING METHOD

(71) Applicants: Yuuichiroh Hayashi, Kanagawa (JP); Naritake Kondoh, Kanagawa (JP); Yusuke Yoshioka, Kanagawa (JP)

(72) Inventors: Yuuichiroh Hayashi, Kanagawa (JP); Naritake Kondoh, Kanagawa (JP); Yusuke Yoshioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 16/540,460

(22) Filed: Aug. 14, 2019

(65) Prior Publication Data

US 2020/0097162 A1     Mar. 26, 2020

(30) Foreign Application Priority Data

Sep. 26, 2018 (JP) .............................. JP2018-181063

(51) Int. Cl.
*G06Q 10/06* (2012.01)
*G06F 3/0484* (2013.01)
*G06F 3/14* (2006.01)
*H04N 1/00* (2006.01)
*G06F 3/0482* (2013.01)

(52) U.S. Cl.
CPC ........ *G06F 3/04847* (2013.01); *G06F 3/0482* (2013.01); *G06F 3/14* (2013.01); *G06Q 10/06* (2013.01); *H04N 1/00408* (2013.01); *H04N 1/00477* (2013.01); *G06F 2203/04803* (2013.01)

(58) Field of Classification Search
CPC ...... G06F 3/04847; G06F 3/0482; G06F 3/14; G06F 2203/04803; H04N 1/00408; H04N 1/00477; G06Q 10/06
See application file for complete search history.

(56) References Cited

U.S. PATENT DOCUMENTS 6,624,908 B1 * 9/2003 Petchenkine .......... G06Q 10/06
                                                       358/1.15
8,610,909 B2 * 12/2013 Miyata .................. G06F 3/1275
                                                       358/1.13

(Continued)

FOREIGN PATENT DOCUMENTS

JP         2015-139076         7/2015

*Primary Examiner* — Beau D Spratt
(74) *Attorney, Agent, or Firm* — IPUSA, PLLC

(57) ABSTRACT

An information processing system including an information processing apparatus and a service providing system mutually communicating through a network, wherein the information processing apparatus includes a display process unit to cause a screen of a display device to display a process flow that defines an execution order of processes executed by the service providing system, and a setup reception unit to receive a setup, in which predetermined processes related to first and second external services are associated, and the display process unit displays the processes to be executed in the execution order, and an issue that the setup reception unit has received the predetermined processes related to the first and second external services in association with each other, the service providing system includes a process flow execution unit to execute the processes included in the process flow transmitted from the information processing apparatus in the defined execution order.

12 Claims, 44 Drawing Sheets

(56) References Cited

U.S. PATENT DOCUMENTS

| | | |
|---|---|---|
| 8,760,729 B2 | 6/2014 | Oseto et al. |
| 9,160,867 B2 | 10/2015 | Yamano et al. |
| 9,164,710 B2 | 10/2015 | Kondoh et al. |
| 9,189,187 B2 | 11/2015 | Naitoh et al. |
| 9,207,897 B2 | 12/2015 | Takatsu et al. |
| 9,286,008 B2 | 3/2016 | Kondoh |
| 9,317,396 B2 | 4/2016 | Honda et al. |
| 9,348,994 B2 | 5/2016 | Kondoh |
| 9,360,941 B2 | 6/2016 | Hayashi et al. |
| 9,430,637 B2 | 8/2016 | Suzuki et al. |
| 9,904,499 B2 | 2/2018 | Namihira et al. |
| 10,003,703 B2 | 6/2018 | Kondoh |
| 10,114,940 B2 | 10/2018 | Sugimura et al. |
| 10,120,758 B2 | 11/2018 | Hayashi et al. |
| 10,136,017 B2 | 11/2018 | Hayashi et al. |
| 10,250,771 B2 | 4/2019 | Hayashi |
| 10,275,417 B2 | 4/2019 | Ikejima |
| 10,356,266 B2 | 7/2019 | Hayashi et al. |
| 10,372,485 B2 | 8/2019 | Namihira et al. |
| 2007/0055557 A1* | 3/2007 | Kloppmann ............ G06Q 10/06 707/781 |
| 2009/0235344 A1 | 9/2009 | Ohzaki et al. |
| 2010/0070753 A1* | 3/2010 | Kido .................. H04L 63/0428 713/150 |
| 2011/0185315 A1* | 7/2011 | Armour .................... G06F 8/34 715/853 |
| 2015/0370847 A1 | 12/2015 | Kondoh et al. |
| 2016/0117340 A1 | 4/2016 | Hayashi |
| 2016/0364211 A1* | 12/2016 | Chau ........................ G06F 8/20 |
| 2017/0083697 A1 | 3/2017 | Hayashi et al. |
| 2017/0168765 A1* | 6/2017 | Fan ....................... G06F 3/1287 |
| 2017/0255486 A1 | 9/2017 | Zhang et al. |
| 2017/0255495 A1 | 9/2017 | Sakanashi et al. |
| 2018/0060131 A1 | 3/2018 | Namihira et al. |
| 2018/0121646 A1 | 5/2018 | Sakanashi et al. |
| 2018/0285163 A1 | 10/2018 | Sakanashi et al. |
| 2018/0343352 A1 | 11/2018 | Hayashi et al. |
| 2019/0098153 A1 | 3/2019 | Hayashi |

* cited by examiner

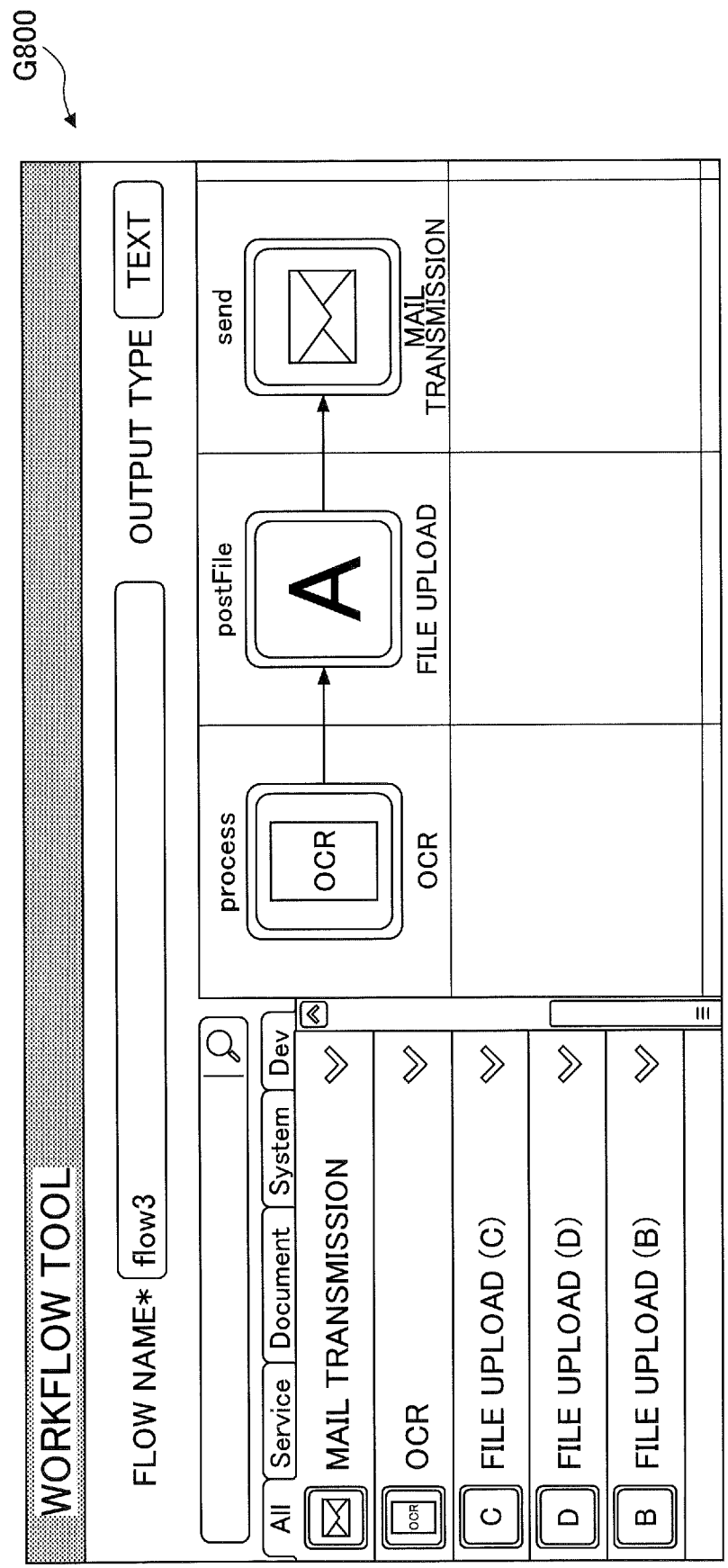

FIG.7

| DATA TYPE BEFORE CONVERSION | DATA TYPE AFTER CONVERSION | TYPE CONVERSION TO BE GENERATED | 4000 |
|---|---|---|---|
| InputStream | LocalFilePath | FIRST TYPE CONVERSION | |
| LocalFilePath | File | SECOND TYPE CONVERSION | |
| ... | ... | ... | |

FIG.8

```
                                                          1100
┌─────────────────────────────────────────────────────────────┐
│  "flowName" : "translate-mail",  ─1101        ─1102         │
│  "flowDetails" : [                                          │
│    ┌───────────────────────────────────────────┐            │
│    │ {                                         │            │
│    │   "detailName" : "detail0",               │            │
│    │   "component" : "ocr",                    │  ─1110     │
│    │   "parameters" : {                        │            │
│    │     "language" : "",                      │            │
│    │        ...                                │            │
│    │   }                                       │            │
│    │ },                                        │            │
│    └───────────────────────────────────────────┘            │
│    ┌───────────────────────────────────────────┐            │
│    │ {                                         │            │
│    │   "detailName" : "detail1",               │            │
│    │   "component" : "translation",            │            │
│    │   "parameters" : {                        │  ─1120     │
│    │     "from" : "",                          │            │
│    │     "to" : ""                             │            │
│    │        ...                                │            │
│    │   }                                       │            │
│    │ },                                        │            │
│    └───────────────────────────────────────────┘            │
│    ┌───────────────────────────────────────────┐            │
│    │ {                                         │            │
│    │   "detailName" : "detail2",               │            │
│    │   "component" : "mail",                   │            │
│    │   "parameters" : {                        │  ─1130     │
│    │     "address" : "",                       │            │
│    │        ...                                │            │
│    │   }                                       │            │
│    │ }                                         │            │
│    └───────────────────────────────────────────┘            │
│  ]                                                          │
└─────────────────────────────────────────────────────────────┘
```

APPLICATION REGISTRATION — G300

| TYPE SELECTION | BASIC SETUP | DETAILED SETUP | REGISTRATION |

PLEASE INPUT BASIC INFORMATION OF APPLICATION

TYPE: SCAN WORKFLOW

APP NAME: SCAN TRANSLATION APPLICATION — G310

DESIGN TEMPLATE: SINGLE SCREEN FORMAT — G320

AUTHEN-TICATION: NON — G330

DISPLAY LANGUAGE: English, Japanese — G340

English
Japanese
Chinese

RETURN    NEXT    REGISTER    CANCEL

APPLICATION REGISTRATION — G600

| TYPE SELECTION | BASIC SETUP | DETAILED SETUP | REGISTRATION |

PLEASE CHECK SET APPLICATION INFORMATION

```
Title: SCAN TRANSLATION APPLICATION
Description:
Target flow: translate-mail
Application view:
    parameters
    ...
```
— G610

RETURN    NEXT    REGISTER    CANCEL

```
"app_type" : "scan",                              }-1201
"appName" : "SCAN TRANSLATION APPLICATION",       }-1202
"appId" :"0123",                                  }-1202-2
"displayName" : {
  "Japanese" :"SCAN TRANSLATION",                                 }-1203
  "English" :"Translation App"
},
"loginType" : "none",                             }-1204
"flowName" : "translate-mail",                    }-1205
"viewTemplate" : "SINGLE SCREEN FORMAT",          }-1206
"defaultParameters" : [
  "detail0" : [
    "language" : "English",                                       }-1207
  ],
"userInputParameters" : [
  "detail1": [
    {
      "name" : "from"
      "displayName" :{
        "Japanese" : "PRE-TRANSLATION",           }-1218
        "English" : "Source Language"
      },
      "inputType" :"list-radio-button"
    },
    {
      "name" : "to"
      "displayName" :{
        "Japanese" : "POST-TRANSLATION",          }-1228
        "English" : "Target Language"
      },
      "inputType" :"list-radio-button"
    }
  ],
  "detail2" :[
    "name" : "address"
    "displayName" :{
      "Japanese" : "MAIL TRANSMISSION DESTINATION",   }-1238
      "English" : "Mail Recipient",
    },
    "inputType" :"text"
  ]
}
```

FIG.18

| COMPONENT ID | COMPONENT NAME | OPERATION | CATEGORY |
|---|---|---|---|
| CPNT001 | FILE DOWNLOAD (A) | postFile | Service |
| CPNT002 | FILE DOWNLOAD (B) | postFile | Service |
| CPNT003 | PDF CONVERSION | convert | Document |
| CPNT004 | mail | send | Service |

FIG.30A

```
"app_type" : "scan"                        ｝1301
"appName" : "SCAN MAIL APPLICATION"        ｝1302
"appID" : "0124"                           ｝1303
"app_kind" : "personal"                    ｝1304
 :
"common" : {
 "folderBrowsDefaultDisplay" : "XXX---",
 "folderBrowsDefaultLayout" : "XXX---",    ｝1305
}
"singleAppSetting" : {
 "storage" : "A",                          ｝1307
 "folderID" : "/project1",                        ｝1306
 :
```
1300

FIG.30B

```
"app_type" : "scan"                        ｝1301
"appName" : "SCAN MAIL APPLICATION"        ｝1302
"appID" : "0124"                           ｝1303
"app_kind" : "all"                         ｝1304
 :
"common" : {
 "folderBrowsDefaultDisplay" : "XXX---",
 "folderBrowsDefaultLayout" : "XXX---",    ｝1305
}
"singleAppSetting" : {
 "storage" : "A",                          ｝1307
 "folderID" : "/project1",
 "account" : "taro@sample.co.jp",          ｝1309     ｝1306
 :
```
1300

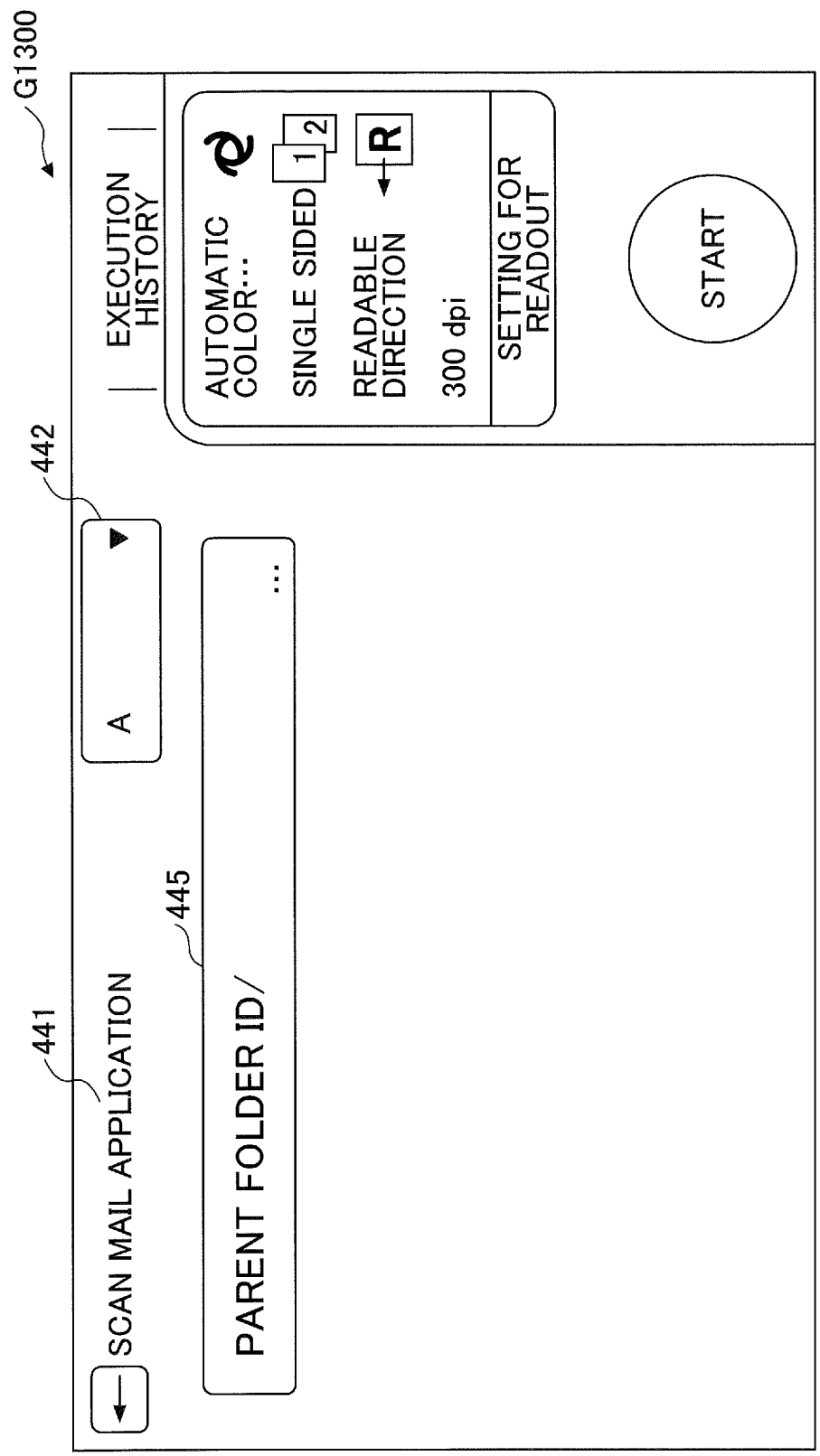

INFORMATION PROCESSING SYSTEM, SERVICE PROVIDING SYSTEM, AND FLOW SETTING METHOD

CROSS-REFERENCE TO RELATED APPLICATIONS

This application is based on and claims priority to Japanese Patent Application No. 2018-181063, filed on Sep. 26, 2018, the entire contents of which are incorporated herein by reference.

BACKGROUND OF THE INVENTION

1. Field of the Invention

The present invention relates to an information processing system, a service providing system, and a flow setting method.

2. Description of the Related Art

A service that provides a combination of multiple processes (e.g., scanning, printing, or mail delivery) is known. For example, a service in which an information processing device performs a predetermined process on an electronic file (image file) generated by a scan and delivers a mail is known.

Such services are substantialized by one or more processes that implement each function being performed as a series of processes and may be referred to as a workflow service.

In such a workflow service, a technique is known to assist the developer in developing a process flow (see, e.g., Patent Document 1). Patent Document 1 discloses a system in which multiple process flows can be executed in combination.

[Patent Document 1] Japanese Laid-Open Patent Publication No. 2015-139076

SUMMARY OF THE INVENTION

The present invention is intended to provide an information processing system that reduces the burden on the developer when creating a process flow, etc.

An information processing system includes an information processing apparatus and a service providing system communicating with the information processing apparatus through a network, wherein the information processing apparatus includes a display process unit configured to cause a screen of a display device to display a process flow that defines an execution order of executing a plurality of processes executed by the service providing system, and a setup reception unit configured to receive a setup, in which a predetermined process related to a first external service and a predetermined process related to the second external service are associated, on the screen displayed by the display process unit, and wherein the display process unit displays, on the screen, the plurality of processes to be executed in the execution order, and an issue that the setup reception unit has received the plurality of predetermined processes related to the first external service and the predetermined process related to the second external service in association with each other, wherein the service providing system includes a process flow execution unit configured to execute the plurality of processes included in the process flow transmitted from the information processing apparatus in the defined execution order.

BRIEF DESCRIPTION OF THE DRAWINGS

FIGS. 1A to 1C illustrate examples of a process flow setup screen displayed by a PC terminal operated by a developer;
FIG. 7 illustrates an example of a type conversion information table;
FIG. 8 illustrates an example of process flow information;
FIG. 11 illustrates an application registration screen (1/5).
FIG. 12 illustrates an application registration screen (2/5).
FIG. 15 illustrates an application registration screen (5/5).
FIG. 16 illustrates an example of application setup information;
FIG. 18 is an example of a diagram illustrating an attribute possessed by a component.
FIGS. 30A to 30C is examples of a diagram illustrating a portion of the app-related information with an extract.

FIGS. 36A and 36B illustrate examples of a component selection screen for accepting a selection of components displayed by the browser of the apparatus.

DETAILED DESCRIPTION OF THE PREFERRED EMBODIMENTS

In the technology disclosed in Patent Document 1, there was a problem that the burden on the developer when creating a process flow, etc. is increased.

For example, a process flow called "Scan to Storage & E-mail" may be created (by scanning an original manuscript, uploading it to file, and sending it by e-mail). Image files are sent to storage services, but there may be multiple types of storage services available. For example, there are a number of types of storage services, such as Dropbox ("Dropbox" is a registered trademark)/Box ("Box" is a registered trademark)/Onedrive ("Onedrive" is a registered trademark). In the following, these different external storage services are represented by "external storage service + alphabet". In the figure, external storage services are represented by upper-case letters "A" to "F", etc.

In this case, the developer must create a process flow for each storage service with similar processing contents.

A. "Scan to Storage(Dropbox) & E-mail"

B. "Scan to Storage(Box) & E-mail"

Creating multiple process flows in this way not only adds to the developer's burden, but also doubles the maintenance burden. For example, when a developer edits an "E-mail" destination, it may be necessary to edit the destination for each process flow.

Hereinafter, as an example of the embodiment of the present invention, an information processing system and a flow setting method performed by the information processing system will be described with reference to FIGS. 1 to 37C.

Reference symbols typically designate as follows:
1: information processing system;
10: service providing system;
20: apparatus; and
210, 310: browser.

<Outline of Setting Process Flow>

In this embodiment, an information processing system that can create a process flow that includes multiple processes having similar processing contents rather than creating multiple process flows when there are multiple processes each having a similar processing content will be described. This reduces the developer's workload by allowing the developer to set multiple processes with similar processing contents within a single process flow. This "process" corresponds to a component to be described below. The process flow refers to a series of processes.

Figure 1B:
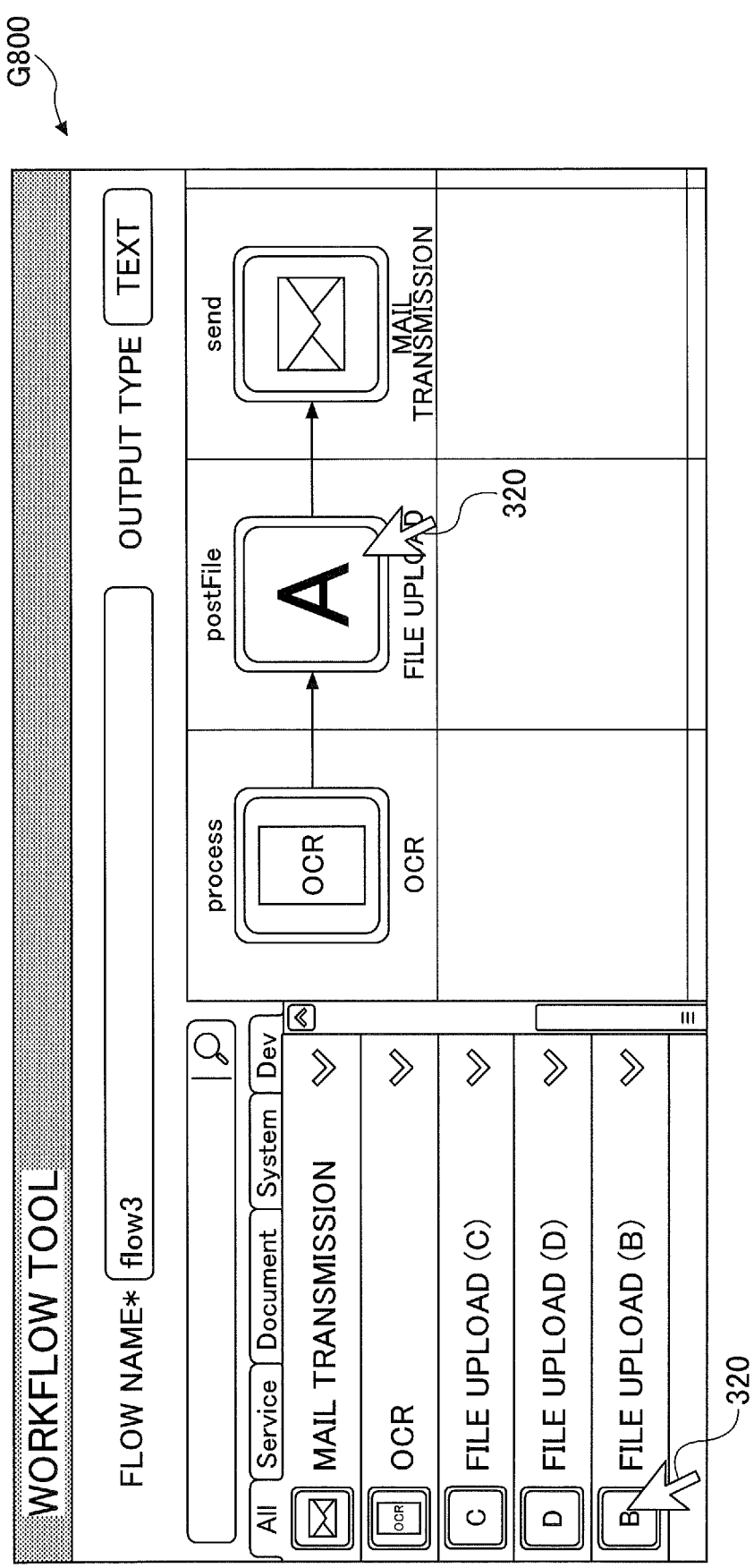
Figure 1C:
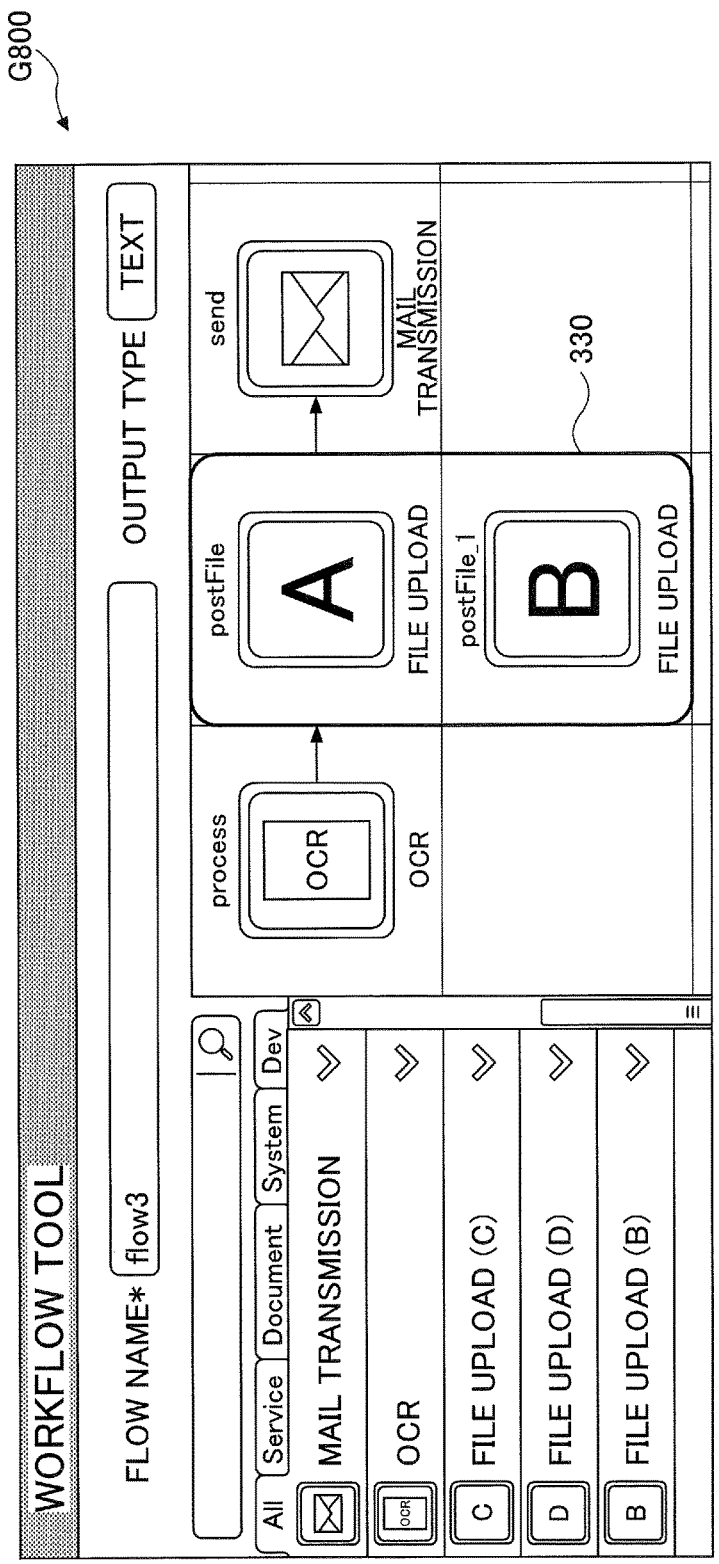

Referring to FIGS. 1A to 1C, an outline of setting a process flow by the developer is described. FIGS. 1A to 1C illustrate an example of a process flow setup screen G800 in which a PC (personal computer) terminal, etc. operated by the developer is displayed. The PC terminal executes a web application.

In FIG. 1A, the following process flows are registered in three icons that are arranged in a horizontal direction. One icon corresponds to one process and corresponds to the above component.

OCR→File upload (external storage service A)→Mail transmission

Described below is a case where the developer wishes to add a storage service other than the external storage service A (an example of the first external service) to the process flow. As illustrated in FIG. 1B, the developer selects a storage service icon "external storage service B (an example of a second external service)" from a list of processes using a pointing device 320, such as a mouse or touch panel. Next, a storage service called "external storage service A" is selected using the pointing device 320. These two operations using the pointing device 320 correspond to an operation of combining the two processes (file uploading for the storage services) together to one process flow.

The PC terminal receives this operation and combines the storage services of "external storage service A" and "external storage service B" into one. FIG. 1C illustrates an example of a screen in which the PC terminal combines two storage services. The file upload services of "external storage service A" and "external storage service B" are indicated so as to be enclosed in a frame 330.

In this frame 330,
(i) OCR;
(ii) File upload (external storage service A) and/or file upload (external storage service B); and
(iii) Mail transmission.

This means that the end user can execute the process flow selectively. As will be described below, the end user may select one or both of the storage services to be used in the process flow. When the "external storage service A" is selected as the storage service, an electronic file is uploaded to the "external storage service A" when the process flow is executed, and an electronic file is uploaded to the "external storage service B" when the "external storage service B" is selected as the storage service.

As described above, the information processing system according to this embodiment can combine multiple services having similar process contents into a single process flow so that the burden of the developer can be reduced.

<About Terminology>

A service providing system is one or more information processing apparatuses that execute a process flow in which multiple processes are combined.

A cloud service that executes processing on a cloud or an on-premise service that executes processing on a local network may be used. Both the cloud service and the on-premise service may be combined.

Multiple predetermined processes whose processing contents are similar are processes provided by different providers as services of similar kinds. The similar process may include the same process. A process that provides a target service for the end user may correspond to a predetermined process similar thereto. Multiple predetermined processes with similar processing contents, for example, the operations described below refer to the same components.

In this embodiment, the end user means a person who executes the process flow in his/her daily work. The developer is mainly a person who maintains the apparatus so that the end user can smoothly use the apparatus. For example, the developer refers to a customer engineer or solution sales person. The work by the end user may include an operation such that the apparatus is operated or the application is easily customized from the web page. The work by the developer may include registering process flows and applications through the web page, and knowledge of the program language is not required.

Displaying the fact that multiple predetermined processes are received means visually demonstrating that the two processes have been combined into the single process flow. For example, the combined processes may be visually surrounded by the frame 330 as described above.

<System Configuration>

Figure 2:
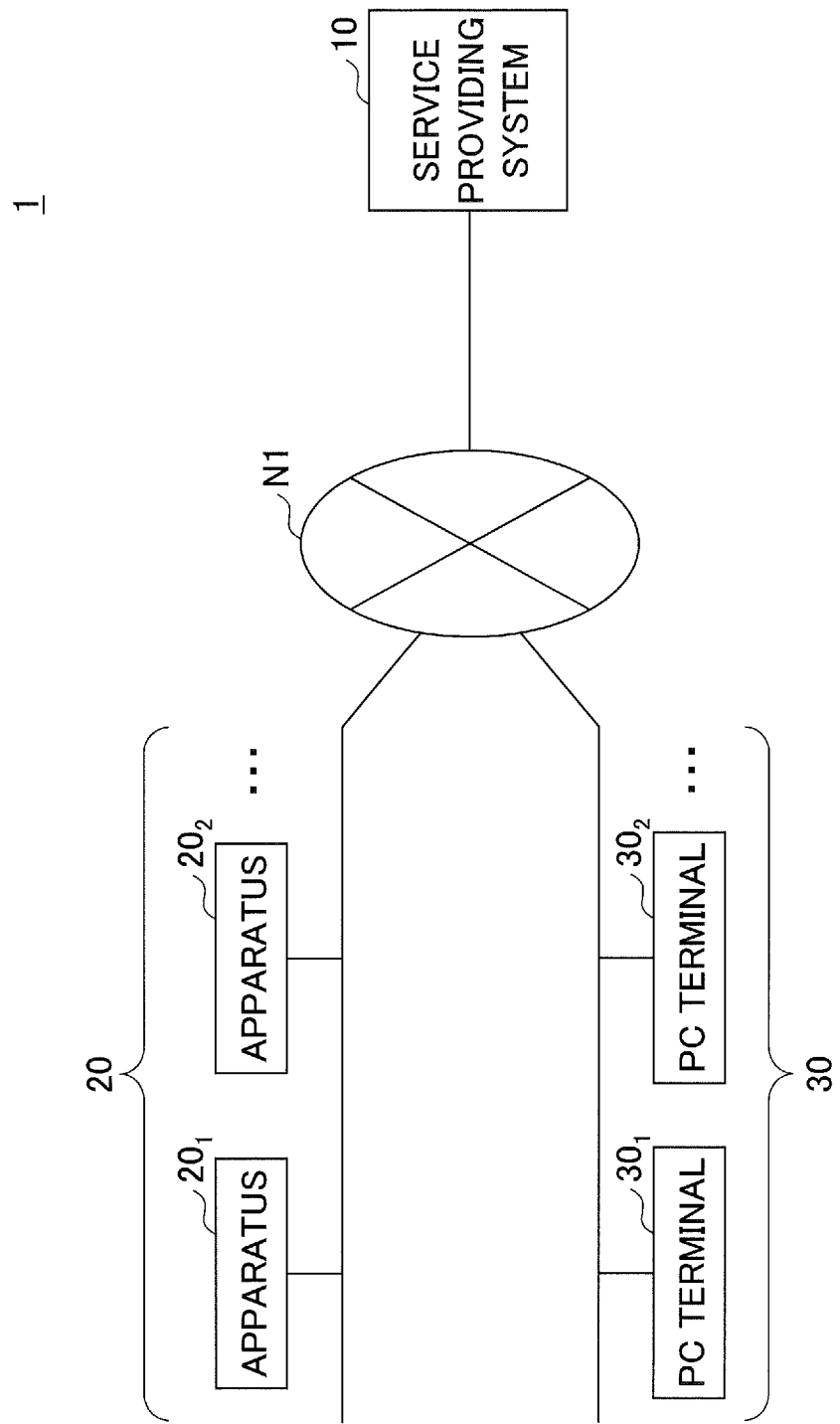
FIG. 2 illustrates a system configuration of an example of an information processing system.

The system configuration of the information processing system 1 according to this embodiment will be described with reference to FIG. 2. FIG. 2 illustrates a system configuration of an example of the information processing system 1 according to this embodiment.

The information processing system 1 illustrated in FIG. 2 includes a service providing system 10, an apparatus 20, and a PC terminal 30, and is communicatively connected via a wide-area network N1, such as the Internet.

The service providing system 10 is implemented by at least one information processing apparatus and provides a variety of services that are substantialized through a series of processes that combine at least one process from among the multiple processes, each of which substantializes a variety of functions, via the network N1.

Here, the function is a function related to an electronic file such as a document file or an image file. The functions include, for example, printing, scanning, facsimile transmission, data format conversion, mail distribution, OCR (optical character recognition) process, processing, compression/decompression, storage into a repository, and the like.

Specific examples of services provided by the service providing system 10 according to this embodiment will be described below.

The apparatus 20 is a variety of electronic devices used by the end user. Said differently, the apparatus 20 is, for example, an image forming device such as an MFP (multi-function peripheral), a PC, a projector, an electronic blackboard, a digital camera, and the like. The end user may use the apparatus 20 to utilize various services provided by the service providing system 10.

In the following sections, when distinguishing between two or more apparatuses 20, the descriptions are made using subscripts such as "apparatus 201" and "apparatus 202."

The PC terminal 30 may be, for example, a desktop PC, a notebook PC, a smartphone, a tablet terminal, or the like used by the developer or end user. The developer or end user may use the PC terminal 30 to utilize various services provided by the service providing system 10.

Hereinafter, when distinguishing the plurality of PC terminals 30 from each other, "PC terminal 301" and "PC terminal 301" are used as indexes.

Further, the configuration of the information processing system 1 illustrated in FIG. 2 is exemplary and may be another configuration. For example, the information processing system 1 according to the this embodiment includes a variety of devices that perform at least one of the input and output of the electronic data, and various services provided by the service providing system 10 may be utilized.

<Hardware Configuration>

Figure 3:
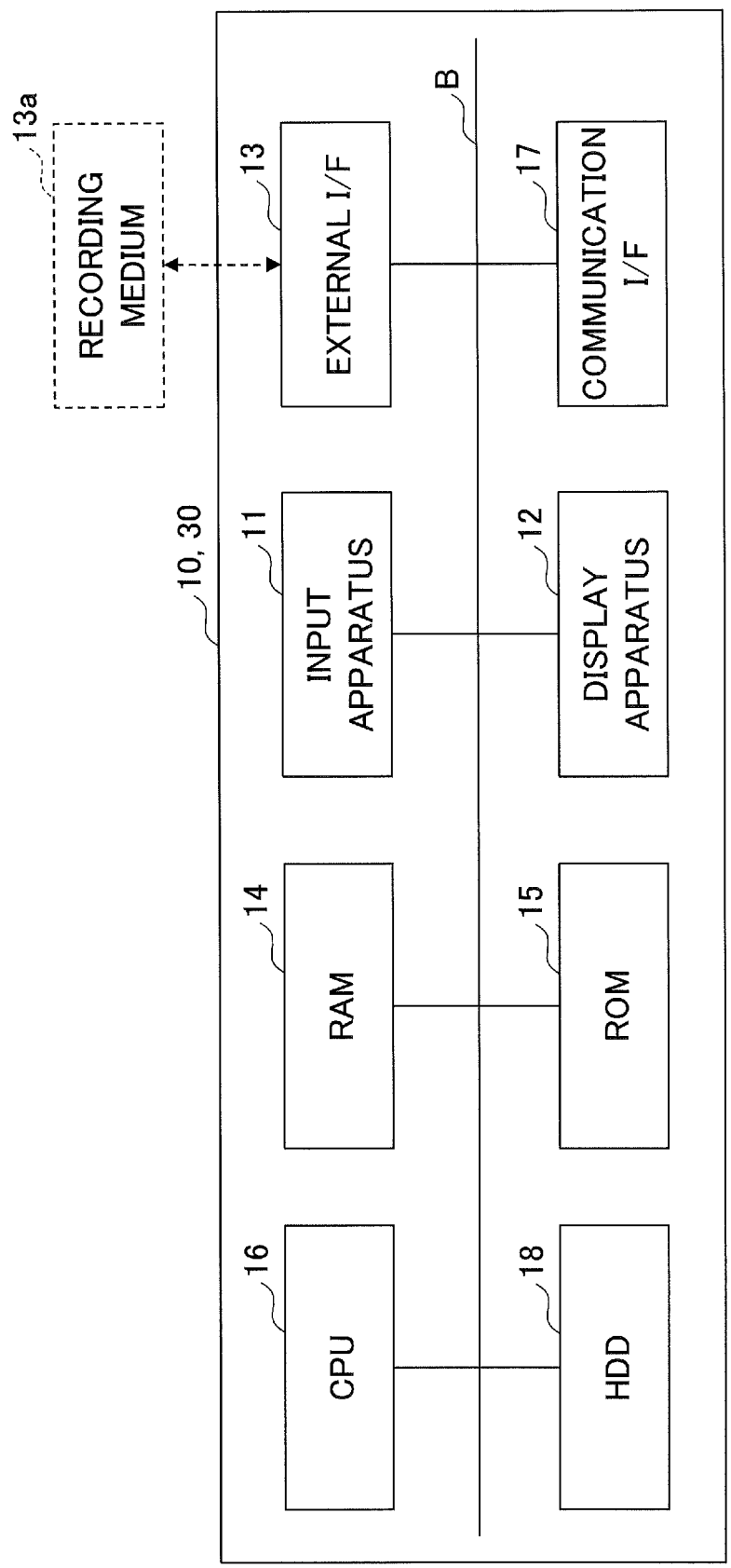
FIG. 3 illustrates an example of a hardware configuration of a service providing system and a PC terminal.

Next, the hardware configuration of the service providing system 10 and the PC terminal 30 included in the information processing system 1 according to this embodiment will be described with reference to FIG. 3. FIG. 3 illustrates a hardware configuration of an example of a service providing system 10 and the PC terminal 30 according to this embodiment. Because the service providing system 10 and the PC terminal 30 have the same hardware configuration, the hardware configuration of the service providing system 10 will mainly be described below.

The service providing system 10 illustrated in FIG. 3 includes an input device 11, a display device 12, an external I/F 13, and a RAM (Random Access Memory) 14. The service providing system 10 also includes a ROM (Read Only Memory) 15, a CPU (Central Processing Unit) 16, a communication I/F 17, and an HDD (Hard Disk Drive) 18. Each of these hardware is connected by bus B.

The input device 11 may include a keyboard, mouse, touch panel, or the like, and may be used by a developer or end user to input each operation signal. The display device 12 includes a display or the like to display the results of processing by service providing system 10. At least one of the input device 11 and the display device 12 may be in the form of connecting to the service providing system 10 when necessary.

The communication I/F 17 is an interface that connects the service providing system 10 to the network N1. Accordingly, the service providing system 10 can communicate via the communication I/F 17.

The HDD 18 is a non-volatile memory device that stores programs and data. The programs and data stored in the HDD 18 include OS (operating system), which is the basic software for controlling the entire service providing system 10, application software that provides various functions on the OS, and so on.

The service providing system 10 may utilize a drive device (e.g., a solid state drive: SSD) that uses a flash memory as a memory medium instead of the HDD 18. Further, an HDD 18 administers the stored programs and data by a predetermined file system and/or a DB.

The external I/F 13 is an interface with an external device. The external device includes a recording medium 13a and so on. Accordingly, the service providing system 10 can read and write data from and to the recording medium 13a through the external I/F 13. The recording medium 13a includes a flexible disk, a CD, a DVD, an SD memory card, a USB memory, and the like.

A ROM 15 is a non-volatile semiconductor memory that can hold programs and data even when power is turned off. The ROM 15 contains programs and data for BIOS (Basic Input/Output System), OS setting, and network setting, and so on that are executed when the service providing system 10 is started up. A RAM 14 is a volatile semiconductor memory that temporarily holds programs or data.

A CPU 16 is an arithmetic device that reads programs and data from a memory device such as the ROM 15 or the HDD 18 onto the RAM 14 and executes a process to implement control and function of the entire service providing system 10.

The service providing system 10 and the PC terminal 30 according to this embodiment have the hardware configuration illustrated in FIG. 3, and thus various processing can be substantialized as described below.

Figure 4:
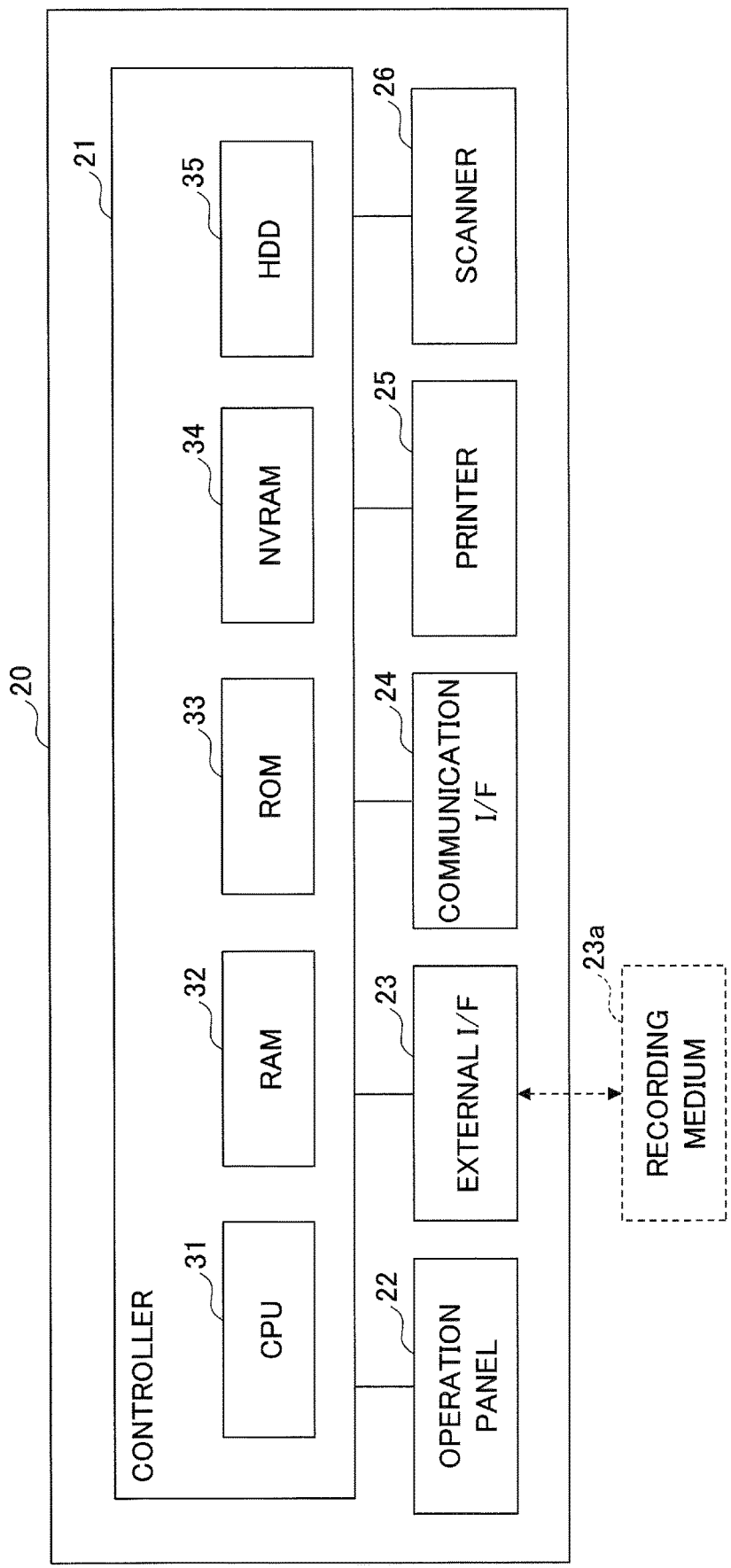
FIG. 4 illustrates an example of a hardware configuration of an apparatus.

Next, referring to FIG. 4, a hardware configuration in which the apparatus 20 included in the information processing system 1 according to this embodiment is an image forming apparatus will be described. FIG. 4 illustrates an example of the hardware configuration of the apparatus 20 according to this embodiment.

The apparatus 20 illustrated in FIG. 4 includes a controller 21, an operation panel 22, an external I/F 23, a communication I/F 24, a printer 25, and a scanner 26. The controller 21 includes a CPU 31, a RAM 32, a ROM 33, an NVRAM 34, and an HDD 35.

The ROM 33 is a non-volatile semiconductor memory that stores various programs and data. The RAM 32 is a volatile semiconductor memory that temporarily holds the programs and data. The NVRAM 34 stores, for example, setup information and so on. The HDD 35 is a non-volatile memory device that stores various programs and data.

A CPU 31 is an arithmetic device that reads programs, data, setup information, etc. from the ROM 33, the NVRAM 34, the HDD 35, etc. onto the RAM 32 and performs processing, thereby substantializing controls and functions of the entire apparatus 20.

The operation panel 22 includes an input unit for receiving an input from the end user and a display unit for displaying. The external I/F 23 is an interface with an external device. The external device includes a recording medium 23a and so on. Accordingly, the apparatus 20 can read and/or write the recording medium 23a through the external I/F 23. The recording medium 23a includes, for example, an IC card, a flexible disk, a CD, a DVD, an SD memory card, a USB memory, and so on.

The communication I/F 24 is an interface that connects the apparatus 20 to the network. Accordingly, the apparatus 20 can communicate via the communication I/F 24. The printer 25 is a printing device for printing print data. The scanner 26 is a reader that reads an original (manuscript) and generates an electronic file (image file).

The apparatus 20 according to this embodiment has the hardware configuration illustrated in FIG. 4, and thus various processing can be substantialized as described below.

<Service Provided by Service Providing System>

Next, a service provided by the service providing system 10 according to this embodiment will be described. Hereinafter, the apparatus 20 will be described as an image forming apparatus.

In this embodiment, the service of translating an electronic file (image file) generated by scanning the original in the apparatus 20 into a predetermined language and delivering it on an e-mail is referred to as a "scan translation service". Further, a service in which the electronic file (image file) generated by the apparatus 20 scanning the document is uploaded to a storage service for mail delivery is referred to as a "scan upload service". In this embodiment, a case where the service providing system 10 provides the scan translation service and the scan upload service will be described.

Here, in order for the service providing system 10 to provide a scan translation service, an application (app information 1000 to be described later) for the apparatus 20 to utilize the scan translation service needs to be registered in the service providing system 10. The application is a program in which parameters of the process flow of the business are set by the end user so that a service is used.

However, the services provided by the service providing system 10 are not limited thereto. The service providing system 10 may, for example, provide a service for mail delivery after encrypting electronic files generated by scanning the original in the apparatus 20.

Similarly, the service providing system 10 may provide a service of transmitting facsimile after adding predetermined information to an electronic file generated by scanning the original in the apparatus 20, for example.

<Function Configuration>

Figure 5:
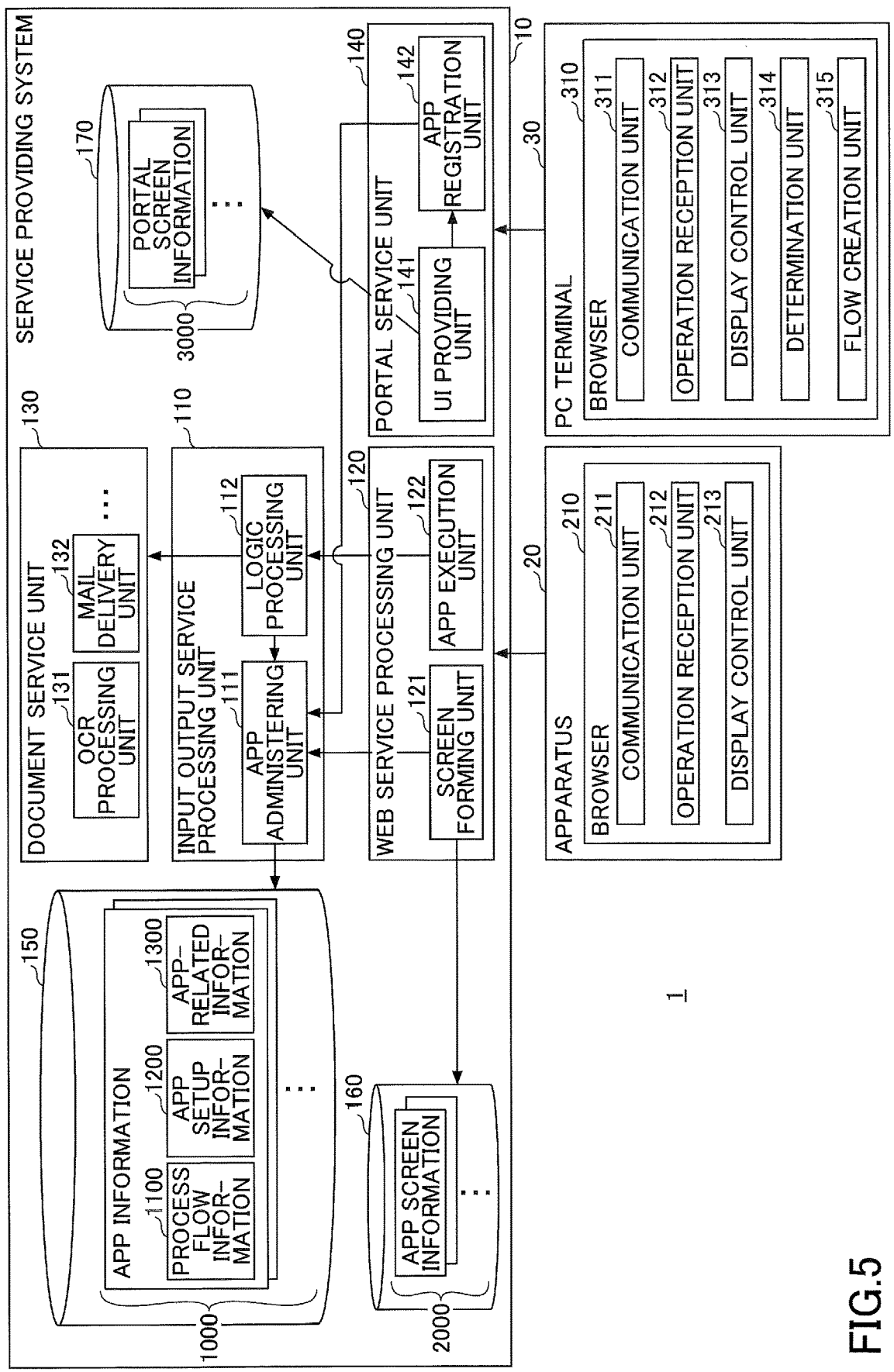
FIG. 5 illustrates a function configuration of an example of an information processing system.

Next, referring to FIG. 5, the function configuration of the information processing system 1 according to this embodiment will be described. FIG. 5 illustrates a function configuration of an example of an information processing system of this embodiment.

The PC terminal 30 illustrated in FIG. 5 includes a browser 310 executed by, for example, the CPU 16. A user of the PC terminal 30 can register the application to the service providing system 10 for utilizing various services such as a "scan translation service" using a browser 310.

The browser 310 includes a communication unit 311, an operation reception unit 312, a display control unit 313, a determination unit 314, and a flow creation unit 315. The communication unit 311 transmits and receives various information with the service providing system 10. For example, screen information on the screen displayed by the browser 310 is received from the service providing system 10 and information set by the developer is transmitted to the service providing system 10. The operation reception unit 312 receives various operations by the developer to the PC terminal 30. The display control unit 313 displays various screens on the display device 12 based on screen information.

The determination unit 314 determines whether the operation of the components already arranged in the process flow setup screen G800 is the same as that of the components arranged by the developer. The operations are described later. The flow creation unit 315 generates flow information. When the determination unit 314 determines that the operations of two components are the same, a component group is created.

The apparatus 20 illustrated in FIG. 5 includes a browser 210 executed by the CPU 31, for example. A user of the apparatus 20 may use the browser 210 to utilize various services such as a "scan translation service". Said differently, the apparatus 20 may have the browser 210, and does not need to have a dedicated application program or the like for utilizing the various services provided by the service providing system 10.

As a general function, the browser 210 includes a communication unit 211, an operation reception unit 212, and a display control unit 213. The communication unit 211 transmits and receives various information with the service providing system 10. For example, screen information on the screen displayed by a browser 210 is received from the service providing system 10 and information set by the end user is transmitted to the service providing system 10. The operation reception unit 212 receives various operations by the end user to the apparatus 20. The display control unit 213 displays various screens on the operation panel 22 based on the screen information.

The service providing system 10 illustrated in FIG. 5 includes an input output service processing unit 110, a web service processing unit 120, a document service unit 130, and a portal service unit 140. Each of these function units is substantialized by a process in which at least one program installed in the service providing system 10 are executed by the CPU 16.

The service providing system 10 includes an app information memory unit 150, an app screen information memory unit 160, and a portal screen information memory unit 170. Each of these memory units can be substantialized by using the HDD 18. Further, at least one memory unit from among the memory units may be substantialized using a memory device, etc. connected to the service providing system 10 via a network.

The input output service processing unit 110 performs a process related to the service provided by the service providing system 10. Here, the input output service processing unit 110 includes an app administering unit 111 and a logic processing unit 112.

The app administering unit 111 administers the app information 1000 stored in the app information memory unit 150. The app information 1000 is an application for utilizing a service substantialized by a series of processes. Said differently, the various services provided by the service providing system 10 are provided by the app information 1000.

The app administering unit 111 returns the process flow information 1100 included in the app information 1000 in response to a request from the logic processing unit 112. The process flow information 1100 is information that defines a series of processes that substantialize the services provided by the app information 1000.

Further, the app administering unit 111 stores the app information 1000 in the app information memory unit 150 in response to a request from the portal service unit 140. Accordingly, the app (application) information 1000 providing the service is registered in the service providing system 10.

The logic processing unit 112 acquires the process flow information 1100 included in the app information 1000 from the app administering unit 111 in response to a request from the web service processing unit 120. The logic processing unit 112 executes a series of processes (process flow) that substantializes the service provided by the app information 1000 based on the process flow information 1100 acquired from the app administering unit 111. Accordingly, the service providing system according to this embodiment can provide various services such as "scan translation service". The details of the logic processing unit 112 will be described later.

The web service processing unit 120 performs a process for the end user to utilize various services using the browser 210 of the apparatus 20. Said differently, the web service processing unit 120 functions as an application server that provides a web application (app information 1000) to the browser 210. Here, the web service processing unit 120 includes a screen forming unit 121 and an app execution unit 122.

In response to a request from the browser 210, the screen forming unit 121 returns the app screen information 2000 stored in the app screen information memory unit 160 and the app setup information 1200 included in the app information memory unit 1000 stored in the app information memory unit 150.

The app screen information 2000 is information that defines a model screen (app screen) for using the services provided by the app information 1000. The app screen information 2000 is, for example, information that defines the model of the app screen by HTML (HyperText Markup Language), XHTML (Extensible HyperText Markup Language), CSS (Cascading Style Sheets), JavaScript ("JavaScript" is a registered trademark), etc.

The app setup information 1200 is information in which various setups of the application (app information 1000) are defined. For example, the app setup information 1200 defines parameter information that is input by the user and parameter information that is set by the default among parameter information used for executing a series of processes. For example, the app setup information 1200 defines input items for the developer to input parameter information on the app screen and display information (for example, an app name) on the app screen. The app setup information 1200 is, for example, information that defines the various setups of the application in a JSON (JavaScript Object Notation) or the like.

Thus, the browser 210 of the apparatus 20 displays an app screen for utilizing the services provided by the service providing system 10.

The app execution unit 122 transmits a request for executing the application (app information 1000) to the input output service processing unit 110 in response to a request from the browser 210.

The document service unit 130 executes a predetermined process included in a series of processes (process flow) based on the process flow information 1100. Here, the document service unit 130 includes an OCR processing unit 131 and a mail delivery unit 132.

The OCR processing unit 131 performs an OCR process for an electronic file. The mail delivery unit 132 makes a mail to which an electronic file is attached and delivers the mail to the designated mail address.

Further to these, the document service unit 130 may include various function units such as, for example, a compression/decompression processing unit for compressing or decompressing the electronic file, a data format converting unit for converting the data format of the electronic file, and the like.

The portal service unit 140 performs a process for the developer to register the application using the browser 310 of the PC terminal 30. Here, the portal service unit 140 includes a UI providing unit 141 and an application registration unit 142.

The UI providing unit 141 returns the portal screen information 3000 stored in the portal screen information memory unit 170 in response to a request from the browser 310. Here, a portal is a web site where the applications can be registered using the browser 310.

The portal screen information 3000 is information that defines various screens such as a top screen (portal top screen) of the portal and an application registration screen. The portal screen information 3000 is information that defines various screens in the browser 210 such as HTML, XML, CSS, or JavaScript.

Accordingly, the PC terminal 30 displays the portal top screen and the application registration screen by the browser 310. Accordingly, the user of the PC terminal 30 can perform the registration operation of the application (app information 1000) on the application registration screen.

The application registration unit 142 requests the app administering unit 111 to register the application (app information 1000) in response to a request from the UI providing unit 141. Said differently, when the application registration operation is performed in the application registration screen, the application registration unit 142 requests the application registration of the app administering unit 111.

The app information memory unit 150 stores the app information 1000. The app information 1000 is stored in the app information memory unit 150 in association with the app ID identifying the app information 1000. The app ID is, for example, the URL (Uniform Resource Locator) of the app information 1000 or the identification information contained in the URL of the app information 1000.

Here, the app information 1000 includes process flow information 1100, app setup information 1200, and app-related information 1300. For example, the app information 1000 that provides the scan translation service includes the process flow information 1100 that defines a series of processes that substantialize the service, and the app setup information 1200 that defines the various setups of the app information 1000. Further, the app information 1000 of the application executing the process flow having a component group includes the app-related information 1300.

Hereinafter, the app information 1000 providing the scan translation service is also referred to as the "scan translation application".

The app information 1000 may include at least two process flow information 1100, at least two app setup information 1200, and at least two app-related information 1300.

The process flow information 1100 is, as described above, information that defines a series of processes (process flow) that substantialize the service provided by the app information 1000. The details of the process flow information 1100 will be described later.

The app setup information 1200 is information in which various setups of the application (app information 1000) are defined as described above. The details of the app setup information 1200 will be described later.

The app-related information 1300 is information that sets which components of the component group defined in the process flow to be executed by the application are executed. The details of the app-related information 1300 will be described later.

The app screen information memory unit 160 stores the app screen information 2000. The app screen information 2000 is stored in the app screen information memory unit 160 in association with the app ID.

The portal screen information memory unit 170 stores the portal screen information 3000. The portal screen information 3000 is stored in the portal screen information memory unit 170 in association with a URL of a portal top screen, an application registration screen, an administrator's app setup screen, an individual app setup screen (including a login screen and a main screen), and so on.

The input output service processing unit 110, the web service processing unit 120, the document service unit 130, and the portal service unit 140 may be substantialized by mutually different information processing apparatuses.

Figure 6:
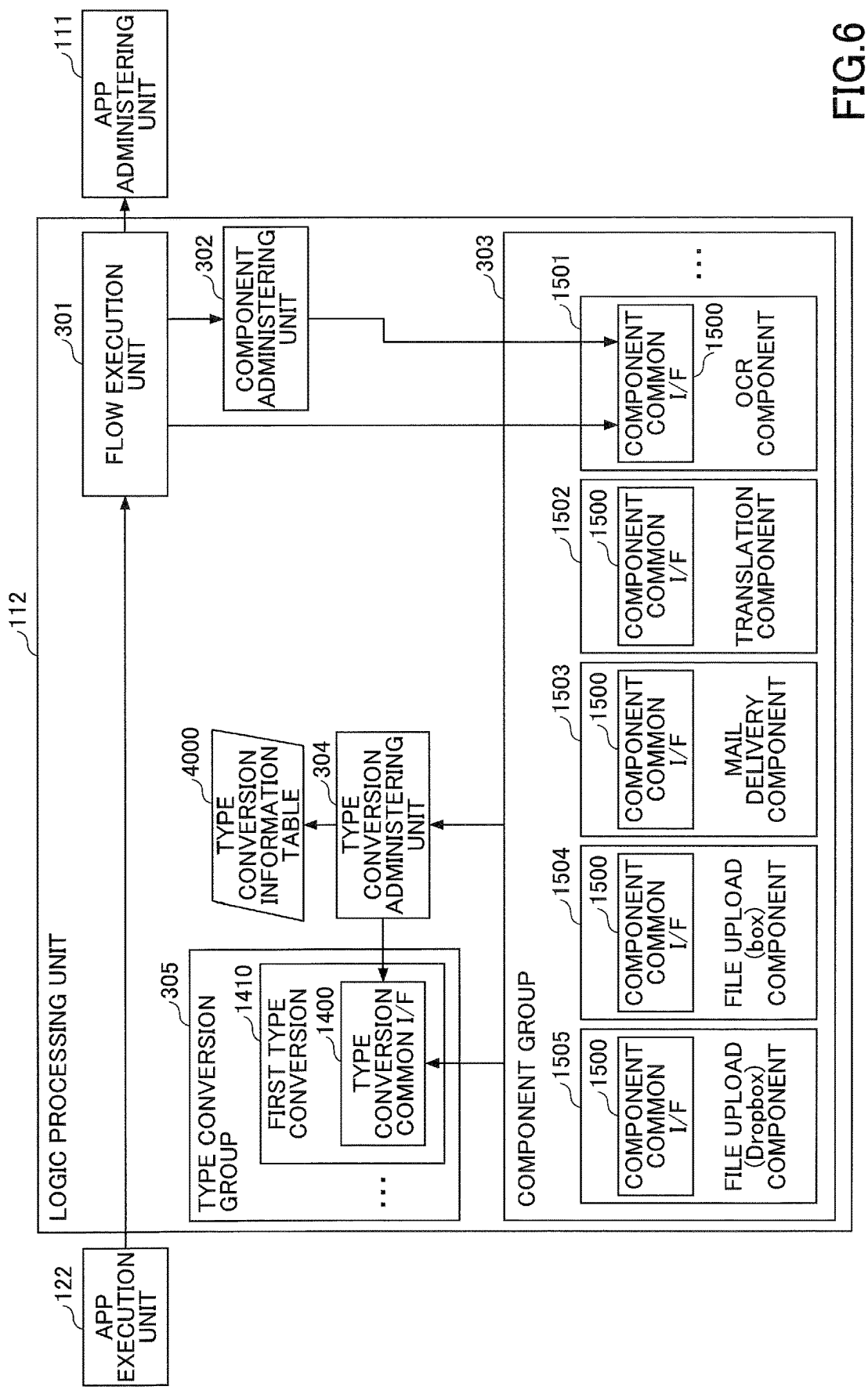
FIG. 6 illustrates a function configuration of an example of a logic processing unit.

Here, a detailed function configuration of the logic processing unit 112 will be described with reference to FIG. 6. FIG. 6 illustrates an example of the function configuration of the logic processing unit 112 according to this embodiment.

The logic processing unit 112 illustrated in FIG. 6 includes a flow execution unit 301, a component administering unit 302, a component group 303, a type conversion administering unit 304, and a type conversion group 305. The logic processing unit 112 includes a type conversion information table 4000.

When an application execution request is received from the app execution unit 122, the flow execution unit 301 acquires the process flow information 1100 corresponding to the execution request from the app administering unit 111. The flow execution unit 301 executes a series of processes (process flow) based on the process flow information 1100 obtained from the app administering unit 111.

Here, a series of processes based on the process flow information 1100 are performed by combining components for executing each process included in the series of processes. Components are substantialized by programs, modules, etc. for executing a process for substantializing a predetermined function, and are defined, for example, by classes, functions, etc.

The component administering unit 302 manages the components. The component administering unit 302 generates a component in response to a request from the flow execution unit 301 and returns the generated component to the flow execution unit 301. The creation of the component means, for example, deploying the component defined by a class or a function on a memory (e.g., RAM 14).

A component group 303 is a set of components. The component group 303 includes an OCR component 1501, a translation component 1502, a mail delivery component 1503, a file upload (external storage service A) component 1504, and a file upload (external storage service B) component 1505.

The OCR component 1501 is a component for an OCR process for the electronic files (image files). The OCR component 1501 performs the OCR process of the electronic file by requesting the OCR process to the OCR processing unit 131 of the document service unit 130.

The translation component 1502 is a component for translating a document written in a predetermined language into that written in another language in an electronic file such as a text file. The mail delivery component 1503 is a component for mail delivery to a designated mail address. The mail delivery component 1503 delivers the mail to the designated mail address by requesting the mail delivery process of the mail delivery unit 132 of the document service unit 130.

The file upload (external storage service A) component 1504 is a component that uploads the electronic file to "external storage service A", and the file upload (external storage service B) component 1505 is a component that uploads an electronic file to "external storage service B".

In this manner, each component performs a process that achieves a predetermined function. The component group 303 includes other components, such as encryption and decryption components for encrypting and decrypting the electronic file, a compression component for compressing the electronic file, and a file upload component for uploading the electronic file.

Each component included in the component group 303 also has a component common I/F 1500. The component common I/F 1500 is a commonly defined API (Application Programming Interface) for each component and includes an API for generating the component and an API for executing the process of the component.

In this way, because each component has the component common I/F 1500, the effects associated with the addition of components and so on can be localized. Said differently, for example, the addition of components can be performed without affecting the flow execution unit 301 or the component administering unit 302. Accordingly, the service providing system 10 of this embodiment can reduce the development man-hour associated with the addition of a predetermined function (i.e., the addition of a component to execute a process for substantializing the function).

The type conversion administering unit 304 administers the data type conversion. Here, each component has a predetermined data type that it can handle. Accordingly, the type conversion administering unit 304 generates a type conversion included in the type conversion group 305 in response to a request from the component referring to a type conversion information table 4000 illustrated in FIG. 6, for example.

The type conversion administering unit 304 requests the execution of the type conversion process to the generated type conversion. The type conversion is substantialized by a program or module that executes the type conversion process of the data type, and is defined by a class or function, for example. Further, the generation of the type conversion is to expand the type conversion defined by, for example, the class or the function onto a memory (e.g., the RAM 14).

The data type is, for example, a data type "InputStream" representing stream data, "LocalFilePath" representing the path (address) of the electronic file stored in the memory device, "File" representing the substance of the electronic file, and so on.

Here, the type conversion information table 4000 will be described with reference to FIG. 7. FIG. 7 illustrates an example of a type conversion information table 4000.

The type conversion information table 4000 illustrated in FIG. 7 includes the data type before conversion, the data type after conversion, and the type conversion to be generated as the data item. Said differently, the type conversion information stored in the type conversion information table 4000 is information in which a type conversion for converting the data type before the conversion into the data type after the conversion is associated with each data type before the conversion and each data type after the conversion.

The type conversion group 305 is a set of type conversions. The type conversion group 305 includes a first type conversion 1410 for converting the data type "InputStream" to "LocalFilePath". The type conversion group 305 also includes a second type conversion for converting the data type "LocalFilePath" to "File," for example.

Each type conversion included in the type conversion group 305 has a type conversion common I/F 1400. The type conversion common I/F 1400 is an API commonly defined for each type conversion and includes an API for generating the type conversion and an API for executing the type conversion process of the type conversion.

In this way, because each type conversion type has the type conversion common I/F 1400, the effect associated with the addition of the type conversion can be localized. Said differently, for example, the addition of the type conversion can be performed without affecting the type conversion administering unit 304 and so on. Accordingly, the service providing system 10 according to this embodiment can reduce the development effort associated with the addition of the type conversion and so on.

Next, the process flow information 1100 included in the app information 1000 providing the scan translation service will be described with reference to FIG. 8. FIG. 8 illustrates an example of process flow information 1100.

The process flow information 1100 illustrated in FIG. 8 is information in which a series of processes (process flow) that substantialize a scan translation service are defined.

The process flow information 1100 illustrated in FIG. 8 includes a flow name 1101 that identifies the process flow information 1100 and a flow detail 1102 that defines the process contents of each process included in the process flow.

The flow detail 1102 includes a detailed process definition 1110 defining each process included in the process flow, a detailed process definition 1120, and a detailed process definition 1130. The detailed process definitions 1110 to 1130 include "detailName" indicating the detailed processing name identifying the detailed process definition, "component" indicating the component name for executing the process, and "parameters" defining parameter information for the component.

Specifically, the "detailName" of the detailed process definition 1110 defines "detail0". Further, the component name "ocr" of the OCR component 1501 is defined in the "component" of the detailed process definition 1110. Further, the parameter information of the parameter name "language" is defined in "parameters" of the detailed process definition 1110.

The parameter information of the parameter name "language" is parameter information that sets the language of OCR processing (e.g., "Japan" or "English") as a parameter value.

Similarly, the "detailName" of the detailed process definition 1120 defines "detail1". The "component" of the detailed process definition 1120 defines the component name "translation" of the translation component 1502. Further, the parameter information of the parameter name "from" and the parameter information of the parameter name "to" are defined in "parameters" of the detailed process definition 1110.

The parameter information of the parameter name "from" is parameter information that sets the language of the translation source (for example, "English") as a parameter value. The parameter information of the parameter name "to" is parameter information that sets the language of the translation destination (for example, "Japanese") as the parameter value.

Similarly, the "detailName" of the detailed process definition 1130 defines "detailName" as "detai21". Further, the component name "mail" of the mail delivery component 1503 is defined in the "component" of the detailed process definition 1130. Further, the parameter information of the parameter name "address" is defined in "parameters" of the detailed process definition 1130.

The parameter information of the parameter name "address" is parameter information that sets the mail address of mail transmission source as a parameter value.

Further, the order of execution of the process defined in each detailed process definition is defined in the flow detail 1102 in order from above. Said differently, in a series of processes (process flow) based on the process flow information 1100 illustrated in FIG. 8, the process is performed in the order of the process defined in the detailed process definition 1110, the process defined in the detailed process definition 1120, and the process defined in the detailed process definition 1130. However, the process flow information 1100 may include, for example, information indicating the order of executing the processes defined in each detailed process definition.

In the example illustrated in FIG. 8, the parameter values of each parameter information are not set, but the default parameter values may be set.

<Processing Details>

Figure 9:
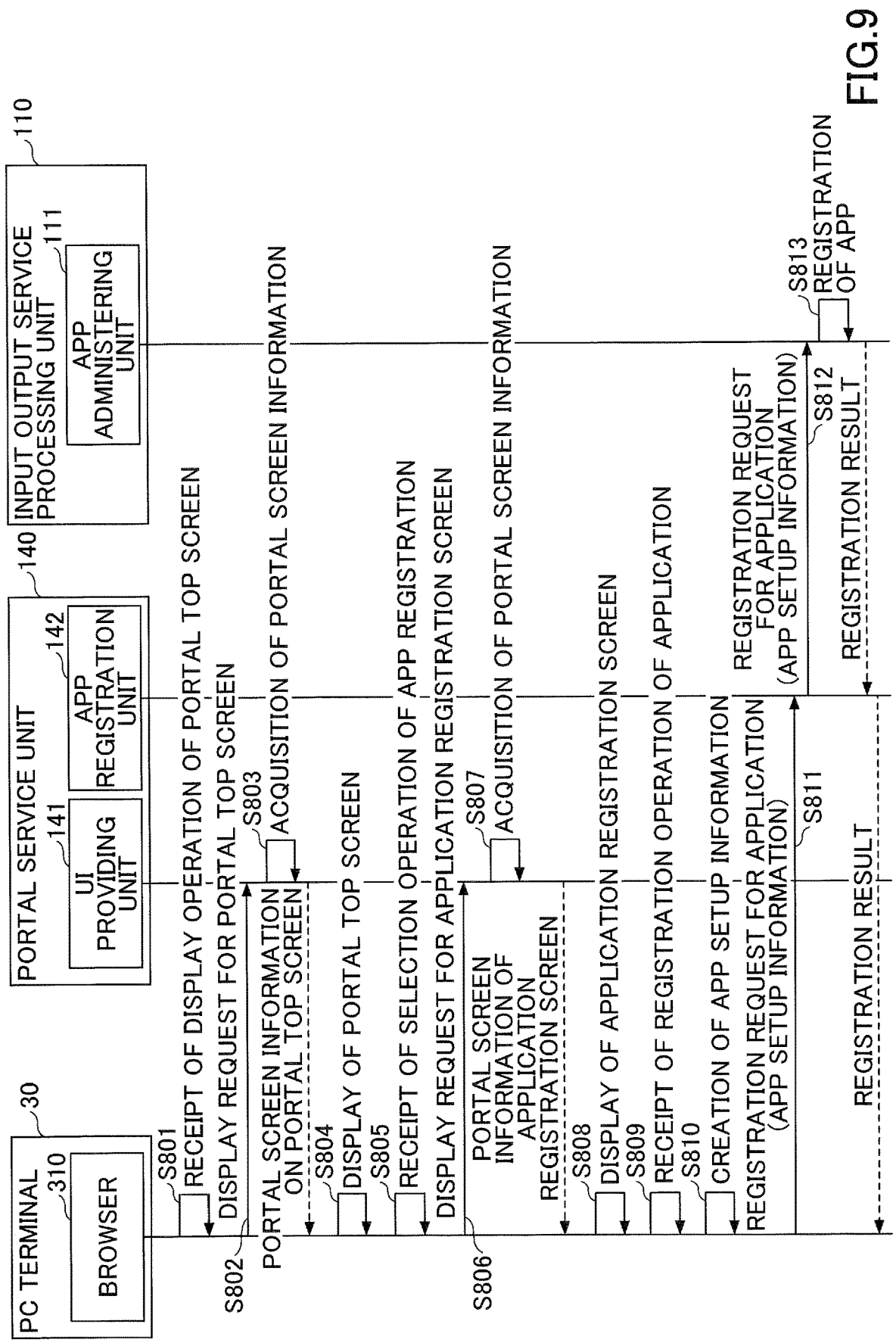
FIG. 9 is a sequence diagram illustrating an example of registration process of an application.

Next, a detailed process of the information processing system 1 according to this embodiment will be described. The process in which the developer operates the PC terminal 30 and registers the scan translation application with the service providing system 10 will be described with reference to FIG. 9. FIG. 9 is a sequence diagram illustrating an example of a registration process of an application.

First, in step S801, the operation reception unit 312 of the browser 310 of the PC terminal 30 receives an operation (display operation of the portal top screen) for displaying the portal top screen. The user of the PC terminal 30 can perform the display operation of the portal top screen by inputting the URL of the portal top screen into the address bar of the browser 310, for example.

When the operation reception unit 312 of the browser 310 of the PC terminal 30 receives the display operation of the portal top screen, the communication unit 311 transmits the display request for displaying the portal top screen to the UI providing unit 141 of the portal service unit 140 (step S802).

In step S803, the UI providing unit 141 of the portal service unit 140 acquires the portal screen information of the portal top screen from the portal screen information memory unit 170 after receiving a request for acquiring the portal top screen. The UI providing unit 141 returns the portal screen information obtained from the portal screen information memory unit 170 to the browser 310.

Figure 10:
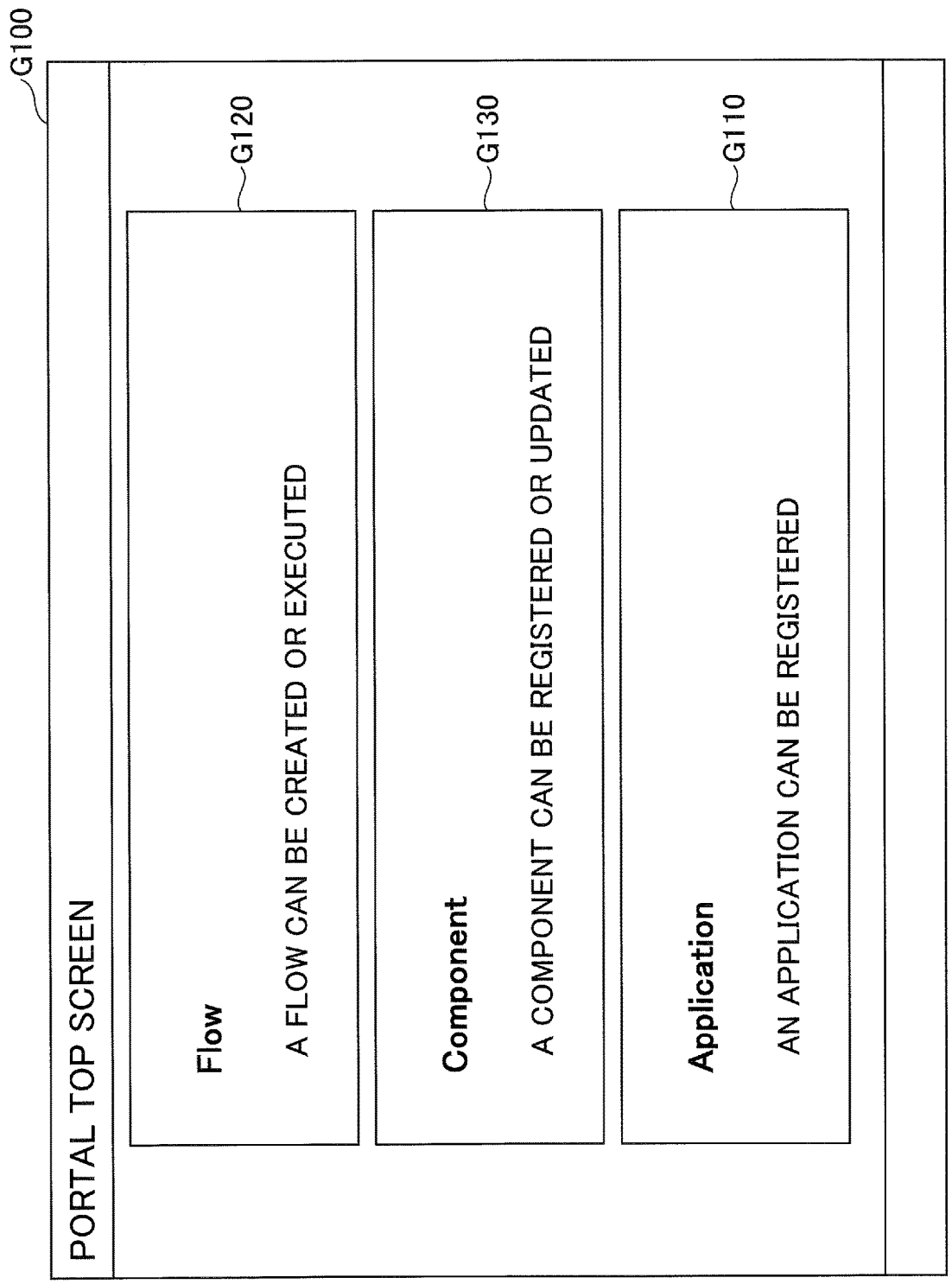
FIG. 10 illustrates an example of a portal top screen.

In step S804, the display control unit 313 of the browser 310 of the PC terminal 30 receives the portal screen information of the portal top screen and displays, for example, the portal top screen G100 illustrated in FIG. 10 based on the portal screen information.

The portal top screen G100 illustrated in FIG. 10 is the top screen of the portal and includes an "Application" button G110 for registering applications. Hereinafter, the developer performs the operation to select the "Application" button G110 on the portal top screen G100 illustrated in FIG. 10 (i.e., the operation to select the application registration).

The portal top screen G100 illustrated in FIG. 10 also includes a "Flow" button G120 for creating the process flow information 1100, a "Component" button G130 for registering components, etc. In this way, the portal top screen G100 is capable of creating and executing the process flow, registering and updating components, etc., in addition to registering the applications.

By pushing the "Flow" button G120, the process flow setup screen G800 (described later). However, the "Application" button G110 illustrated in FIG. 10 can be clicked to register the flow process even during the application registration process. Therefore, the "Application" button G110 is assumed to be pressed in this embodiment.

In step S805, the operation reception unit 312 of the browser 310 of the PC terminal 30 receives an application registration selection operation performed by the developer.

In step S806, when the operation reception unit 312 of the browser 310 of the PC terminal 30 receives an application registration selection operation, the communication unit 311 transmits a display request of the application registration screen to the UI providing unit 141 of the portal service unit 140.

In step S807, when the UI providing unit 141 of the portal service unit 140 receives a display request of the application registration screen, the UI providing unit 141 acquires the portal screen information of the application registration screen from the portal screen information memory unit 170. The UI providing unit 141 returns the portal screen information obtained from the portal screen information memory unit 170 to the browser 310.

Figure 11:
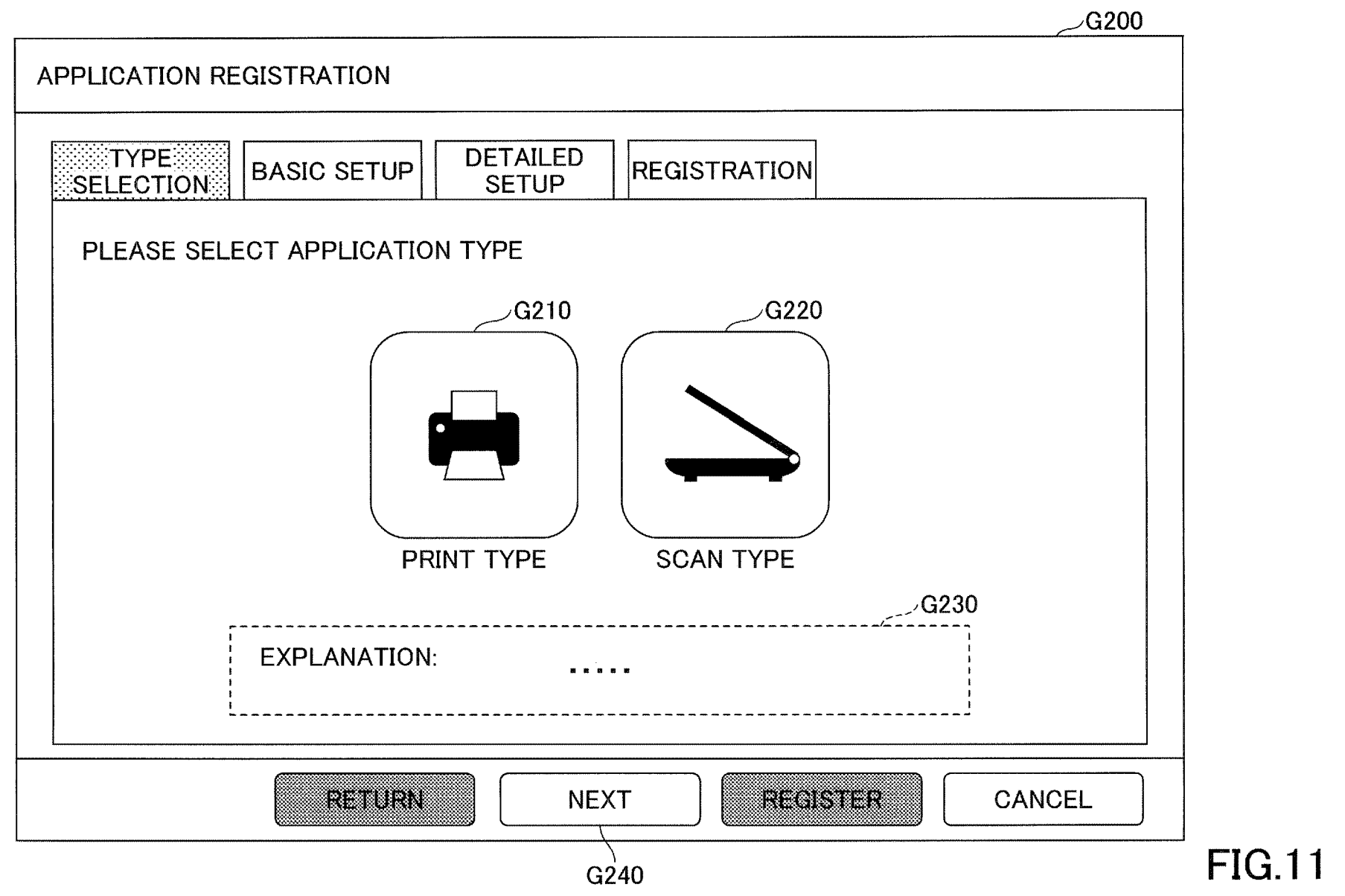

When the communication unit 311 of the browser 310 of the PC terminal 30 receives the portal screen information of the application registration screen, the display control unit 313 displays, for example, the application registration screen G200 illustrated in FIG. 11 based on the portal screen information (step S808).

Hereinafter, the case where the developer carries out the registration operation of the application will be described with reference to FIGS. 11 to 15.

First, the application registration screen G200 illustrated in FIG. 11 is a screen for selecting the type of application registered by the developer.

The application registration screen G200 illustrated in FIG. 11 includes a "print" button G210 for registering a print type application and a "scan" button G220 for registering a scan type application. The application registration screen G200 illustrated in FIG. 11 may include, for example, a "fax" button for registering an application of the fax type, a "mail reception" button for registering an application of a mail reception type, or the like.

Further, the application registration screen G200 illustrated in FIG. 11 includes the "Next" button G240 for transitioning to the next screen.

In the application registration screen G200 illustrated in FIG. 11, when the developer selects either the "print" button G210 or the "scan" button G220, a description of the print type or a description of the scan type is displayed in the description field G230, respectively.

The print type is an application in which an electronic file representing the result of execution by a series of processes is printed by an image forming apparatus or the like. On the other hand, a scan type is an application that performs a series of processes in which an electronic file generated by a scan is input in an image forming apparatus or the like.

For example, the fax type is an application in which an electronic file representing the result of execution by a series of processes is subjected to fax transmission by an image forming apparatus or the like. Further, the mail reception type is an application of the type in which a series of processes is executed in which an electronic file attached to the mail received by the image forming apparatus, etc. is input.

Hereinafter, the developer selects the "Scan" button G220 in the application registration screen G200 illustrated in FIG. 11, and then presses the "Next" button G240. Then, the display control unit 313 of the browser 310 receives the operation and displays, for example, the application registration screen G300 illustrated in FIG. 12.

The application registration screen G300 illustrated in FIG. 12 is a screen for the developer to set basic information for the application.

The application registration screen G300 illustrated in FIG. 12 includes the "app name" input setup field G310 for setting the app name and the "design template" selection field G320 for selecting the screen format of the app screen. Further, the application registration screen G300 illustrated in FIG. 12 includes an "authentication" selection field G330 for selecting authentication when using an application, and a "display language" selection field G340 for selecting the display language of the app screen. Further, the application registration screen G300 illustrated in FIG. 12 includes a "Next" button G350 and so on for transitioning to the next screen.

Further, in the "Design Template" selection field G320, for example, a "single screen format" in which an app screen is displayed on a single screen, a "wizard format" in which an app screen is displayed in an interactive format, or the like can be selected. Further, in the "Authentication" selection field G330, it is possible to select "None" to indicate that authentication is not used, or "User Authentication" to indicate that authentication is used.

Hereinafter, the developer performs the operation of pressing the "Next" button G350 after entering the app name or making various selections, as illustrated in the application registration screen G300 illustrated in FIG. 12. Then, the operation reception unit 312 of the browser 310 receives the operation, and the display control unit 313 displays, for example, the application registration screen G400 illustrated in FIG. 13.

Figure 13:
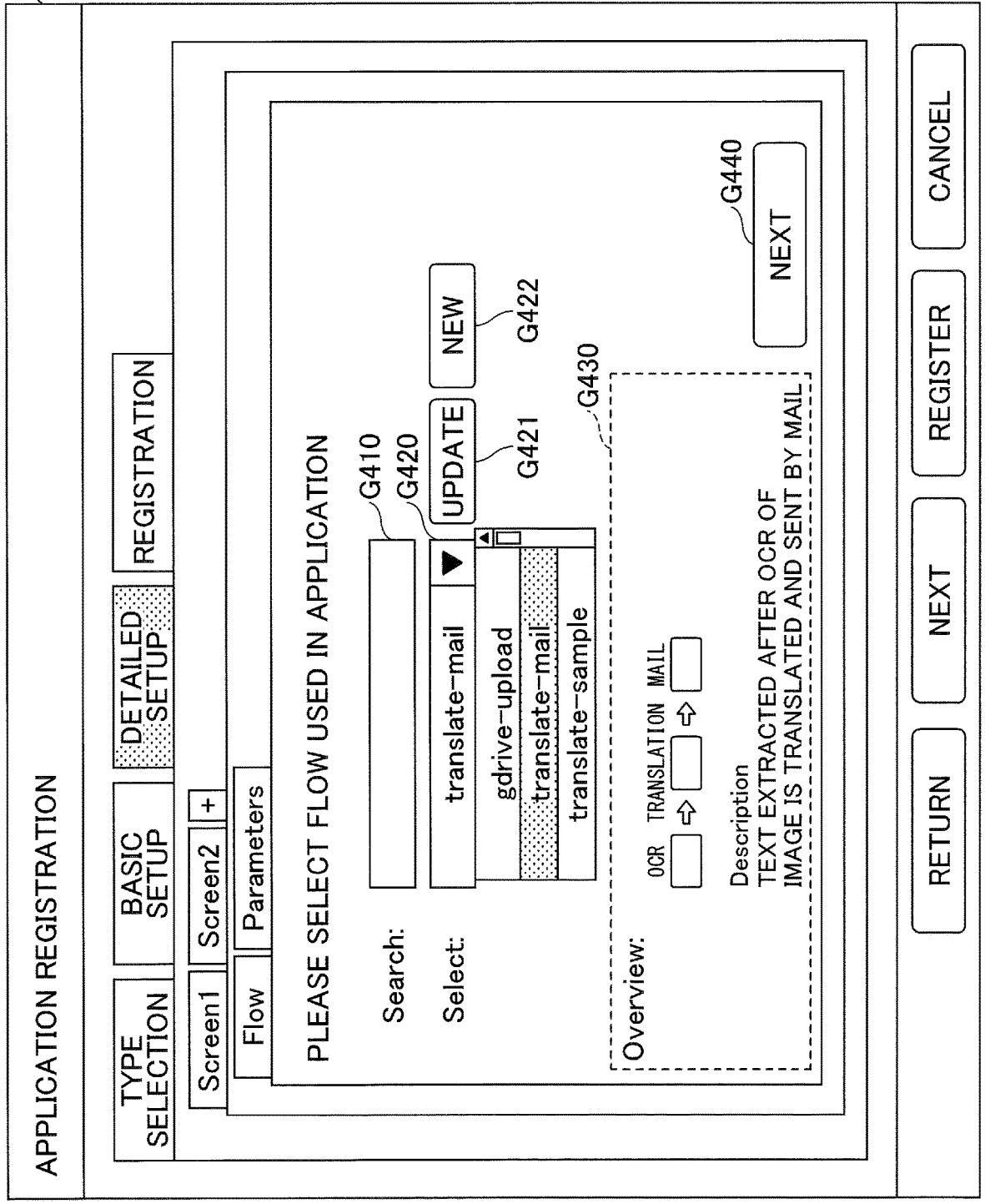
FIG. 13 illustrates an application registration screen (3/5).

The application registration screen G400 illustrated in FIG. 13 is a screen in which the developer sets a series of processes (process flow) for the application to be registered as detailed information of the application.

The application registration screen G400 illustrated in FIG. 13 includes a search field G410 for retrieving the flow name of the process flow information 1100 stored in the app information memory unit 150 and a flow selection field G420 for selecting a flow name. The user may enter the desired flow name, etc. in the search field G410 and select the desired flow name from the flow selection field G420.

The application registration screen G400 illustrated in FIG. 13 includes a summary display field G430 for displaying an outline of a series of processes based on the process flow information 1100 of the flow name selected in the flow selection field G420, and a "Next" button G240 for transitioning to the next screen.

Further, the application registration screen G400 illustrated in FIG. 13 includes an "Update" button G421 for editing and updating the process flow information 1100 of the flow name selected in the flow selection field G420 and a "New" button G422 for newly creating the process flow information 1100. The user can edit and update the process flow information 1100 of the flow name selected in the flow selection field G420 by pressing the "Update" button G421. Further, the user can create the process flow information 1100 by pressing the "New" button G422 and select the flow name of the created process flow information 1100 in the flow selection field G420. In this way, the process flow is selected in the setup of the application, so that the application and the process flow are associated. The application is identified by the flow name 1101 of the process flow. Said differently, the app ID and the flow name 1101 are associated. It may be associated with a process flow ID rather than a flow name 1101.

Figure 17:
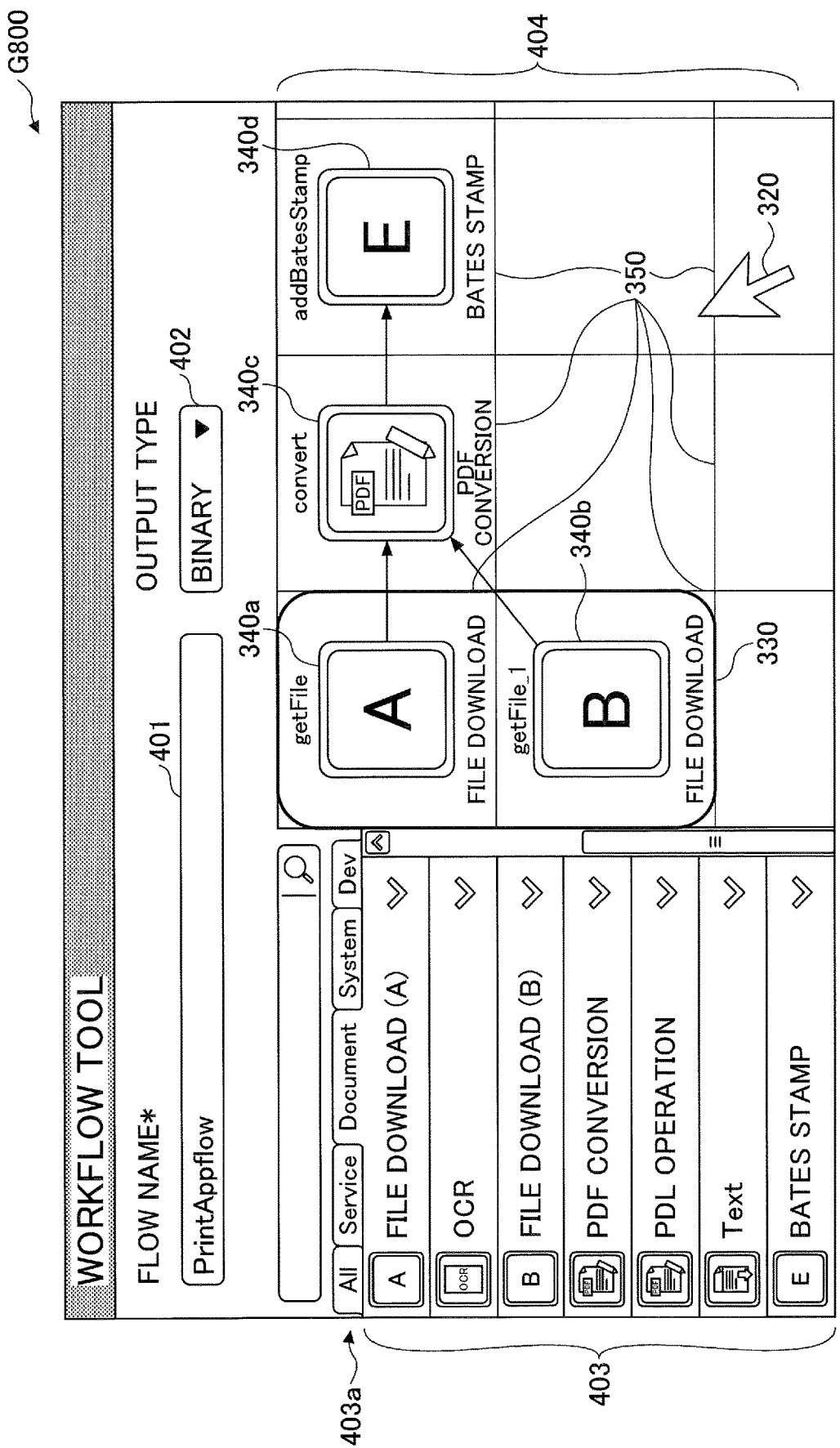
FIG. 17 illustrates an example of a process flow setup screen displayed by a display control portion of a browser of a PC terminal.

When the "Update" button G421 or "New" button G422 is pressed, the process flow setup screen G800 illustrated in FIG. 1 or FIG. 17 is displayed. The setup of the flow process will be described in FIG. 17.

Hereinafter, the developer shall select the flow name "translate-mail" in the flow selection field G420 and then click the "Next" button G440. Then, the operation reception unit 312 of the browser 310 receives the operation, and the display control unit 313 displays, for example, the application registration screen G500 illustrated in FIG. 14.

Figure 14:
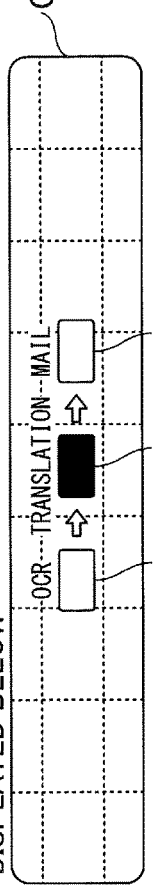
FIG. 14 illustrates an application registration screen (4/5).

The application registration screen G500 illustrated in FIG. 14 is a screen in which the developer sets parameter information of a set of processes (process flow) set in the application registration screen G400 as the application detail information illustrated in FIG. 13.

The application registration screen G500 illustrated in FIG. 14 includes a "component" selection field G510 for selecting components that perform each process included in a series of processes. Further, the application registration screen G500 illustrated in FIG. 14 includes the "parameter information" setup field G520 for setting the parameter information of the component selected in the "component" selection field G510 and the "Next" button G530 for transitioning to the next screen.

The developer can select the desired component from the component selection field G510 and set the parameter information in the parameter information setup field G520. For example, if the developer selects a translation component 1502 from the "component" selection field G510, the "parameter information" setup field G520 enables to perform various setups of the parameter information used by the translation component 1502.

Specifically, the various setups of parameter information include setup items such as "select", "display name", "name", "type", "default", and "input type". The parameter name of the parameter information is set in the setup item "name". The data format that can be set as a parameter value is set in the setup item "type". The parameter value set as the default is set in the setup item "default".

The setup item "select" sets whether the parameter value of the parameter information is input to the end user (service user) is set. The parameter information checked in the setup item "select" can be entered by the end user (service user) on the app screen. On the other hand, the parameter information not checked in the setup item "select" cannot be entered by the developer on the app screen, and the parameter value set in the setup item "default" is used.

In the setup item "input type," the input method is set for the parameter information, which is checked in the setup item "select" on the app screen. In the setup item "input type," for example, an input method for selecting a desired parameter value from a view of parameter values "list-radio-button" and an input method for directly entering parameter values "text" can be set. Further, the setup item "input type" may include, for example, an input method for inputting a coordinate on a screen, an input method for selecting a desired folder or file, or the like.

Further, the display name of the input items (items for entering parameter values) displayed on the app screen is set in the setup item "display name". The setup item "display-name" can be set to the display name of the language selected in the "Display Language" selection field G340 of the application registration screen G300 illustrated in FIG. 12. For example, if "Japanese" and "English" are selected in the "Display Language" selection field G340, the setup item "display name" can be set to, for example, the display name "pre-translation" in Japanese and the display name "Source Language" in English.

Thus, the developer can set whether to allow the service user to enter parameter values of parameter information for parameter information used by each component, and how to enter the parameter values.

Hereinafter, the developer shall set the parameter information used by each component and then click the "Next" button G530. Then, the operation reception unit 312 of the browser 310 receives the operation, and the display control unit 313 displays, for example, the application registration screen G600 illustrated in FIG. 15.

The application registration screen G600 illustrated in FIG. 15 is a screen for confirming various information (application setup information) set in FIGS. 11 to 14 by the developer.

The application registration screen G600 illustrated in FIG. 15 includes the "application setup information" display field G610 and the "registration" button G620. The developer can confirm various information set in FIGS. 11 to 14 in the display field G610 of "application setup information".

Here, the developer checks the application setup information in the "application setup information" display field G610, and then performs the operation (application registration operation) by pressing the "registration" button G620. Then, the operation reception unit 312 of the browser 310 receives the registration operation of the application (step S809).

When the operation reception unit 312 of the browser 310 receives the registration operation of the application, the web application executed by the browser 310 creates the app setup information 1200 illustrated in FIG. 16, for example (step S810).

The app setup information 1200 will be described with reference to FIG. 16. FIG. 16 illustrates an example of the app setup information 1200.

The application configuration information 1200 illustrated in FIG. 16 includes an application type 1201, an app name 1202, an app ID 1202-2, an app display name 1203, an authentication type 1204, and a flow name 1205. The app setup information 1200 illustrated in FIG. 16 also includes a design template type 1206, a default parameter 1207, and a user input parameter 1208.

The application type 1201 is the type of application selected in the application registration screen G200 illustrated in FIG. 11. In the example illustrated in FIG. 16, ""app_type":"scan"" is defined which indicates that the type of application is a scan type.

The app name 1202 is the app name entered in the "app name" input setup field G310 of the application registration screen G300 illustrated in FIG. 12. In the example illustrated in FIG. 16, ""appName":"scan translation application"" is defined which indicates that the app name is a "scan translation application". The app ID 1202-2 is the app ID assigned to this application.

The app display name 1203 is the app name (title) displayed on the app screen. It is defined as "scan translation" in Japanese and "translation app" in English.

The authentication type 1204 is the authentication selected in the "authentication" selection field G330 of the application registration screen G300 illustrated in FIG. 12. In the example illustrated in FIG. 16, a ""login type": "none"" is defined to indicate that it is not authenticated.

The flow name 1205 is the flow name selected in the flow selection field G420 of the application registration screen G400 illustrated in FIG. 13. In the example illustrated in FIG. 16, ""flowName":"translate-mail"" is defined which indicates that the flow name is "translate-mail".

The design template type 1206 is the display format selected in the "Design Template" selection field G320 of the application registration screen G300 illustrated in FIG. 12. In the example illustrated in FIG. 16, ""viewTemplate": "single-screen format"" is defined to indicate that an app screen is displayed in a single-screen format.

The default parameter 1207 defines parameter information that the developer does not enter parameter values in the app screen. Said differently, in the "parameter information" setup field 6520 of the application registration screen G500 illustrated in FIG. 14, the parameter information in which the "select" setup item was not checked is defined in the default parameter 1207. In the example illustrated in FIG. 16, the parameter information of the parameter name "language" defined in the detailed processing name "detail 0" (i.e., detailed process definition processing definition 1110 in FIG. 8) is defined to be set to "English" as the default parameter value.

Thus, the default parameter 1207 defines the parameter information in which the parameter value is set by default. In other words, the default parameter 1207 defines parameter information that the developer does not set the parameter value.

The user input parameter 1208 defines the parameter information in which the parameter value is input by the developer on the app screen. Said differently, parameter information with a check of the setup item "select" is defined in the user input parameter 1208 is defined in the "parameter information" setup field G520 of the application registration screen G500 illustrated in FIG. 14.

In the example illustrated in FIG. 16, an input definition 1218 is defined that indicates that the parameter value of the parameter name "from" defined in the detailed processing name "detail1" (i.e., the detailed process definition 1120 in FIG. 8) is input by the developer. Similarly, an input definition 1228 is defined to indicate that the parameter value of the parameter name "to" defined in the detailed processing name "detail1" (i.e., the detailed process definition 1120 in FIG. 8) is input by the developer.

Similarly, an input definition 1238 is defined to indicate that the parameter value of the parameter name "address" defined in the detailed processing name "detail2" (i.e., the detailed process definition 1130 in FIG. 8) is input by the developer.

As described above, parameter information in which the developer inputs parameter values is defined in the app screen of the user input parameter 1208.

As described above, the app setup information 1200 defines display information (e.g., titles) displayed on the app screen, input items (items for entering or selecting parameter values) on the app screen, and input methods for the input items. Further, the app setup information 1200 defines parameter information in which the parameter value is set by default (i.e., parameter information in which the parameter value is not input or selected on the app screen).

When the web application of the browser 310 creates the app setup information 1200, the communication unit 311 transmits the application registration request to the application registration unit 142 of the portal service unit 140 (step S811).

The application registration request includes the app setup information 1200 created in step S810.

In step S812, the application registration unit 142 of the portal service unit 140 receives the application registration request and transmits the registration request to the app administering unit 111 of the input output service processing unit 110.

In step S813, the app administering unit 111 of the input output service processing unit 110 registers an application in receipt of an application registration request. The app administering unit 111 returns the registration result to the browser 310.

Said differently, the app administering unit 111 stores the app setup information 1200 included in the application registration request in the app information memory unit 150 in association with the app ID. Accordingly, the app information 1000 including the app setup information 1200 and the process flow information 1100 of the flow name defined in the flow name 1205 of the app setup information 1200 are registered in the service providing system 10.

Accordingly, in the information processing system 1 according to this embodiment, the developer can register the application with the service providing system 10 using the PC terminal 30. Further, in the information processing system 1 according to this embodiment, the developer can easily register the application (app information 1000) by setting, for example, the flow name and the parameter information of each component using the PC terminal 30.

Accordingly, in the information processing system 1 according to the this embodiment, even an administrator (e.g., a planning officer) of an end user who does not have specialized knowledge or experience in a programming language, for example, can register an application (app information 1000) that provides various services.

<Flow Registration>

Next, the screen at the time of flow registration and the operation of the developer will be described with reference to FIG. 17. FIG. 17 illustrates an example of a process flow setup screen G800 displayed by the display control unit 313 of the browser 310 of the PC terminal 30. The process flow setup screen G800 mainly has a flow name input field 401, an output type field 402, a component list field 403, and a component setup field 404.

The flow processing name input field 401 illustrates the name of the flow process. If the developer creates a new flow process, the developer enters the name of the flow process as appropriate. When the developer edits a flow process that has already been created, the name of the flow process that was registered at the time of creation is displayed. The output type field 402 lists the types of data (binaries, text, etc.) that the process flow outputs and allows the developer to select.

The component list field 403 lists the components that can be configured for process flow. Said differently, each component of the component list field 403 is set to the process flow at the developer's option. The component list field 403 displays the component's icons and names. Each component is categorized into "Service," "Document," "System," and "Dev" by tab 403a. The "service" refers to components that use external services such as mail transmission file uploading files, while "Document" refers to components that process documents such as PDF conversion and OCR, and "s" refers to system components. "All" is a tab that displays a view of the components without categorizing them.

The component setup field 404 is a field in which the developer arranges the component's icons 340a-340d. The icon 340a represents a component of the storage service referred to as "external storage service A", and the icon 340b represents a component of the storage service referred to as "external storage service B". The icon 340c represents a component of the service that converts to PDF, and icon 340d represents a component of the service called Bates stamp (which sets the Bates number).

The component setup field 404 is separated like a grid and displays one component in one partition 350. The components set for multiple partitions 350 in the row direction are one process flow. Because a process flow with multiple transverse processes is performed in the left-to-right order, the order of components arranged left-to-right in one row of partition 350 indicates the order in which each component is executed.

The rules for arranging of components by the browser 310 (web application) of the PC terminal 30 are as follows. It is the arranging operation of the components that the developer selects (clicks or taps) from the component list field 403 using the pointing device 320 and selects (clicks or taps) the partition 350 of the component setup field 404 on the pointing device 320.

(i) The display control unit 313 arranges the components of each row in a left-aligned fashion.

(ii) If the developer arranges the component in the partition 350 in which the component is not yet arranged, the display control unit 313 arranges the component in the partition 350 (displays).

(iii) If the developer arranges the component in a partition 350 in which the component is already arranged, then if the operation (described below) of the component intended to be arranged in the same partition 350 is the same as the component already arranged, the display control unit 313 arranges the component intended to be arranged in the partition 350 downward adjacent to the partition 350.

This causes the two components to be grouped together. Two components arranged in two partitions 350 adjacent up and down are called a component group. Each component in the component group is executed in the same order. Strictly either only one runs, or if both runs, either runs first (e.g., the upper component runs first). However, the order of execution within the process flow is treated as the same.

If the operation of the component already arranged is different from that of the component intended to be arranged in the partition 350 in which the component is arranged, the display control unit 313 arranges the component intended to be arranged in the same partition 350 in no partition.

However, it may be arranged in the downward partition 350 without grouping. An error message may also be output.

(iv) In a case where a component group is set, the display control unit 313 of the PC terminal 30 indicates that it is a component group.

Said differently, it indicates that more than one component has been set in the same order. For example, two partitions 350 are displayed while being surrounded by a frame 330. Alternatively, the partition 350 may be colored with the same background or may be accompanied by the same mark indicating that it is the component group adjacent to the components of the two partitions. The frame 330 displays icons for multiple external services while mutually associating these. In a case where the operation of the components is the same, the PC terminal 30 displays icons collectively using the frame 330, or displays icons together in one partition 350, thereby enabling the user to understand that the frame 330 is caused to associate multiple external service icons.

As described above, when the developer selects (clicks or taps) the components of "external storage service B" in component list field 403 (an example of the first process) using the pointing device 320 and selects (clicks or taps) the components of "external storage service A" in component setup field 404 (an example of the second process) using the pointing device 320, as illustrated in FIG. 17, the component groups of "external storage service B" and "external storage service A" are created.

The process flow of FIG. 17 is performed as follows.

(i) File download (external storage service A) or file download (external storage service B)

(ii) PDF conversion (iii) Setup of Bates number

In a case where the PDF conversion and the setup of Bates number are common and the storage service that downloads the file is different, it is sufficient that the developer adds only a component corresponding to a different component. Therefore, the developer's burden can be reduced. The end user can set which storage service is to be used.

When a component group is created, the developer may drag and drop the component in the component list field 403 into the partition 350 of a component setup field 404 (the component has already been arranged).

Also illustrated in FIG. 17 is the partition 350, but because partition 350 is intended to assist the developer's operation, partition 350 may not be used. The partition 350 may be circular or polygonal rather than rectangular.

Next, an operation will be described in accordance with FIG. 18. FIG. 18 is an example of a diagram illustrating attributes of the component. FIG. 18 illustrates a portion of the attributes each component has. The attributes include, for example, a component ID, a component name, an operation, and a category, as well as a component creation date and time, an icon, and the like.

The component ID is identification information for identifying or specifying each component. The component name is the name of the component displayed in the component list field 403. Operation is the content of the process of the component. For example, postFile means uploading of an electronic file, convert means the content of the process of converting, and send means the content of the process of sending. Categories are described with reference to FIG. 17.

The components having the same operations illustrated in FIG. 18 performs the same process contents. Therefore, the browser 310 of the PC terminal 30 can be a component group, if the developer request so. The attributes of each component are stored in the portal screen information 3000 and transmitted from the UI providing unit 141 to the browser 310 of the PC terminal 30.

Figure 19:
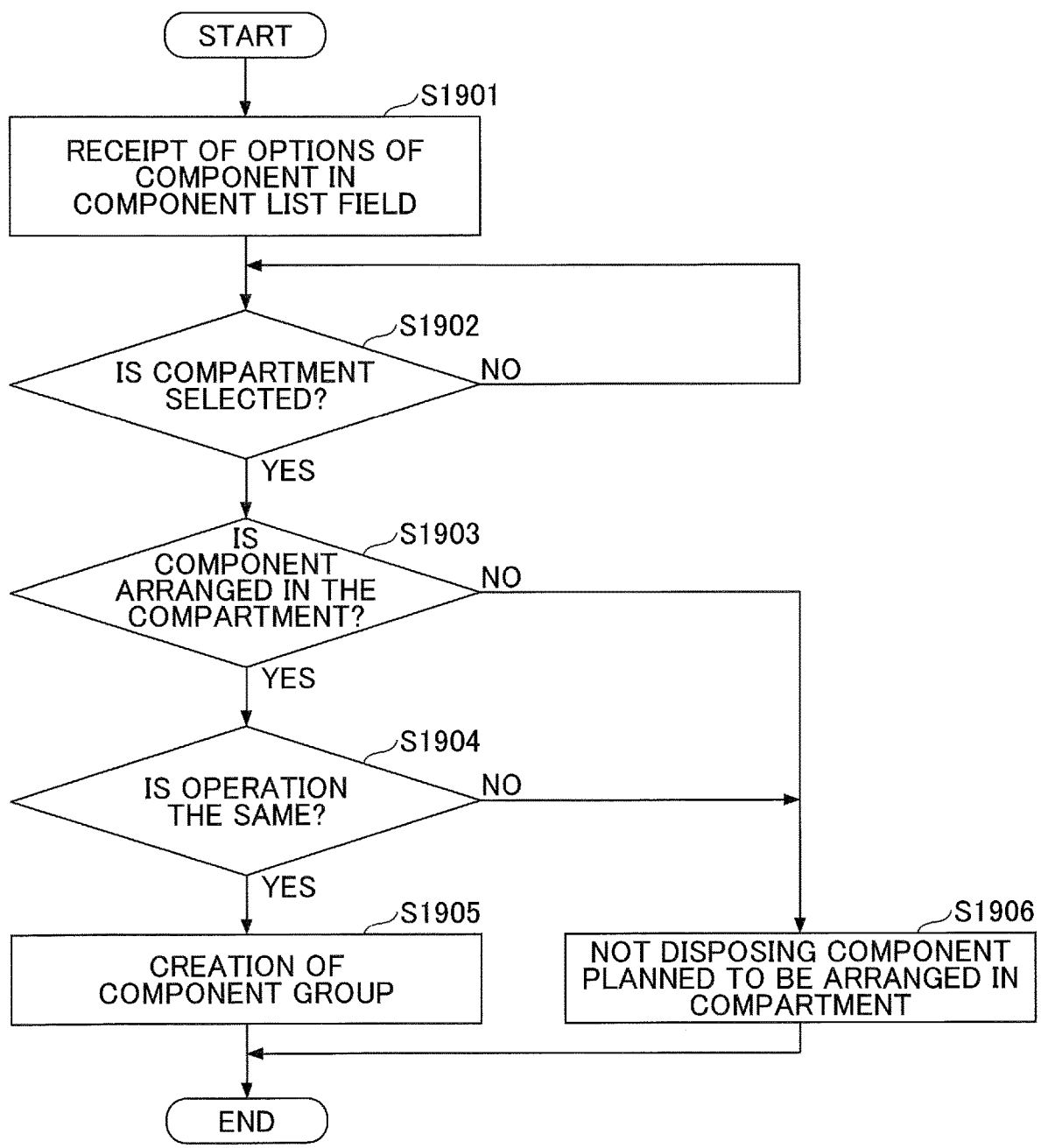
FIG. 19 is an example of a flowchart diagram illustrating a procedure in which a browser of a PC terminal receives an arrangement of a process flow.

FIG. 19 is an example of a flowchart illustrating a procedure in which a browser 310 of the PC terminal 30 receives the arrangement of the process flow. The process illustrated in FIG. 19 is performed when the "Update" button G421 or the "New" button G422 is pressed on the application registration screen G400 illustrated in FIG. 13 and the process flow setup screen G800 illustrated in FIG. 17 is displayed.

The operation reception unit 312 of the browser 310 of the PC terminal 30 receives the selection of a component from the component list field 403 (S1901).

Next, the operation reception unit 312 determines whether the partition 350 has been selected (step S1902). After the component has been selected in the component setup field 403, the component setup field 404 determines whether the partition 350 has been selected.

When the determination of step S1902 is Yes, the determination unit 314 of the PC terminal 30 determines whether a component has already been arranged in the selected partition 350 (step S1903).

When the determination of step S1903 is Yes, the determination unit 314 of the PC terminal 30 determines whether the operation of the component selected in the component list field 403 is the same as that of the component already arranged in the selected partition 350 (step S1904).

When the determination of step S1904 is Yes, the flow creation unit 315 of the PC terminal 30 creates a component group (step S1905). In other words, this process flow is determined to include not only the first line but also the second line components, and the two components arranged up and down are set in the same order. However, the process flow information 1100 may be described to have the above order. The display control unit 313 surrounds the partition 350 up and down adjacent to each other with the frame 330.

In a case where it is determined to be No in step S1903 or step S1904, the display control unit 313 of the PC terminal 30 does not arrange the component that the developer intended to arrange in the partition 350 (step S1906). The components may not be arranged in either partition 350 or in the lower partition selected from among the partition 350 by the developer in step S1901. However, because no component group is created, no frame 330 is displayed. In this case, the display control unit 313 of the PC terminal 30 may display an error message. It may also display a list of components having the same processing content as those already arranged in the selected partition 350.

As described above, because the browser 310 of the PC terminal 30 determines as if these components belong to the same operation, the developer does not accept erroneous operations even if the developer attempts to create the component group using two different components.

Figure 20A:
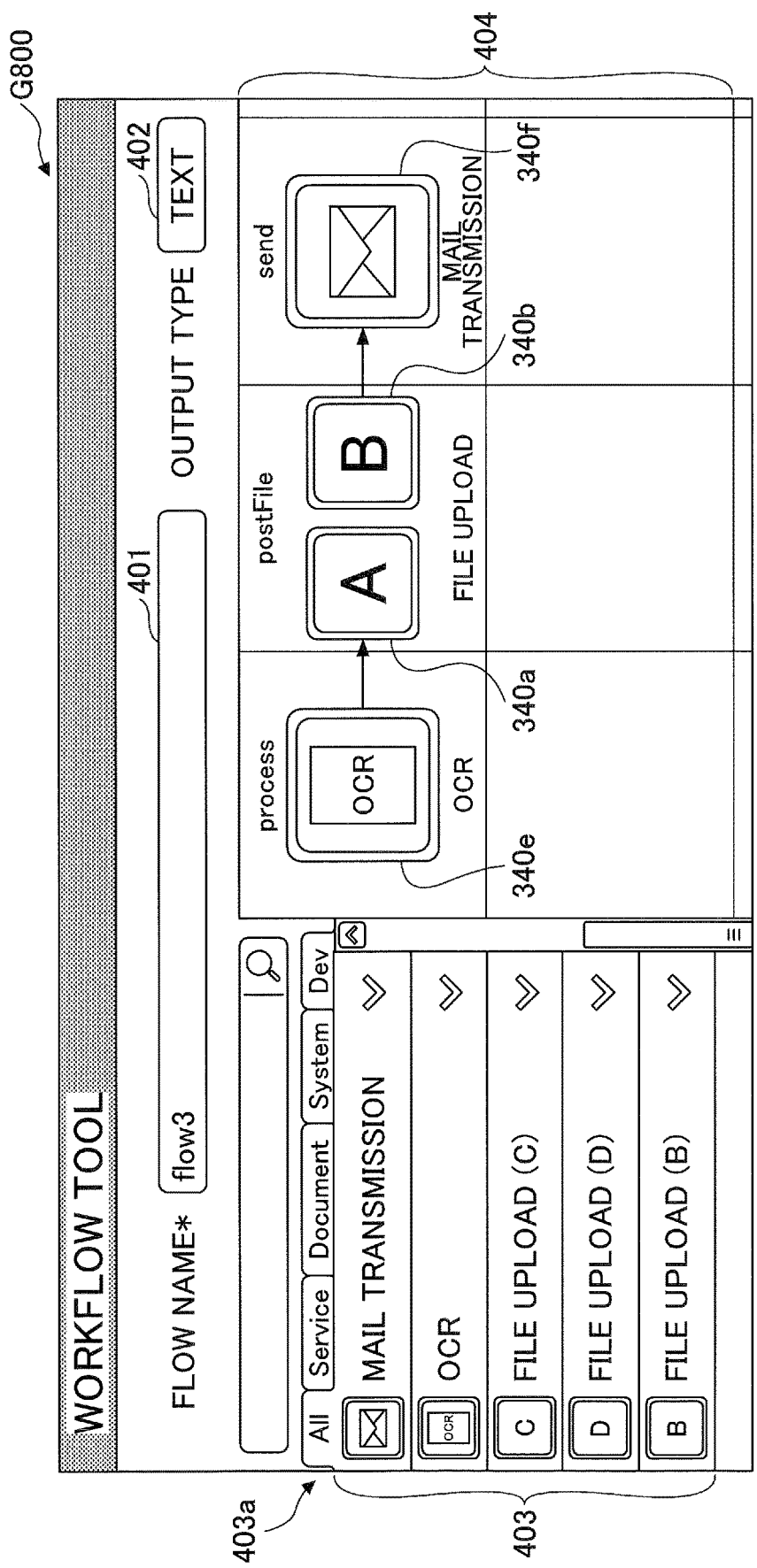
FIGS. 20A and 20B illustrate examples of a process flow setup screen displayed by the browser of the PC terminal.
Figure 20B:
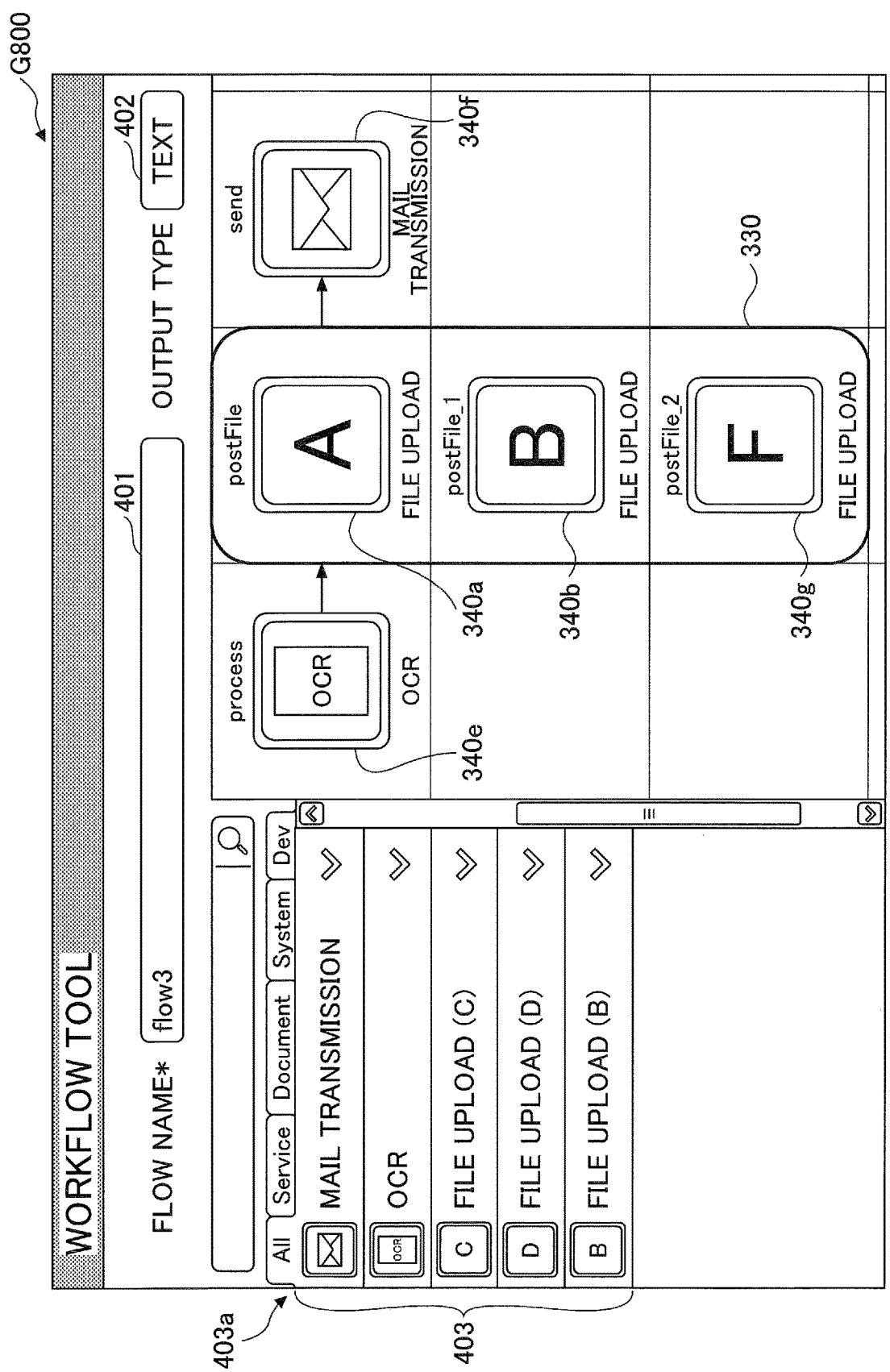

Referring to FIGS. 20A and 20B, another example of a component group will be described in the process flow setup screen G800. FIGS. 20A and 20B are an example of a process flow setup screen G800 displayed by a browser 310 of the PC terminal 30. In FIG. 20A, an icon 340e of the component of the "OCR" is arranged in the first partition 350 from the left, and the component of the two storage services (icons 340a, 340b) of the component group are reduced and stored horizontally in the second partition 350. The icon 340f of the "Mail transmission" component is arranged in the third partition 350.

Said differently, by displaying multiple components in one partition 350, the developer can confirm that the component group has been created.

Multiple components of one partition 350 may be stored up and down.

FIG. 20B illustrates an example of a group of at least three components. Referring to FIG. 20B, three components are arranged vertically and surrounded by a frame 330. Said differently, at the bottom of the second partition 350 from the left is an icon 340g of the component of the file upload. Three components of file upload (icons 340a, 340b, and 340g) are one component group.

The method of grouping at least three components is the same as described above. However, the developer may select either of the two components already arranged in the partition 350 on the pointing device 320.

A group of components containing at least three components may also be arranged with a reduced component in one partition 350 as illustrated in FIG. 20A.

In this case, because the icon of one component becomes small, the display control unit 313 may automatically switch to the vertically aligned form illustrated FIG. 20B when the number of components of one partition 350 is greater than or equal to a predetermined number. The display control unit 313 may also switch the display of FIG. 20A and the display of FIG. 20B depending on the operation of the developer (e.g., a click or tap of the partition 350).

Figure 21:
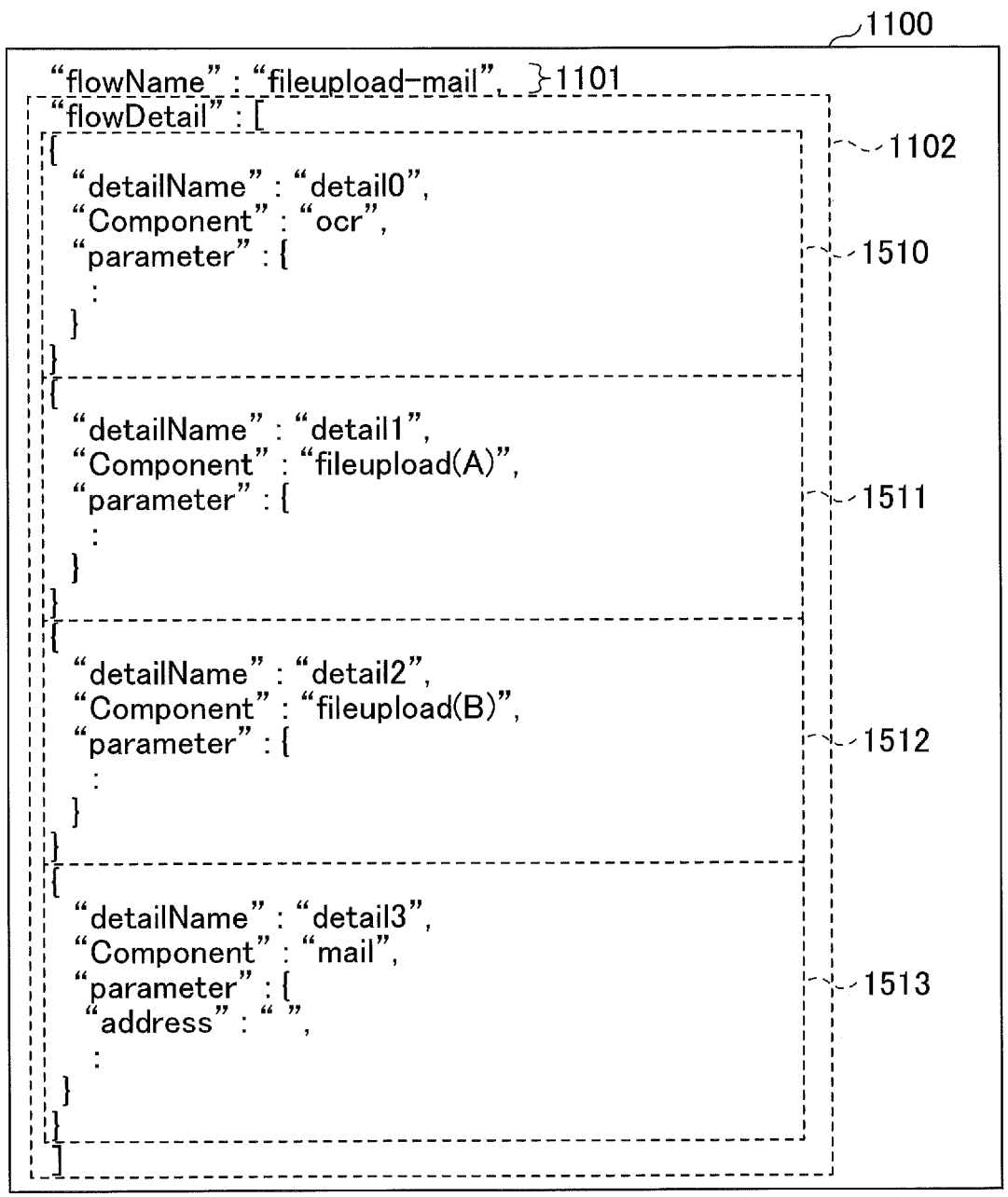
FIG. 21 is an example of process flow information for a process flow that includes the component group.

FIG. 21 is an example of a process flow information 1100 for a process flow that includes the component group. FIG. 21 illustrates the process flow information of the process flow including the group of components created as in FIG. 1. The process flow information and variable names in FIG. 8 are the same. Because FIG. 1 contains four components, it contains information about four components, i.e., detail0 (1510)-detail3 (1513).

From among the information, detail1(1511) corresponds to a grouped file upload (external storage service A) component, and detail2(1512) corresponds to a file upload (external storage service B) component.

Thus, even if some components of the process flow are grouped, the process flow information may be described in the order in which the process is performed. Because any one of the processes of the group of components may be performed first, either component may be described earlier. As will be described later, components that were not selected by the end user is executed.

<End User Operation>

Next, the operation performed by the end user is described. The end user actually executes the application registered by the developer in the day-to-day operation.

Here, there are two types of applications: shared apps and individual apps. Cloud services, such as the workflow services provided by information processing system 1, have the concept of tenants, and each tenant subscribes to a cloud service. The tenants are customers of cloud services. Further to being a tenant on a company-by-company basis, a tenant may be a tenant with a variety of grain sizes, such as a department or group.

Applications commonly used by end users belonging to this tenant are shared apps. Applications individually used by end users belonging to the tenant are individual apps.

Some applications use services (components) that require authentication. For example, a storage service for uploading files or downloading files. For this reason, the information to be set by the end user is different between the shared application and the individual application.

Individual apps are used by end users individually, and therefore end users using storage services are defined uniquely. In a case of the shared app, the end user sets the account of which end user from among the end users belonging to the tenant uses the storage service.

When a component group is created by file uploading or file downloading as in this embodiment, regardless of whether it is the shared app or the individual app, the end user sets which component (storage service) is used.

The end user performs the above setup for the application registered in the app information memory unit 150. The shared app or the individual app is set to be identified by the app setup information 1200. Further, the developer can set it on any of the screens illustrated in FIGS. 11 to 15.

Figure 22:
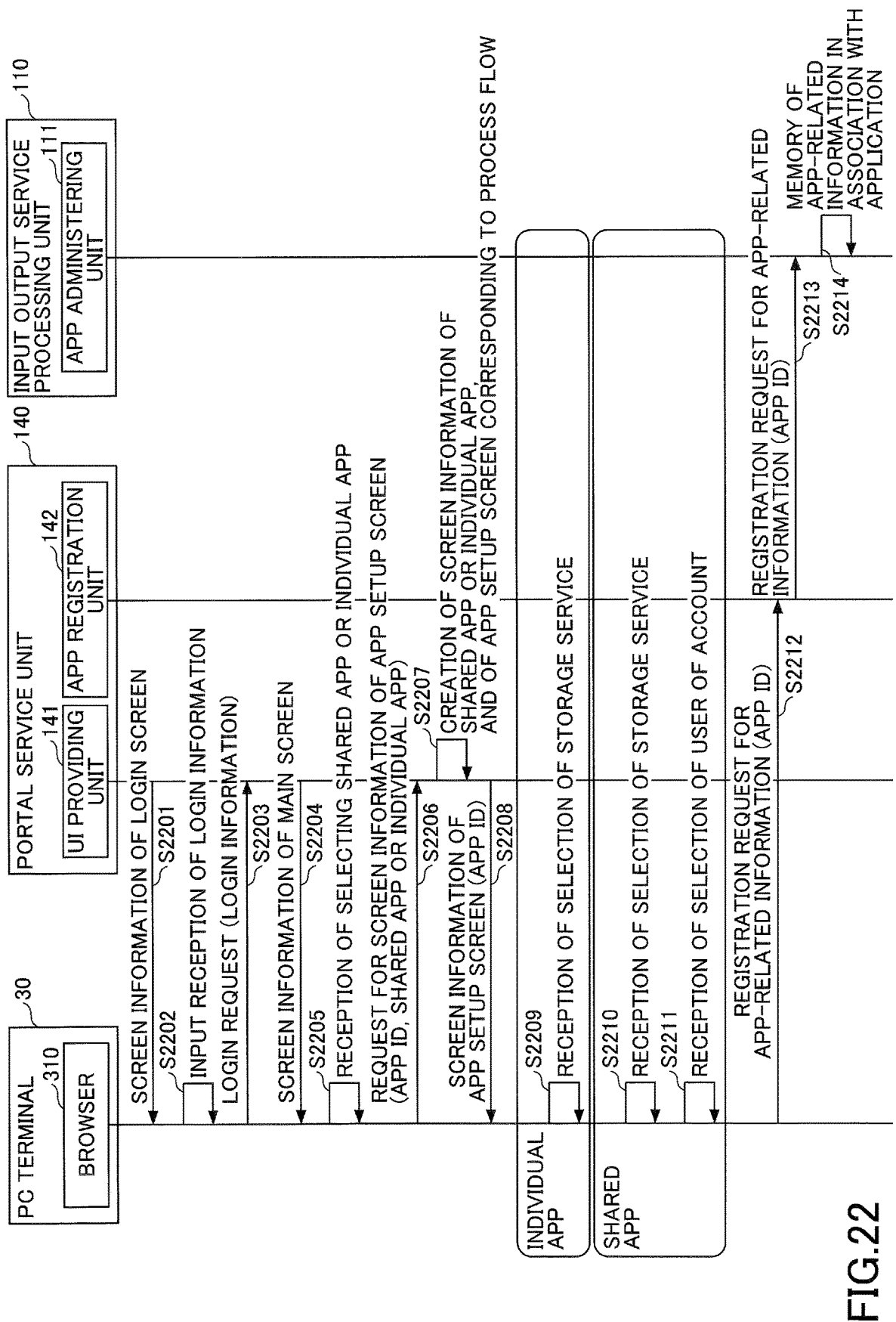
FIG. 22 is a sequence diagram illustrating an example of a setup procedure performed by an end user for an application registered in an app information memory unit.

FIG. 22 is a sequence diagram illustrating an example of a setup procedure performed by the end user for the application registered in the app information memory unit 150.

First, the operation reception unit 312 of the browser 310 of the PC terminal 30 receives an operation for displaying the login screen from the end user, and the communication unit 311 requests the UI providing unit 141 to have a login screen. In step S2201, in response to this request, the UI providing unit 141 transmits the screen information of the login screen to the browser 310 of the PC terminal 30. The end user can display the login screen by inputting the URL of the login screen into the address bar of the browser 310.

Figure 23:
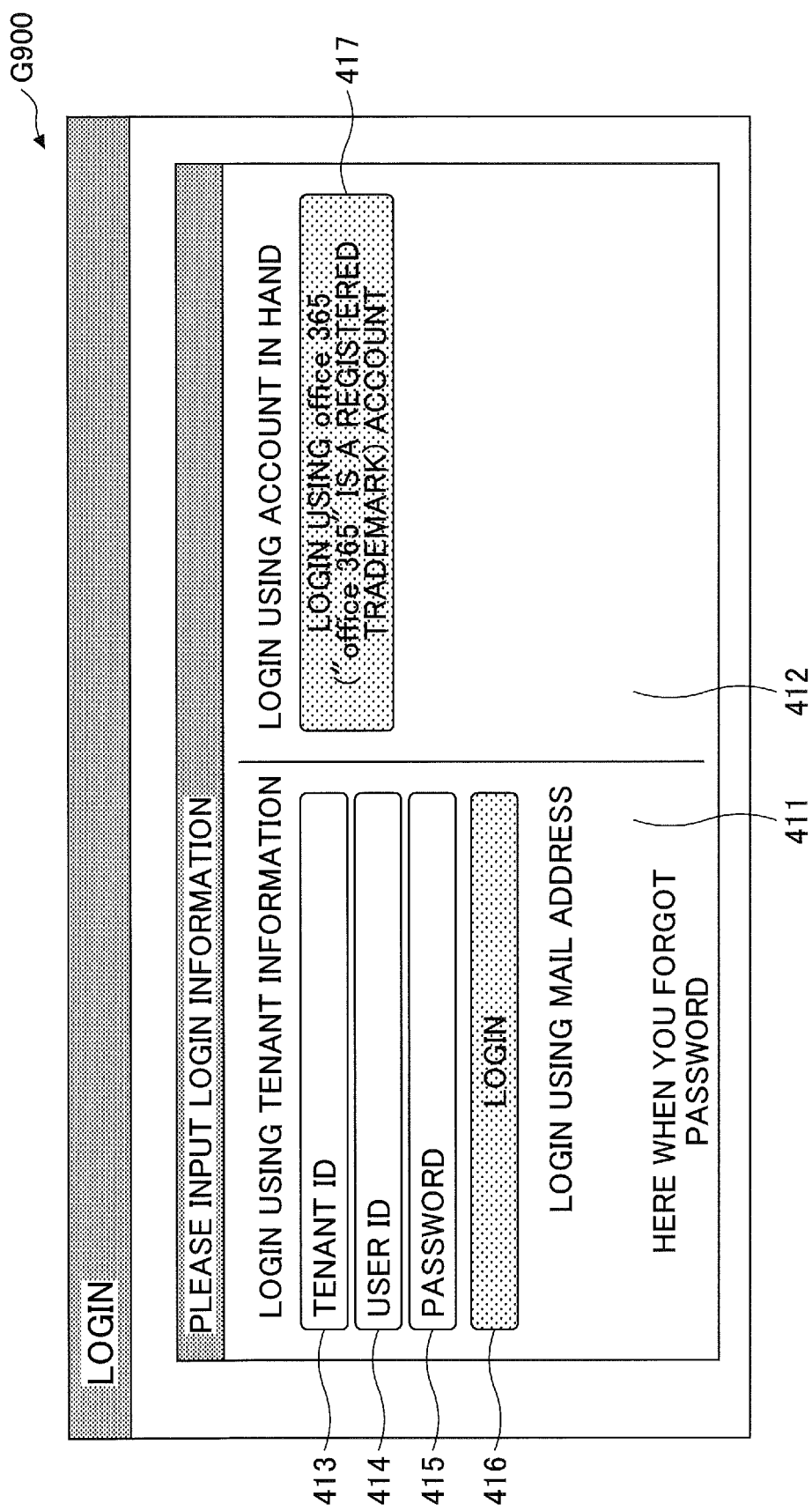
FIG. 23 illustrates an example of a login screen.

The communication unit 311 of the PC terminal 30 receives screen information of the login screen, and the display control unit 313 displays, for example, the login screen illustrated in FIG. 23 based on screen information of the login screen.

FIG. 23 illustrates an example of the login screen. The login screen G900 has a tenant login field 411 and a user account login field 412. The tenant login field 411 is a field for the end user to log into the account of the service providing system 10, and the user account login field 412 is a field for the end user to log in using OAUTH authentication.

The tenant login field 411 further includes a tenant ID entry field 413, a user ID entry field 414, a password entry field 415, and a login button 416. The end user enters the identification information of the tenant to which the end user belongs in the Tenant ID entry field 413, enters the end user ID in the user ID entry field 414, and enters the password of the end user in the password entry field 415.

The user account login field 412 has a login button 417 for requesting user authentication from a server (authorization server) providing authentication services.

Referring back to FIG. 22, an explanation will be given. Because the end user enters login information is entered in the login screen, the operation reception unit 312 of the PC terminal 30 receives the input of login information. In step S2203, the communication unit 311 of the PC terminal 30 transmits a login request together with the login information to the portal service unit 140. In a case of the OAUTH authentication, the communicate is with the specified authorization server. Referring to FIG. 22, a successful login is described.

Because the login is successful, in step S2204, the UI providing unit 141 transmits the screen information of the main screen to the browser 310 of the PC terminal 30.

Figure 24:
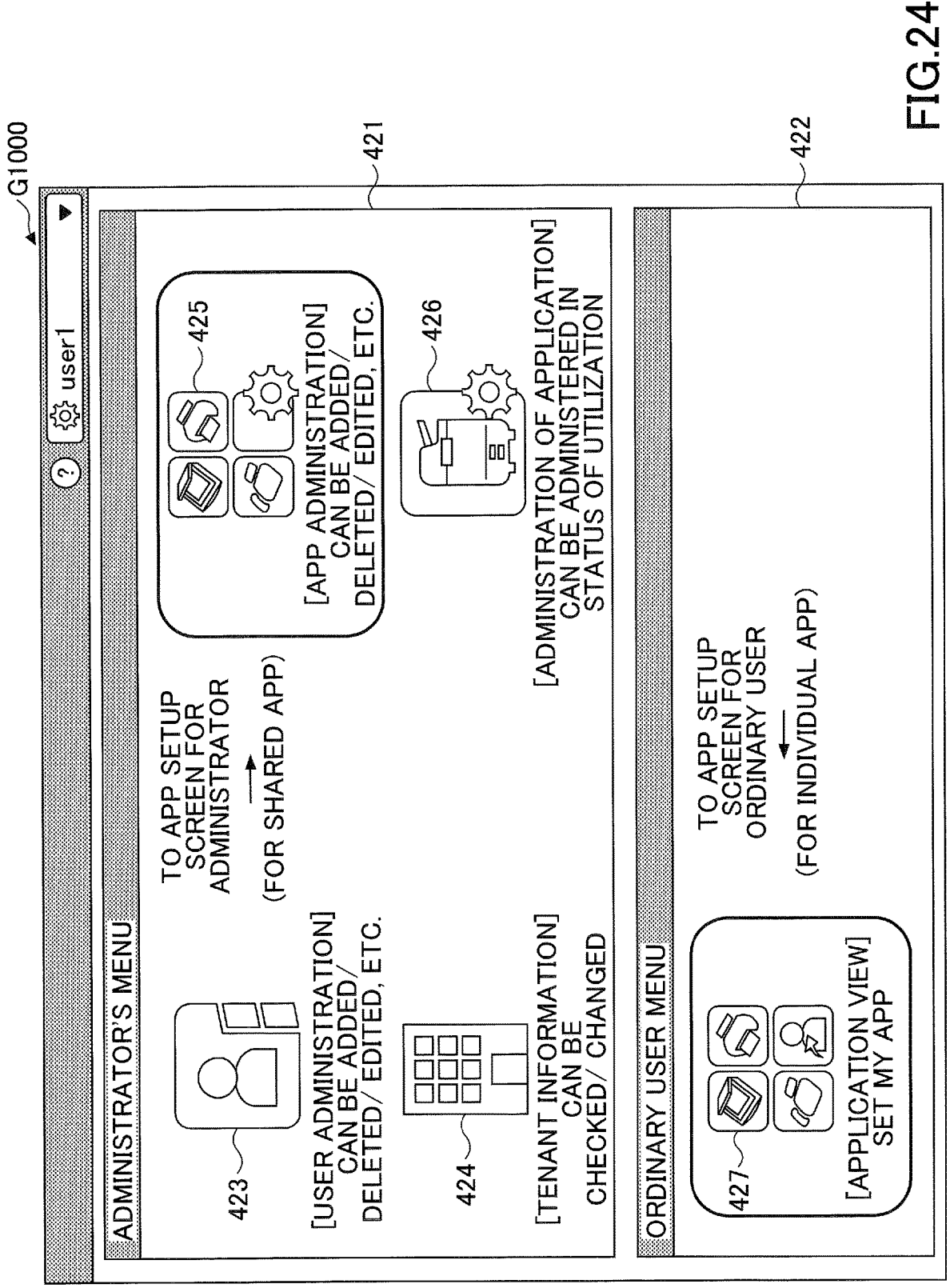
FIG. 24 illustrates an example of a main screen.

The communication unit 311 of the PC terminal 30 receives the screen information of the main screen and the display control unit 313 displays, for example, the main screen illustrated in FIG. 24 based on the screen information of the main screen.

FIG. 24 illustrates an example of a main screen. The main screen G1000 displays and end-user administrator menu 421 and a general user menu 422. The end-user administrator menu 421 is a menu used by the end-user administrator. The end-user administrator refers to a person who makes various setups so that the end-user can use the service-providing system 10. The end-user administrator also sets the shared application. "General user" means an end user other than an administrator or a person who routinely uses the apparatus 20.

The administrator menu 421 includes a user management icon 423, a tenant management icon 424, an application management icon 425, and a device management icon 426. The user management icon 423 is an icon for accepting the browser 310 of the PC terminal 30 for adding, deleting, and editing information about the end user (e.g., name, mail address, user ID, password, etc.). The tenant management icon 424 is an icon that allows the browser 310 of the PC terminal 30 to add, delete, and edit information about the tenant (tenant name, tenant ID, administrator, tenant password, contract content, etc.). The application management icon 425 is an icon that allows the browser 310 of the PC terminal 30 to accept the addition, deletion, and editing of information (application configuration information) relating to the application. The device management icon 426 is an icon that allows the browser 310 of the PC terminal 30 to accept the display of device-related information (e.g., how many applications were used in the device, by whom, etc.). The administrator clicks the application management icon 425 to set up the shared application.

The general user menu 422 includes an application list icon 427. The application list icon 427 is an icon for viewing the browser 310 of the PC terminal 30 in the list of individual applications of the logged-in end user. To set the settings for the individual application, the general user clicks the application list icon 427.

Referring back to FIG. 22, an explanation will be given. In step S2205, the administrator clicks the application management icon on the main screen and the general user clicks the application management icon. The operation reception unit 312 of the PC terminal 30 receives these presses. Accordingly, because the communication unit 311 of the PC terminal 30 receives a list of applications that can be used by a general user or an administrator, the display control unit 313 displays a list of applications. The general user or administrator selects this application to configure an application with the component group. The operation reception unit 312 of the PC terminal 30 receives an operation for selecting the application.

In step S2206, the communication unit 311 of the PC terminal 30 designates the selected app ID according to the operation of the end user and requests screen information on the app setup screen of the shared application or the individual application.

The UI providing unit 141 receives a request for screen information of the app setup screen. In step S2207, the UI providing unit 141 generates screen information depending on whether the application specified by the app ID is the shared application or the individual application. Specifically, because the items that can be set by the end user differ depending on the components included in the process flow, the UI providing unit 141 generates screen information corresponding to the components included in the process flow in both the shared application and the individual application. Further, as illustrated in FIGS. 25 and 26, screen information with a storage account field and screen information without a storage account field are generated.

In step S2208, the UI providing unit 141 transmits the screen information of the app setup screen of the shared application or the individual application to the browser 310 of the PC terminal 30. The communication unit 311 of the PC terminal 30 receives screen information of the app setup screen. When an application setup for the individual app is performed by the general user, step S2209 is performed. When the administrator sets the app for the shared app, steps S2210 and S2211 are performed.

Figure 25:
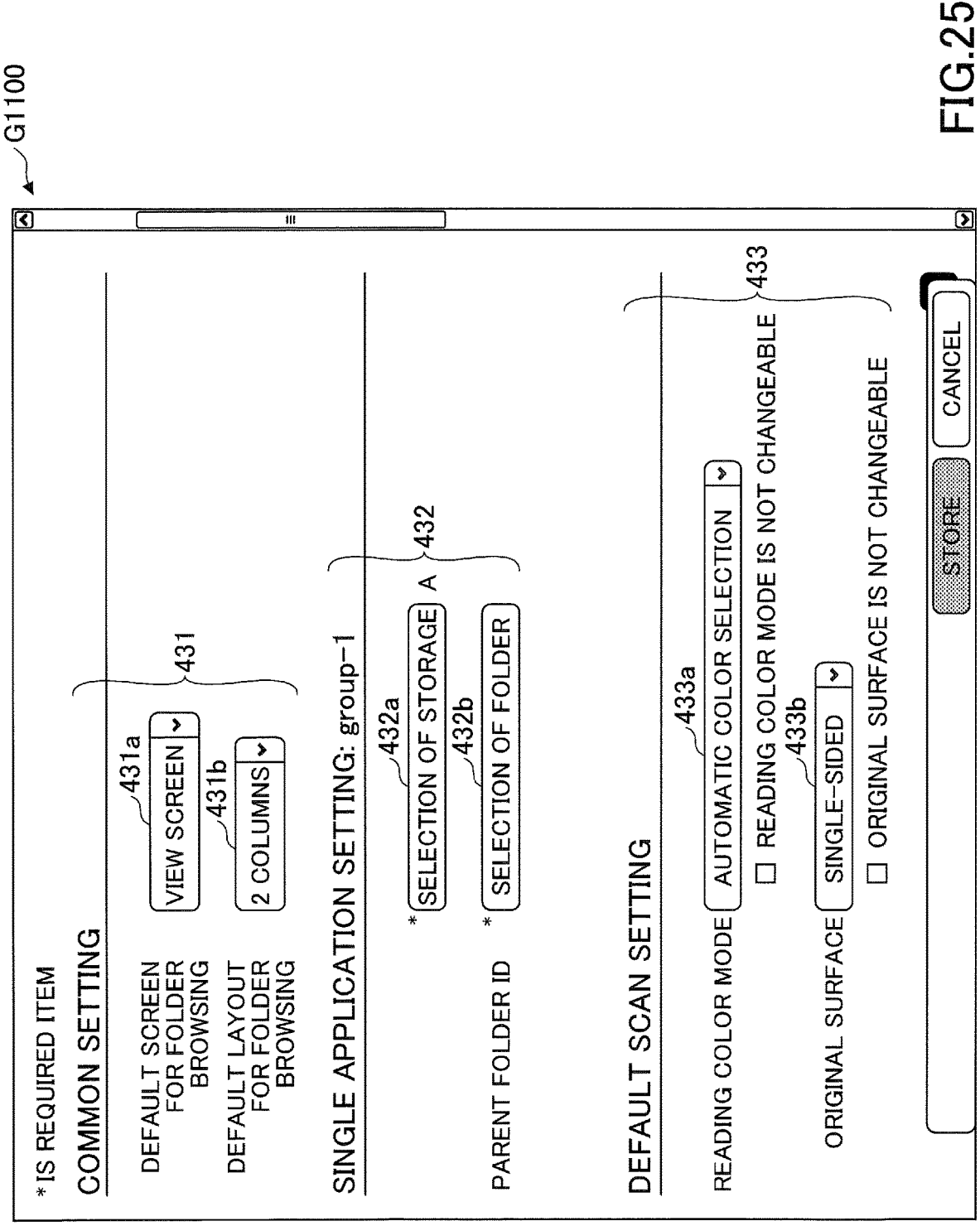
FIG. 25 illustrates an example of an individual app setup screen displayed by a browser of a PC terminal.
Figure 26:
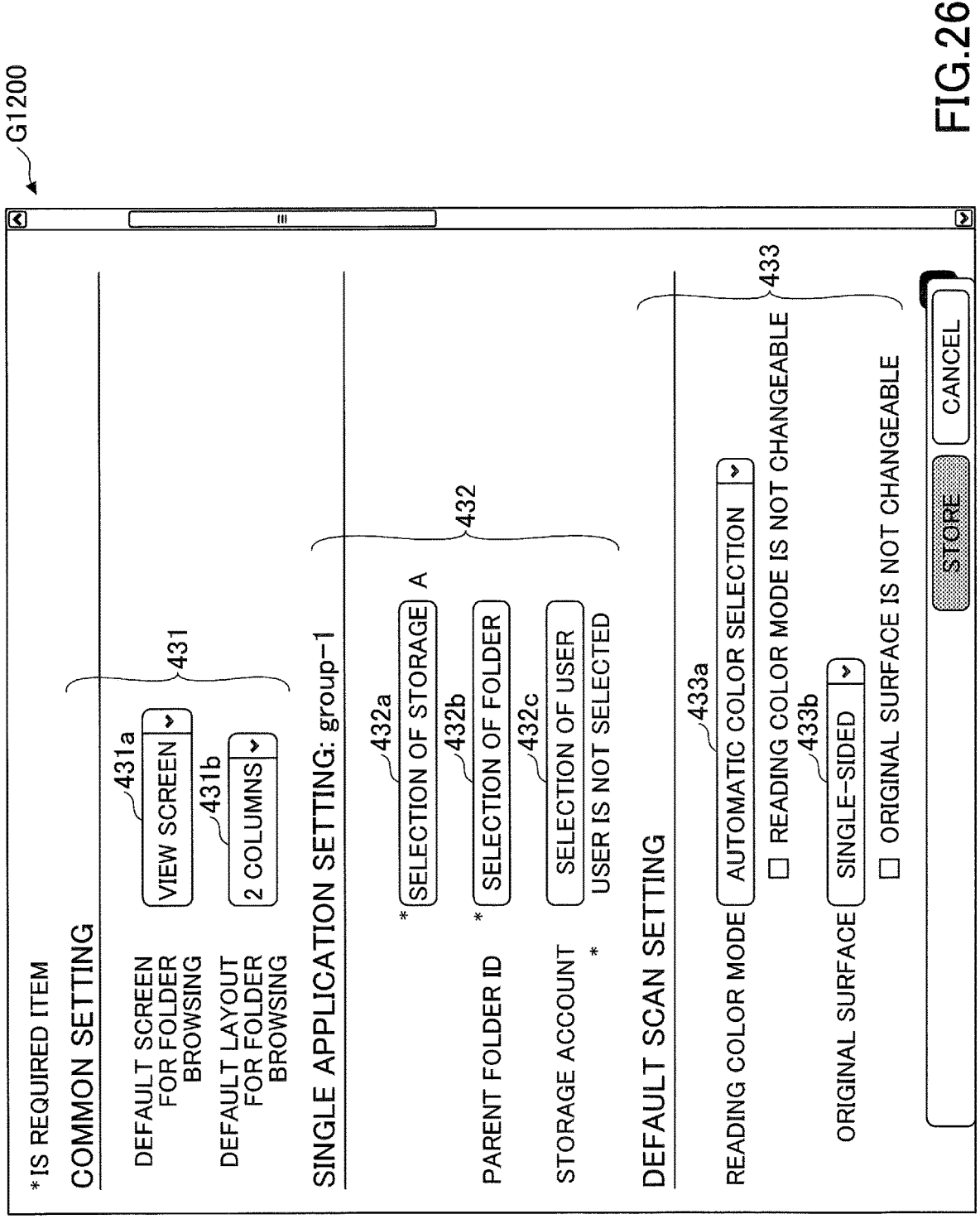
FIG. 26 illustrates an example of an administrator's app setup screen displayed by a browser of a PC terminal.

In step S2209, the communication unit 311 of the PC terminal 30 receives screen information of the app setup screen, and the display control unit 313 displays, for example, the individual app setup screen illustrated in FIG. 25, based on screen information of the app setup screen. In step S2209, the operation reception unit 312 of the PC terminal 30 receives a selection of the storage service in order for a general user to select the storage service used in the process flow.

FIG. 25 illustrates an example of an individual app setup screen G1100 displayed by the browser 310 of the PC terminal 30. The individual app setup screen G1100 includes a shared setup field 431, a single application setup field 432, and a default scan setup field 433. The shared setup field 431 further includes a default screen setup field 431a of the folder browse and the default layout setup field 431b of the folder browse. In the default screen setup field 431a of the folder browse, a list screen for displaying a list of folders and a hierarchical display for displaying a folder along with a file path are set. In the default layout setup field 431b of the folder browse, the layout of the folder is set (e.g., two columns or three columns).

The single application setup field 432 is the field where the end user sets which component (storage service) of the component group is used. The single application setup field 432 has a storage selection field 432a and a folder ID setup field 432b. The storage selection field 432a allows the general user to select one of two storage services in the component group. The folder ID setup field 432b is the input field displayed when the storage service of "external storage service A" is selected. The general user can specify a folder for storing electronic data.

The default scan setup field 433 is the default scan setup when the process flow includes a scan. It has a color mode field 433a and an original image field 433b. Color or monochrome is set in the color mode field 433a, and the original image field 433b is set to have one or both sides of the read-out surface.

Referring back to FIG. 22, an explanation will be given. In step S2210, the communication unit 311 of the PC terminal 30 receives screen information of the app setup screen, and the display control unit 313 displays, for example, an administrator's app setup screen illustrated in FIG. 26 based on screen information of the app setup screen. In step S2210, the operation reception unit 312 of the PC terminal 30 receives a selection of the storage service in order for the administrator to select the storage service to be used in the process flow.

The administrator also determines the account of which end user is used for the storage service. In step S2211, the operation reception unit 312 of the PC terminal 30 receives an account used in the storage service.

FIG. 26 illustrates an example of the administrator's app setup screen G1200 displayed by the browser 310 of the PC terminal 30. In the explanation of FIG. 26, the difference from FIG. 25 will mainly be explained. In the administrator's app setup screen G1200 of FIG. 26, a single application setup field 432 has a storage account field 432c. Even in the shared app, the storage service side needs to set the storage account field 432c in the shared app setup in order to identify the user with one end user account (e.g., e-mail address, an example of account information). In a case of the individual application, the end user logs into the service providing system 10 to execute the individual app, and the end user using the storage service is uniquely defined.

The Administrator sets the user ID of the appropriate end user in the storage account field. This user ID is the identification information for which the storage service identifies the end user.

Referring back to FIG. 22, an explanation will be given. In step S2212, the communication unit 311 of the PC terminal 30 transmits the registration request of the app-related information 1300 set in the app setup screen of FIG. 25 or FIG. 26 together with the app ID to the application registration unit 142.

In step S2213, when the application registration unit 142 receives the registration request of the app-related information 1300, the application registration unit 142 transmits the registration request of the app-related information 1300 to the app administering unit 111.

In step S2214, the app administering unit 111 associates the app-related information 1300 with the application based on the app ID and stores the app information memory unit 150.

<App Setup Screen for Storage Service>

Figure 27:
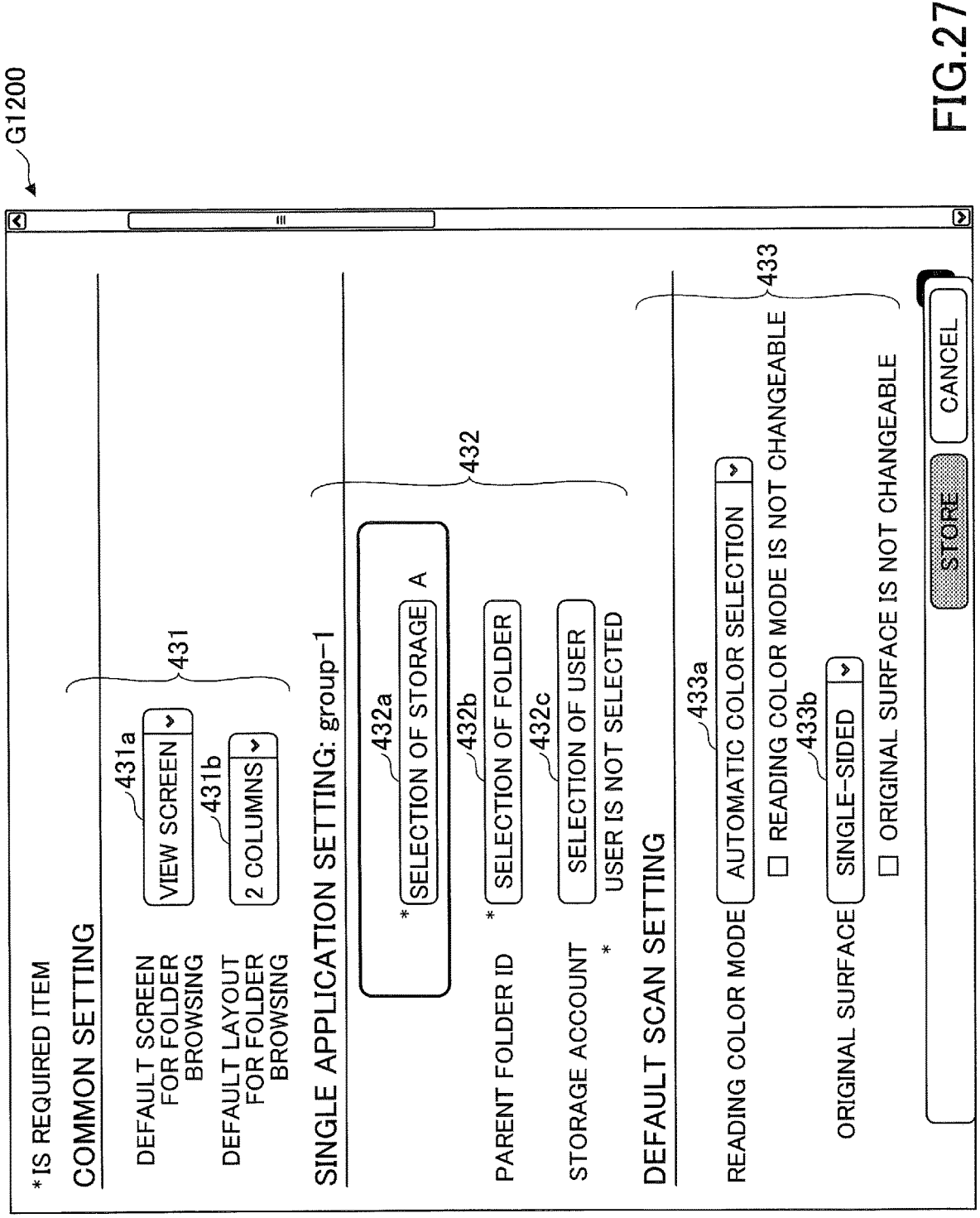
FIG. 27 is an example of a diagram illustrating an administrator's app setup screen when an external storage service A is selected.
Figure 28:
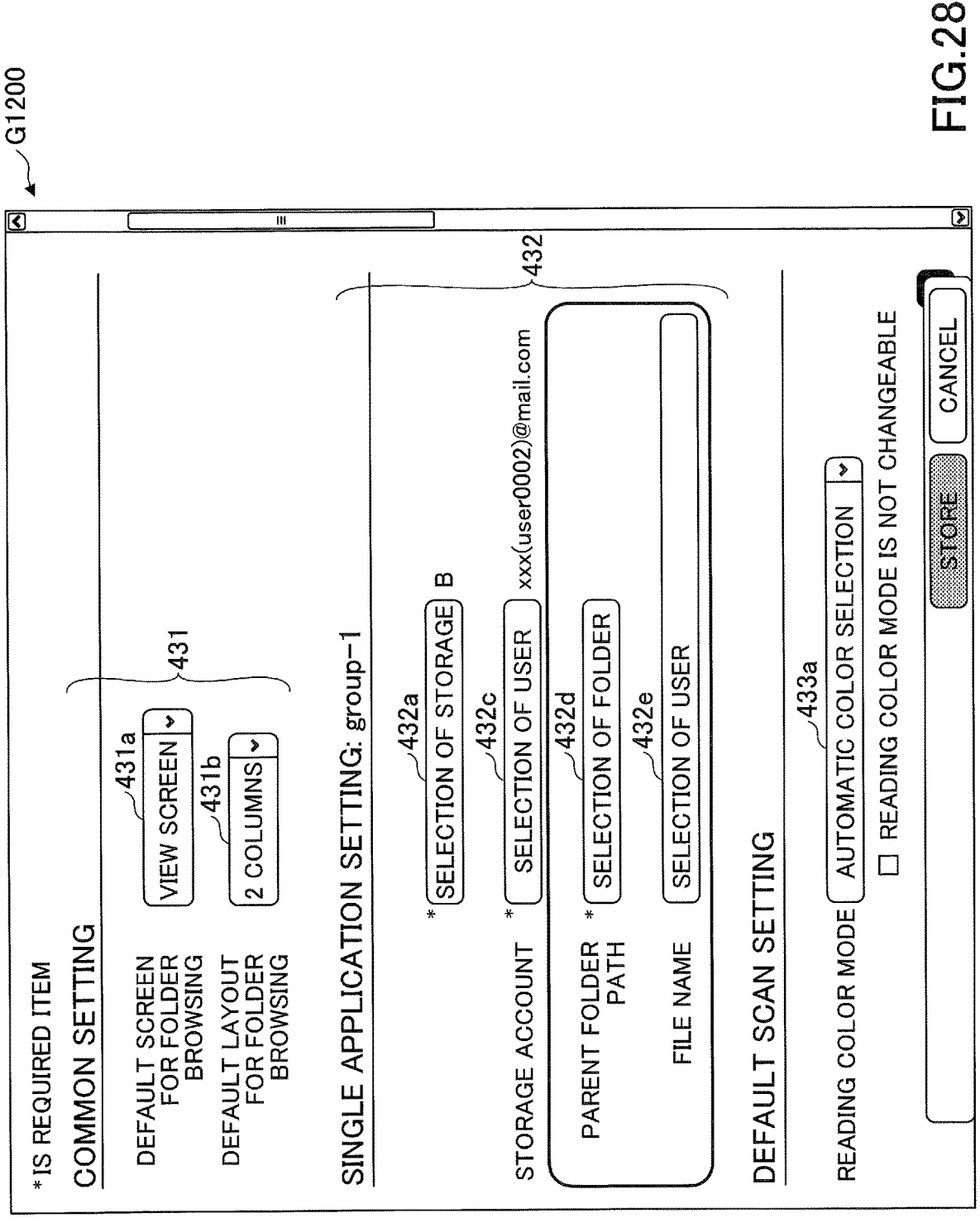
FIG. 28 is an example of a diagram illustrating the administrator's app setup screen when an external storage service B is selected.

In FIGS. 25 and 26, the app setup screen differs depending on whether the individual application or the shared application is used. However, the app setup screen can display items corresponding to the storage service. The display control unit 313 of the PC terminal 30 displays an appropriate item according to the storage service set in the app setup screen. FIGS. 27 and 28 will be used to describe this.

FIG. 27 illustrates an administrator's app setup screen G1200 when the storage service called "external storage service A" is selected, and FIG. 28 illustrates an administrator's app setup screen G1200 when the storage service called "external storage service B" is selected. In both FIGS. 27 and 28, the application is the shared application.

When "external storage service A" is selected as the storage service as illustrated in FIG. 27, the display control unit 313 of the PC terminal 30 does not display any additional items. This is because the "external storage service A" has no option that can be set by the end user. The option of the storage service is, for example, a folder name and file name.

On the other hand, when "external storage service B" is selected as the storage service as illustrated in FIG. 28, the display control unit 313 of the PC terminal 30 does not display any additional item. Referring to FIG. 28, a parent folder path setup field 432d and a file name setup field 432e are newly displayed. Said differently, when the display control unit 313 of the PC terminal 30 detects that "external storage service B" is selected as the storage service, the parent folder path setup field 432d and the file name setup field 432e are displayed. This is because the end user can set these options for the external storage service B. The folder of the electronic file is set in the parent folder path setup field 432d, and the file name of the electronic file is set in the file name setup field 432e.

In this way, because the items are dynamically displayed according to the selected storage service, the end user can set the app-related information just enough.

Figure 29:
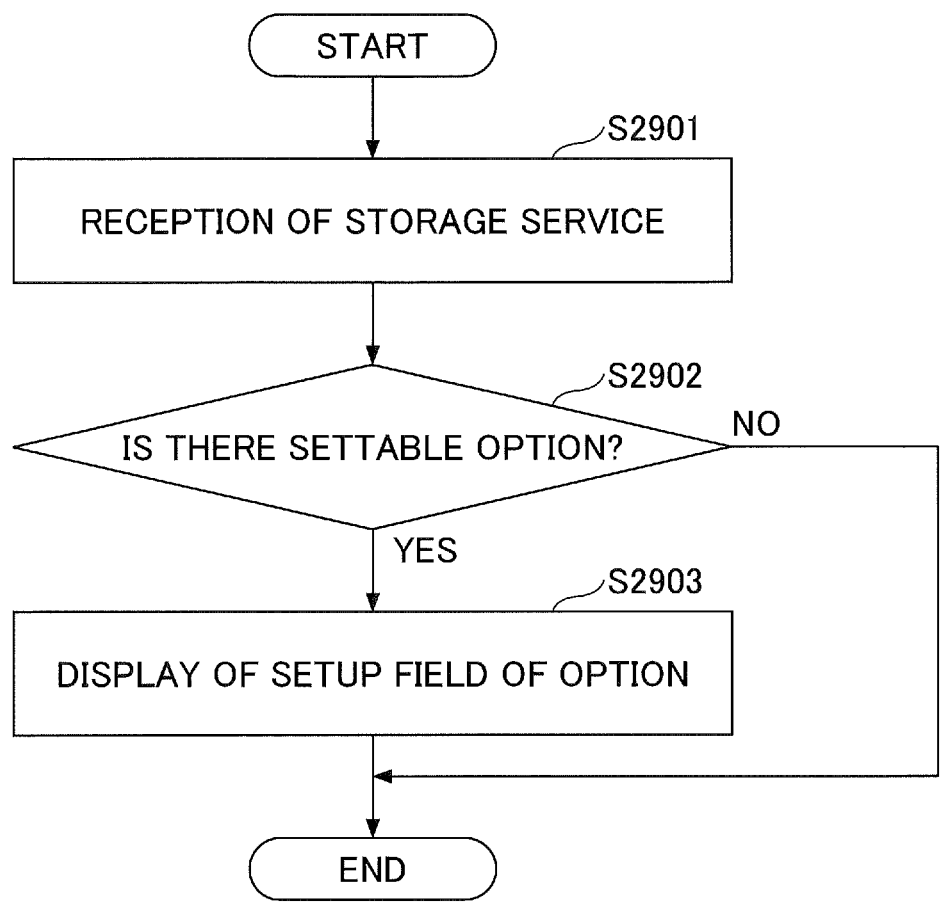
FIG. 29 is an example of a flowchart illustrating a procedure in which the browser of the PC terminal displays additional items.

FIG. 29 is an example of a flow chart diagram illustrating a procedure in which a browser 310 of the PC terminal 30 displays additional items.

The process of FIG. 29 is executed when the app setup screen of FIGS. 25 to 28 is displayed.

First, in step S2901, the operation reception unit 312 of the PC terminal 30 receives a selection of the storage service.

In step S2902, the display control unit 313 of the PC terminal 30 determines whether there are options which can be set for the selected storage service.

When the determination of step S2902 is Yes, in step S2903, the display control unit 313 of the PC terminal 30 displays an option setup field (in the example illustrated in FIG. 28, the parent folder path setup field 432d and the file name setup field 432e).

Such display control is described by the scripting language included in the screen information on the app setup screen.

Figure 30C:
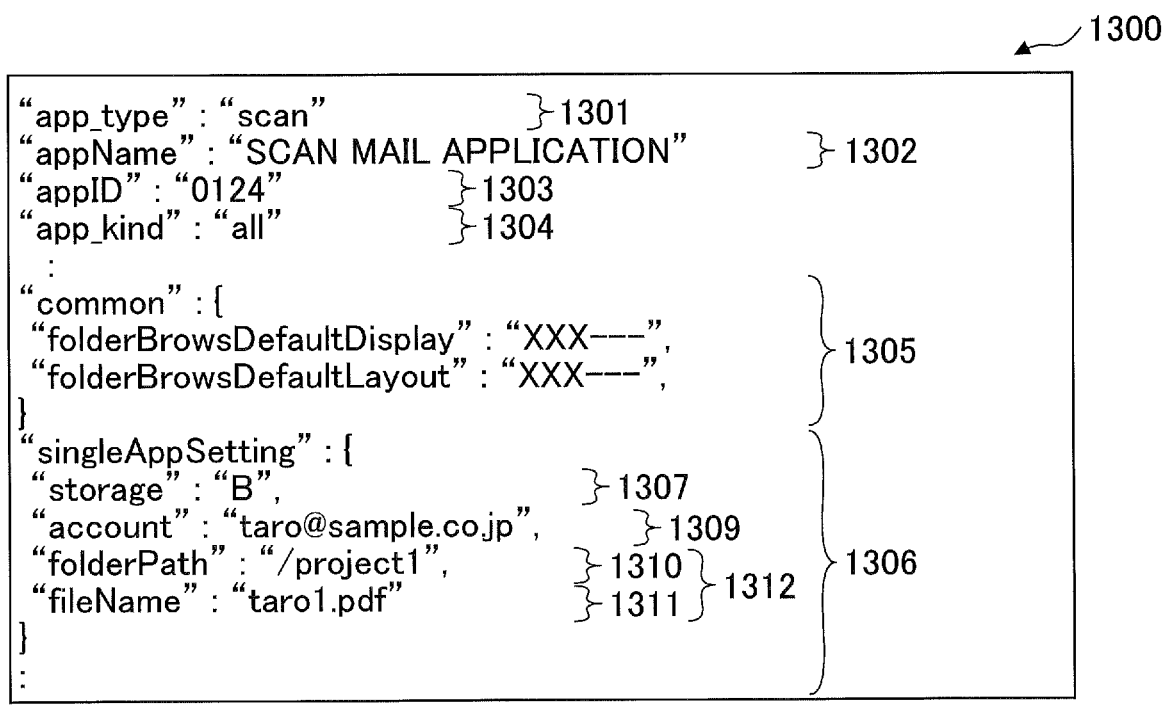

FIGS. 30A to 30C illustrate a portion of the app-related information 1300 set by FIGS. 25 to 28 with an extract thereof. FIG. 30A is an app-related information when a storage service called "external storage service A" is selected in an individual application, and FIG. 30b is an app-related information when a storage service called "external storage service A" is selected in a shared application.

First, an application type 1301, an app name 1302, and the app ID 1303 are the same as the application setup information of FIG. 16. The app-related information 1300 and the application setup information are associated with each other through the app name 1302 or the app ID 1303.

Alternatively, the app-related information 1300 may be incorporated into the app setup information 1200. The personal common discrimination 1304 indicates whether the app-related information 1300 is set for an individual application or a shared application.

The common setup 1305 of FIGS. 30A and 30B describes the information set in the shared setup field 431 of FIG. 25 or FIG. 26. In the single application setup 1306 in FIGS. 30A and 30B, the information set in FIG. 25 or single application setup field 432 in FIG. 26 is described. In FIGS. 30A and 30B, as an example, "external storage service A" and "folder ID" are set in the storage setup 1307.

"External storage service A" is a storage service set in storage selection field 432a of FIG. 25. The "folder ID" illustrates the folder set in the folder ID setup field 432b of FIG. 25. The logic processing unit 112 (more precisely, a component of the storage service) determines whether to execute the storage service by referring to the storage setup 1307 and stores it in the specified folder when executing the storage service.

Further, as illustrated in FIG. 30b, the shared application has a storage account setup 1309 and an end user account of "taro@sample.co.jp" is set. The components of the storage service refer to Storage Account Settings 1309 to store electronic files in storage at this end user's account.

FIG. 30C illustrates the app-related information when the storage service called "external storage service B" is selected in the shared application. The common setup 1305 and items up to the storage account setup 1309 in the single application setup 1306 are the same as items illustrated in FIGS. 30A and 30B. FIG. 30C has an option setup 1312 that can be set by a storage service called "external storage service B", and includes a parent folder path setup 1310 set in the parent folder path setup field 432d of FIG. 28 and a file name setup 1311 set in the file name setup field 432e. The components of the storage service store electronic files in the storage based on option setup 1312.

<Execution of Application From Apparatus>

Figure 31:
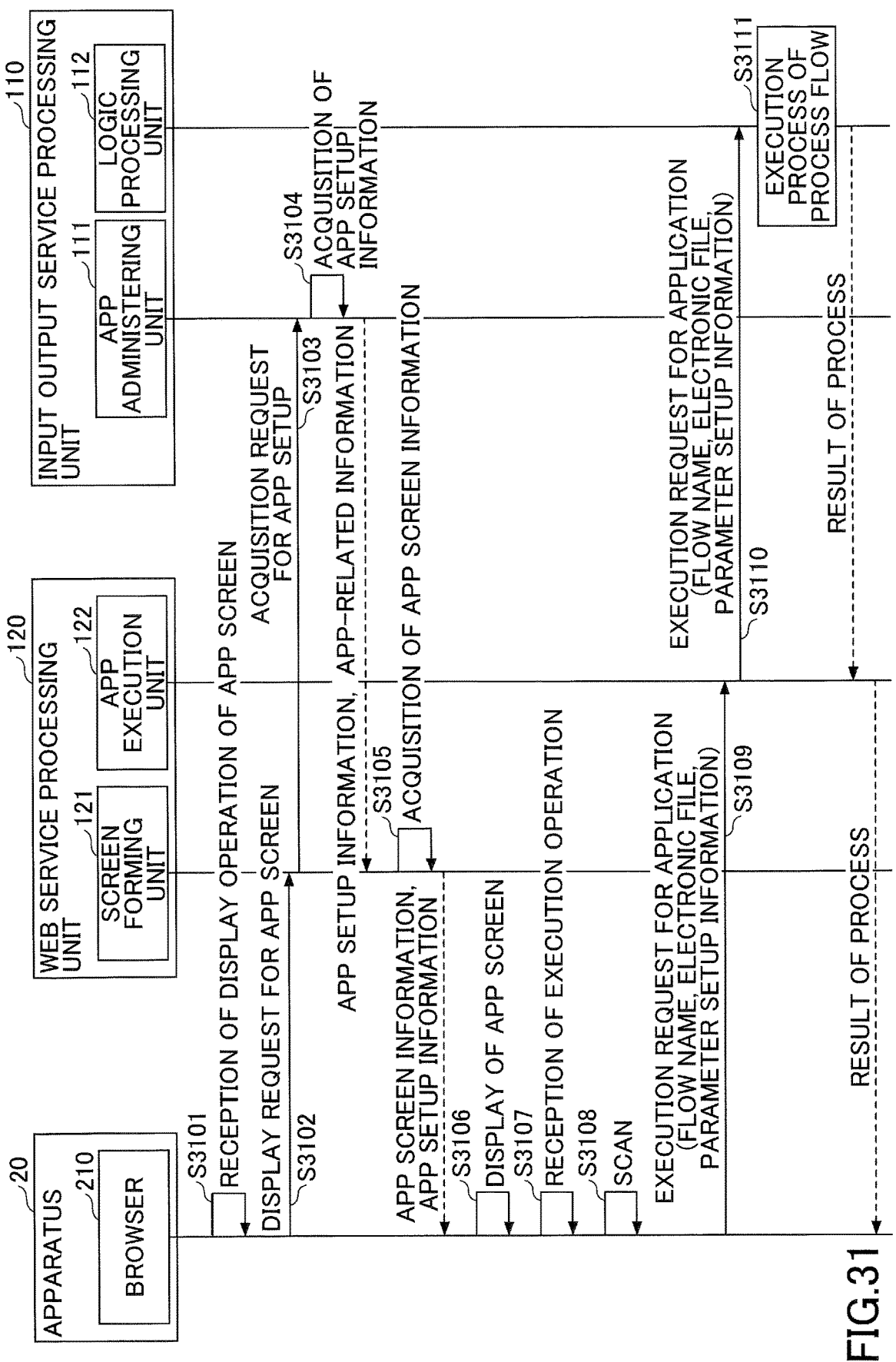
FIG. 31 is a sequence diagram illustrating an example of an overall process when using a scan translation service.

Next, the case where the end user of the apparatus 20 uses the scan translation service will be described with reference to FIG. 31. FIG. 31 is a sequence diagram illustrating an example of the overall process in case of using a scan translation service.

First, the operation reception unit 212 of the apparatus 20 receives an operation (display operation) for displaying the app screen of the scan translation service (step S3101). The user of the apparatus 20 can perform the display operation of the app screen by inputting the URL of the app screen of the scan translation service into an address bar of the browser 310, for example.

In step S3102, when the operation reception unit 212 of the apparatus 20 receives a display operation of the app screen of the scan translation service, the communication unit 211 transmits the display request for displaying the app screen of the scan translation service to the screen forming unit 121 of the web service processing unit 120. The app screen display request of the scan translation service includes the app ID of the app information 1000 that provides the scan translation service.

In step S3103, the screen forming unit 121 of the web service processing unit 120 transmits an acquisition request for acquiring application setup to the app administering unit 111 of the input output service processing unit 110 in receipt of a display request for displaying the app screen of the scan translation service. The acquisition request for acquiring application setup includes the app ID of the app information 1000 that provides the scan translation service.

In step S3104, the app administering unit 111 of the input output service processing unit 110 receives the acquisition request for acquiring application setup, acquires the app setup information 1200 and the app-related information 1300 stored in association with the app ID included in the acquisition request from the app information memory unit 150. The app administering unit 111 returns the app setup information 1200 and the app-related information 1300 acquired from the app information memory unit 150 to the screen forming unit 121.

Next, in step S3105, the screen forming unit 121 of the web service processing unit 120 acquires the app screen information 2000 stored in association with the app ID of the app information 1000 providing the scan translation service from the app screen information memory unit 160. The screen forming unit 121 returns the app screen information 2000 acquired from the app screen information memory unit 160, the app setup information 1200 returned in the above step S3104, and the app-related information 1300 to the browser 210.

Figure 32:
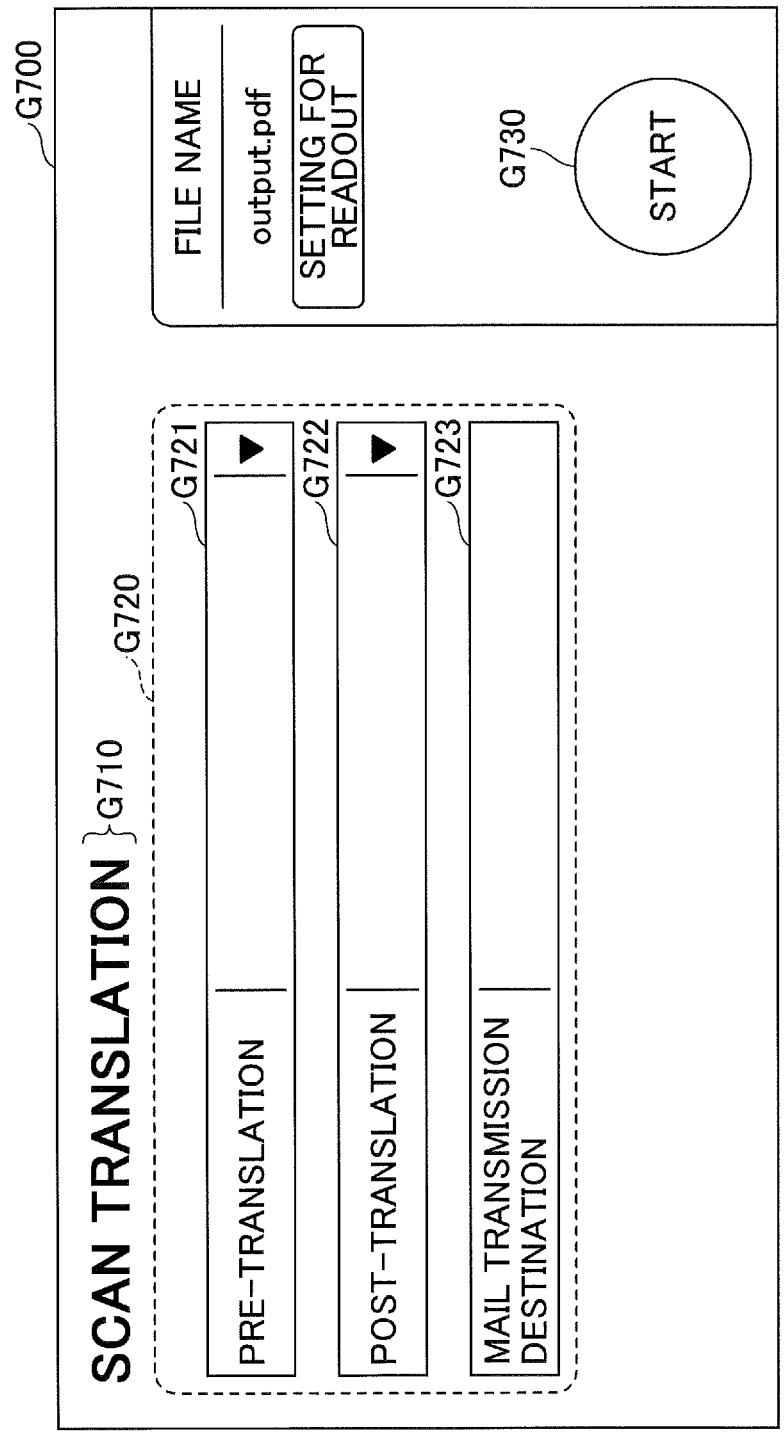
FIG. 32 illustrates an example of an app screen of a scan translation application.

In step S3106, the display control unit 213 of the apparatus 20 displays an app screen G700 illustrated in FIG. 32, for example, based on the app screen information 2000 and the app setup information 1200 received from the screen forming unit 121.

Here, the app screen 6700 illustrated in FIG. 32 is a screen for the end user of the apparatus 20 of utilizing the scan translation service.

The app screen 6700 illustrated in FIG. 32 includes an app name G710, a parameter input area G720, and a "start" button G740. The parameter input area G720 includes a pre-translation language input field G721, a post-translation language input field G722, and a mail transmission destination input field G723.

The app name G710 is displayed based on the app display name 1203 of the app setup information 1200 illustrated in FIG. 16. When application names in multiple languages (titles) are defined in the app display name 1203, the application name of the language corresponding to the language setup of the browser 210 is displayed in the app name G710.

The pre-translation language input field G721, the post-translation language input field G722, and the mail transmission destination input field G723 are displayed based on the user input parameter 1208 of the app setup information 1200 illustrated in FIG. 16.

Said differently, the pre-translation language input field G721 is displayed based on an input definition 1218 of the user input parameter 1208. Similarly, the destination language entry field G722 is displayed based on an input definition 1228 of the user input parameter 1208. Further, the mail transmission destination input field G723 is displayed based on the input definition 1238 of the user input parameter 1208.

As described above, the app screen, in which the end user of the apparatus 20 uses the service, displays the app name and parameter input area based on the information defined in the app setup information 1200.

Here, in the app screen G700 illustrated in FIG. 32, the user enters "English" in the pre-translation language input field G721, "Japan" in the post-translation language input field G722, and "abc@abc.co.jp" in the mail transmission destination input field G723. In the app screen G700 illustrated in FIG. 32, the user performs an operation (execution operation) by pressing the "start" button G740.

Then, the operation reception unit 212 of the apparatus 20 receives the execution operation (step S3107). In step S3108, the browser 210 of the apparatus 20 controls the scanner 26 to generate an electronic file (image file) by reading the document.

In step S3109, when an electronic file (image file) is generated, the communication unit 211 of the apparatus 20 transmits an application execution request to the app execution unit 122 of the web service processing unit 120. The application execution request includes the flow name "translate-mail" defined in the flow name 1205 of the app setup information 1200, the electronic file generated in the above step S1608, and the parameter setup information.

Here, the parameter setup information is parameter information defined in the default parameter 1207 of the app setup information 1200, parameter information in which the parameter value is set in the app screen G700 by the developer, and information set in the app-related information 1300.

Specifically, the parameter information defined in the default parameter 1207 is ""language":"English"". The parameter information in which parameter values are set by the developer in the app screen G700 is ""from":"English"", ""to":"Japanese"" and ""address":"abc@abc.co.jp"".

In step S3110, the app execution unit 122 of the web service processing unit 120 transmits the execution request to the logic processing unit 112 of the input output service processing unit 110 in response to the reception of the application execution request.

Next, in step S3111, the logic processing unit 112 of the input output service processing unit 110 performs the execution process of the process flow in response to the reception of the application execution request. Said differently, the logic processing unit 112 executes a series of processes based on the process flow information 1100 of the flow name included in the request. Details of the execution process of the process flow will be described later.

The logic processing unit 112 returns the result of processing the execution process of the process flow to the browser 210 through the web service processing unit 120.

Accordingly, the service providing system 10 according to this embodiment can provide the scan translation service.

Figure 33:
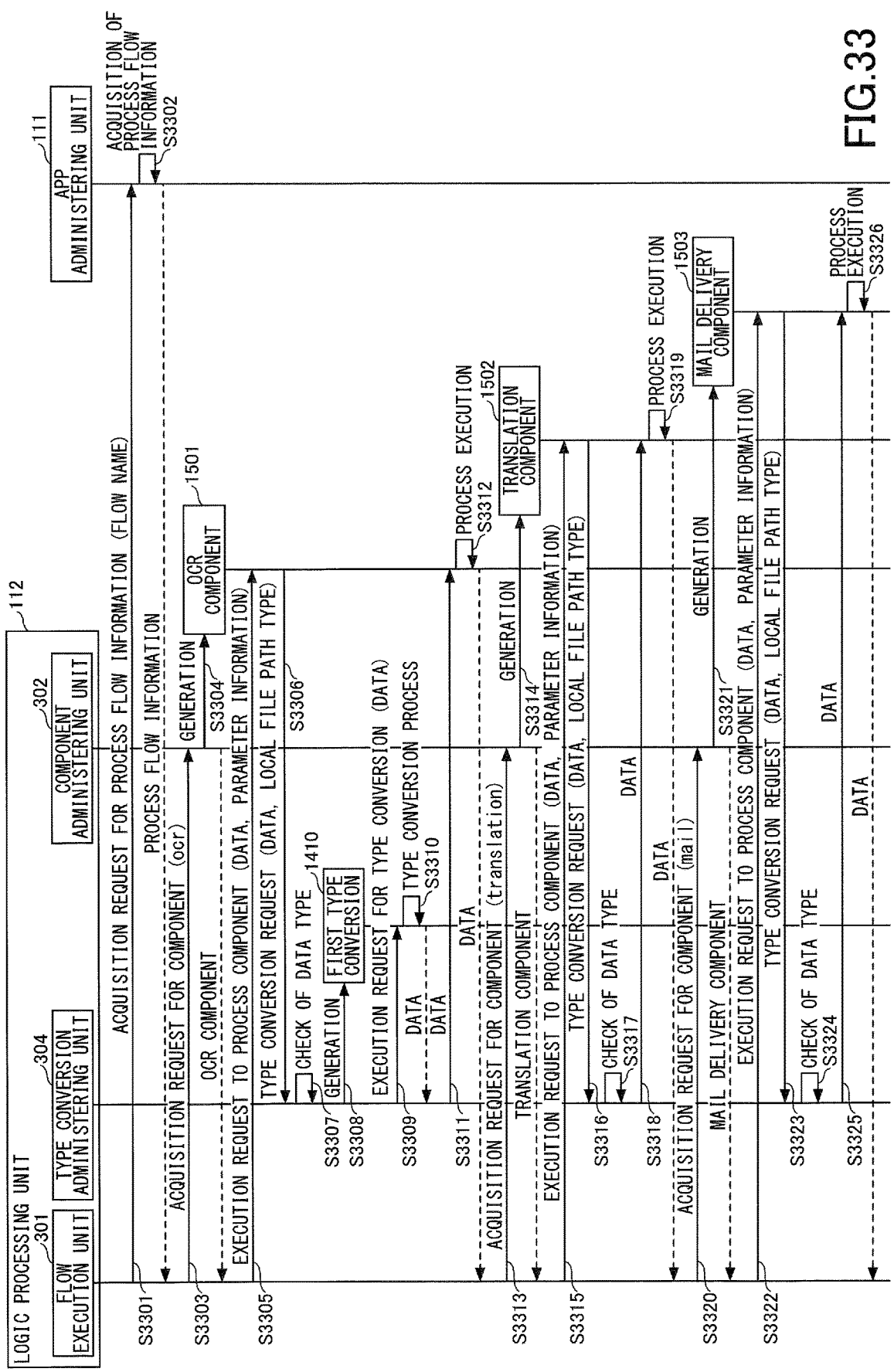
FIG. 33 is a sequence diagram illustrating an example of an execution process of a process flow that substantializes a scan translation service.

Hereinafter, details of the execution process of the process flow (process of step S3111 of FIG. 31) will be described with reference to FIG. 33. FIG. 33 is a sequence diagram illustrating an example of the execution process of the process flow that substantiates the scan translation service.

First, in step S3301, when the request for executing the application is received from the app execution unit 122, the flow execution unit 301 transmits the acquisition request for acquiring the process flow to the app administering unit 111. The acquisition request includes the flow name "translate-mail".

In step S3302, when the app administering unit 111 receives the acquisition request for acquiring the process flow, it acquires the process flow information 1100 of the flow name "translate-mail" included in the acquisition request from the app information memory unit 150. The app administering unit 111 returns the process flow information 1100 acquired from the app information memory unit 150 to the flow execution unit 301.

Hereinafter, the app administering unit 111 will be described as having returned the process flow information 1100 illustrated in FIG. 8 to the flow execution unit 301.

Next, in step S3303, the flow execution unit 301 transmits a request for acquiring a component based on the process flow information 1100 to the component administering unit 302.

Said differently, the flow execution unit 301 transmits to the component administering unit 302 a request for acquiring a component of the component name "ocr" defined in "component" included in the detailed process definition 1110 of the process flow information 1100 illustrated in FIG. 8.

When the component administering unit 302 receives the acquisition request for acquiring the component, the component administering unit 302 generates a component with the component name "ocr" (i.e., the OCR component 1501) (step S3304). The OCR component 1501 can be generated using an API for generate a component defined in the component common I/F 1500.

The component administering unit 302 returns the generated OCR component 1501 to the flow execution unit 301. Said differently, the component administering unit 302 returns an address on the memory (e.g., RAM 14) in which the OCR component 1501 is deployed to the flow execution unit 301, for example.

Next, in step S3305, the flow execution unit 301 transmits a component execution request to the OCR component 1501.

The execution request includes data and parameter information.

Here, the data is an electronic file received from the browser 210 and has a data type "InputStream". Said differently, the flow execution unit 301 passes the electronic file received from the browser 210 to the OCR component 1501 as "data" (without considering the data type) and requests the execution of the process. In this embodiment, various types of information, such as an electronic file, which is not conscious of the data type, are simply referred to as "data."

The parameter information is formed such that each parameter value of the parameter setup information is set to a parameter value of each parameter information defined in "parameters" included in the detailed process definition 1110 of the process flow information 1100 illustrated in FIG. 8. Said differently, the parameter information is ""language": "English"", etc.

In step S3306, the OCR component 1501 receives a component execution request and transmits the type conversion request to the type conversion administering unit 304. The type conversion request includes data and designation of a data type of "LocalFilePath" indicating that the OCR component 1501 can handle.

In step S3307, in receipt of the type conversion request, the type conversion administering unit 304 checks whether the data type whose data is included in the type conversion request matches the designated data type.

Here, the data type included in the type conversion request is "InputStream", while the designated data type is "LocalFilePath". Accordingly, the type conversion administering unit 304 determines that the data type included in the type conversion request does not match the designated data type.

Then, the type conversion administering unit 304 refers to the type conversion information table 4000 and identifies the type conversion for converting the data type from "InputStream" to "LocalFilePath" (here, the first type conversion 1410 is specified). In step S3308, the type conversion administering unit 304 generates the specified first type conversion 1410. The first type conversion 1410 can be generated using the type conversion common I/F 1400.

Next, in step S3309, the type conversion administering unit 304 transmits the execution request of the type conversion process to the first type conversion 1410. The execution request includes data.

In step S3310, the first type conversion 1410 performs a type conversion process in which the data type included in the execution request is converted from "InputStream" to "LocalFilePath" in receipt of the execution request of the type conversion. The first type conversion 1410 returns the data whose data type is converted to the type conversion administering unit 304.

When the data is received from the first type conversion 1410, the type conversion administering unit 304 transmits the data to the OCR component 1501 (step S3311).

When the data is received from the type conversion administering unit 304, the OCR component 1501 performs the process for the data using parameter information (step S3312).

Said differently, the OCR component 1501 performs the OCR process in English for the electronic file indicated by the data using the parameter information ""language": "English"" by the OCR processing unit 131.

The OCR component 1501 transmits the data indicating the electronic file (i.e., a text file) after the OCR process to the flow execution unit 301.

Next, in step S3313, the flow execution unit 301 transmits an acquisition request for acquiring a component based on the process flow information 1100 to the component administering unit 302.

Said differently, the flow execution unit 301 transmits to the component administering unit 302 the acquisition request for acquiring the component of the component name "translation" defined in "component" included in the detailed process definition 1120 of the process flow information 1100 illustrated in FIG. 8.

When the component administering unit 302 receives the acquisition request for acquiring the component, the component administering unit 302 generates a component of the component name "translation" (i.e., the translation component 1502) (step S3314). The generation of the translation component 1502 may be performed using an API for generating the component defined in the component common I/F 1500.

The component administering unit 302 returns the generated translation component 1502 to the flow execution unit 301. Said differently, the component administering unit 302 returns an address on the memory (e.g., RAM 14) in which the translation component 1502 is deployed to the flow execution unit 301.

Next, in step S3315, the flow execution unit 301 transmits the component execution request to the translation component 1502. The execution request includes data and parameter information.

Here, the data is the data returned from the OCR component 1501 (i.e., a path indicating the electronic file provided with the OCR process).

The parameter information is obtained by setting each parameter value of each parameter information defined in "parameters" included in the detailed process definition 1120 of the process flow information 1100 illustrated in FIG. 8, to which the parameter value of each parameter information set. Said differently, the parameter information is ""from":"English"" and ""to":"Japan"", etc.

In step S3316, the translation component 1502 receives the component execution request and thereafter transmits the type conversion request to the type conversion administering unit 304. The type conversion request includes data and "LocalFilePath" indicating the data type that can be handled by the translation component 1502.

In step S3317, when receiving a type conversion request, the type conversion administering unit 304 checks whether the data type included in the type conversion request matches the designated data type with the data type included in the type conversion request.

Here, the data type included in the type conversion request is "LocalFilePath" and the designated data type is "LocalFilePath". Accordingly, the type conversion administering unit 304 determines that the data type included in the type conversion request coincides with the designated data type.

Then, in step S3318, the type conversion administering unit 304 transmits the data included in the type conversion request to the translation component 1502. As described above, when it is determined that the data type of the data matches the designated data type in the data type check (process of step S3317), the type conversion administering unit 304 does not generate the type conversion.

When data is received from the type conversion administering unit 304, the translation component 1502 performs the process on the data using the parameter information (step S3319). Said differently, the translation component 1502 translates the electronic file indicated by the data from English to Japanese using the parameter information ""from":"English"" and ""to":"Japan"".

The translation component 1502 transmits data representing the electronic file after the translation process to the flow execution unit 301.

The translation component 1502 may translate the electronic file by requesting a translation process to a translation server connected to the service providing system 10 via a network, for example.

Next, in step S3320, the flow execution unit 301 transmits an acquisition request for acquiring a component based on the process flow information 1100 to the component administering unit 302.

Said differently, the flow execution unit 301 transmits to the component administering unit 302 the acquisition request for acquiring the component of the component name "mail" defined in "component" included in the detailed process definition 1130 of the process flow information 1100 illustrated in FIG. 8.

When the component administering unit 302 receives the acquisition request for acquiring the component, the component administering unit 302 generates the component name "mail" component (i.e., the mail delivery component 1503) (step S3321). The creation of the mail delivery component 1503 may be performed using an API for generating the component defined in the component common I/F 1500.

The component administering unit 302 returns the generated mail delivery component 1503 to the flow execution unit 301. Said differently, the component administering unit 302 returns an address on the memory (e.g., RAM 14) in which the mail delivery component 1503 is deployed to the flow execution unit 301.

Next, in step S3322, the flow execution unit 301 transmits the component execution request to the mail delivery component 1503. The execution request includes data and parameter information.

Here, the data is the data returned by the translation component 1502 (i.e., the path indicating the electronic file after the translation).

The parameter information is a parameter value set to the parameter value of each parameter information defined in "parameters" included in the detailed process definition 1130 of the process flow information 1100 illustrated in FIG. 8, and each parameter value of the parameter setup information is set. Said differently, the parameter information is ""address":"abc@abc.co.jp"", etc.

In step S3323, the mail delivery component 1503 receives a component execution request and transmits the type conversion request to the type conversion administering unit 304. The type conversion request includes data and "LocalFilePath" designating the data type that the mail delivery component 1503 can handle.

In step S3324, when receiving the type conversion request, the type conversion administering unit 304 checks whether the data type included in the type conversion request matches the designated data type with the data type included in the type conversion request.

Here, the data type included in the type conversion request is "LocalFilePath" and the designated data type is "LocalFilePath". Accordingly, the type conversion administering unit 304 determines that the data type included in the type conversion request coincides with the designated data type.

In step S3325, the type conversion administering unit 304 transmits the data included in the type conversion request to the mail delivery component 1503. As described above, when it is determined that the data type matches the designated data type in the data type check (processing in step S1824), the type conversion administering unit 304 does not generate the type conversion.

When data is received from the type conversion administering unit 304, the mail delivery component 1503 performs the process on the data using the parameter information (step S3326).

Said differently, the mail delivery component 1503 prepares a mail with an electronic file indicated by the data attached thereto by the mail delivery unit 132.

Next, the mail delivery component 1503 transmits the mail to the "abc@abc.co.jp" by the mail delivery unit 132 using the parameter information ""address": "abc@abc.co.jp".

The mail delivery component 1503 returns data indicating the transmission result of the mail to the flow execution unit 301.

As described above, a series of processes (process flow) based on the process flow information 1100 illustrated in FIG. 8 is completed. Accordingly, the service providing system 10 according to this embodiment can provide the scan translation service to the apparatus 20.

<Case Where a Component Group is Set in the Process Flow That the Application Executes>

Subsequently, the procedure for executing the application will be described when a component group is set in the process flow executed by the application. Here, as illustrated in FIG. 1, the case where the storage services of "external storage service A" and "external storage service B" are set as the component group will be described as an example.

(i) OCR (ii) File upload (external storage service A) or file upload (external storage service B)

(iii) Mail transmission

When the component group is set, the logic processing unit 112 executes one or both of the multiple components of the component group. The generated component uploads the file only when it is selected (designated) by the app-related information 1300.

Figure 34:
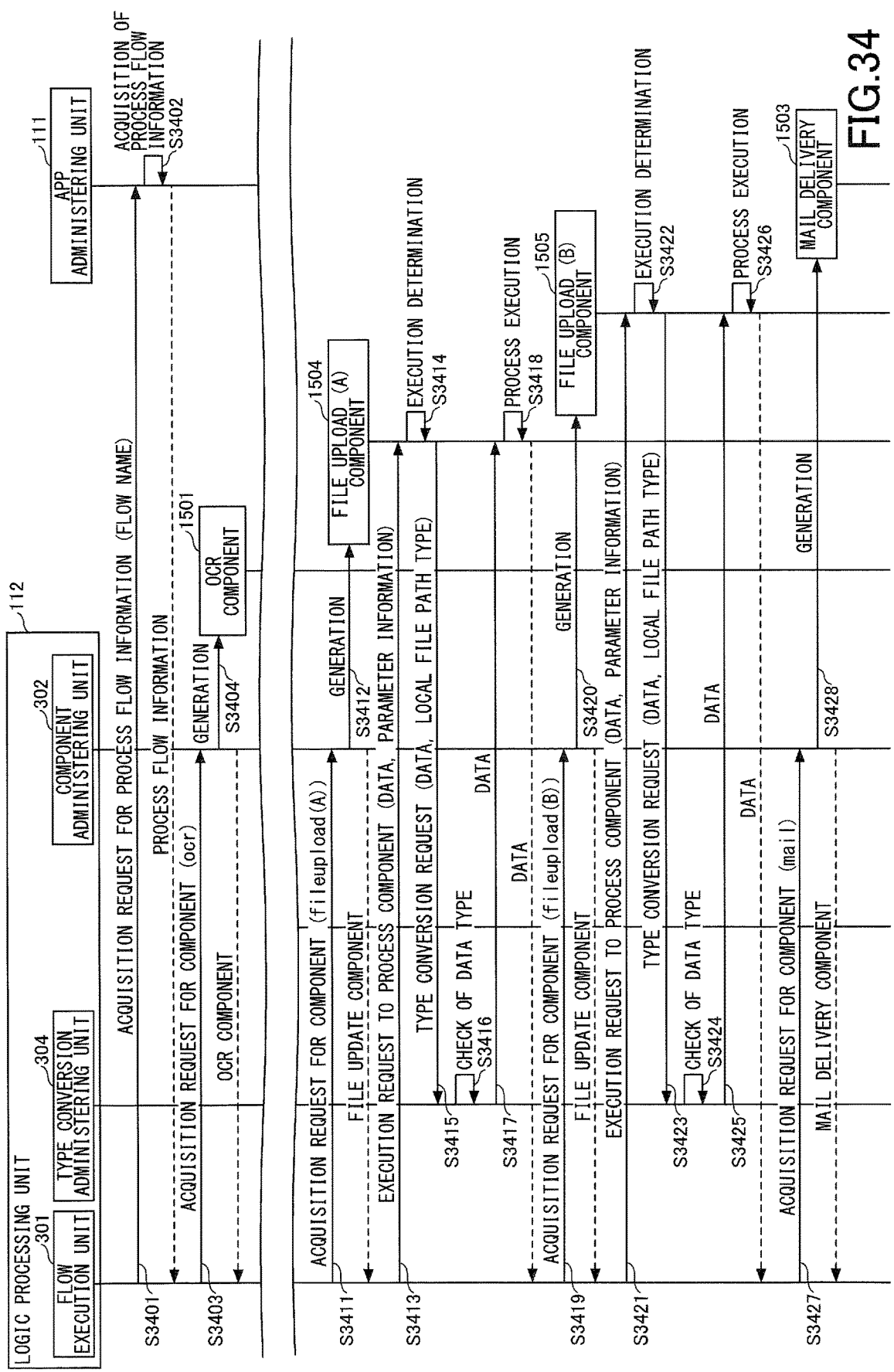
FIG. 34 is a sequence diagram illustrating an example of a procedure in which the apparatus executes an application when a component group is set.

FIG. 34 is a sequence diagram illustrating an example of a procedure for executing an application for an apparatus when the component group is set. In FIG. 34, the difference from FIG. 33 will be explained mainly. A part of the process is omitted in FIG. 34 because the OCR component 1501 and the execution of the mail delivery component are similar to FIG. 33.

First, the process for the OCR component, such as steps S3401-S3404 of FIG. 34, is similar to that of FIG. 33.

Next, in step S3411, the flow execution unit 301 transmits the acquisition request for acquiring the component based on the process flow information 1100 illustrated in FIG. 21 to the component administering unit 302.

Said differently, the flow execution unit 301 transmits to the component administering unit 302 the acquisition request for acquiring the component of the component name "fileupload (external storage service A)" defined in the process flow information 1100.

When the component administering unit 302 receives the acquisition request for acquiring the component, the component administering unit 302 generates the component (file upload (external storage service A) component 1504 of the component name "fileupload (external storage service A)" (step S3412).

The component administering unit 302 returns the generated file upload (external storage service A) 1504 to the flow execution unit 301. Said differently, the component administering unit 302 returns an address on the memory (e.g., RAM 14) in which the file upload (external storage service A) component 1504 is deployed to the flow execution unit 301.

Next, in step S3413, the flow execution unit 301 transmits the component execution request to the file upload (external storage service A) component 1504. The execution request includes data and parameter information.

Here, the data is the data returned from the OCR component 1501 (i.e., a path indicating an electronic file after OCR processing). The parameter information is the app-related information 1300 in addition to the information defined in the process flow information 1100.

A file upload (external storage service A) component 1504 determines whether to perform the requested process based on this parameter information. The file upload (external storage service A) component 1504 determines that the requested process is to be executed when "external storage service A" is set in the storage setup 1307 of the app-related information 1300 and not executed in other cases.

If it is determined that the file is not to be executed, the file upload (external storage service A) component 1504 transmits the fact that the file upload is not executed to the flow execution unit 301 and finishes the process.

When it is determined to be executed, the following steps S3415 to S3418 are executed. Although the file upload generally does not require the type conversion, it is handled in the same manner as in step S3317 of FIG. 33.

In step S3418, the file upload (external storage service A) component 1504 stores the data in the storage service. In other words, when the executing application is an individual application, it specifies the account of the end user specified at the time of the login, and sets the folder ID to the storage service to send the data. When the executing application is a shared application, the data is transmitted to the storage service by designating the end user account set in a storage account setup 1309 of the app-related information. The file upload (external storage service A) component 1504 may determine whether it is the individual application or the shared application by referring to the individual-or-shared discrimination 1304 illustrated in FIG. 30. If the storage account setup 1309 is set in the app-related information 1300, it may be used in preference to the account of the login end user without determining whether the executing application is the individual app.

Subsequently, in step S3419, the flow execution unit 301 transmits an acquisition request for acquiring a component based on the process flow information 1100 to the component administering unit 302. Said differently, steps S3419-S3425 perform the same process as in steps S3411-S3418 for the following components defined in the component group. Differences are described next.

In step S3420, when the component administering unit 302 receives the acquisition request for acquiring the component, the component administering unit 302 generates the file upload (i.e., an external storage service B) component 1505 of the component name "fileupload (external storage service B)".

The execution decision in step S3422 is the same as in step S3414. On the assumption that either "external storage service A" or "external storage service B" is set in the app-related information 1300, the file is uploaded in either step S3422 or step S3414. If both "external storage service A" and "external storage service B" are set in the app-related information 1300, the file upload may be performed in both step S3421 and step S3414.

In step S3421, the file upload (external storage service B) component 1505 causes the data to be stored in the storage service. Said differently, in the case of the individual application, the executing application designates the account of the end user specified at the time of login, and further specifies the parent folder path setup 1310, which is optionally set in the app-related information 1300, and the file name setup 1311, and transmits the data to the storage service. In the case of the shared application executed by the application, the end user account set in the storage account setup 1309 of the app-related information 1300 is designated, and the parent folder path setup 1310 and the file name setup 1311 set in the app-related information are designated so as to transmit the data to the storage service.

The process after step S3427 is the same as the mail delivery described in steps S3320 to S3321 of FIG. 33.

Thus, even if the component group is set, the service providing system 10 can perform the process flow in a substantially similar manner to a case where the component group is not set.

<Selection of Storage Service When Application is Executed by the Apparatus>

Although it has been described in FIGS. 25 and 26 that the end user can select the storage service to be used in the application before executing the application, it is possible to improve the usability in selecting the storage service when executing the application. The following describes how the end user selects the storage service when the application is executed.

Figure 35:
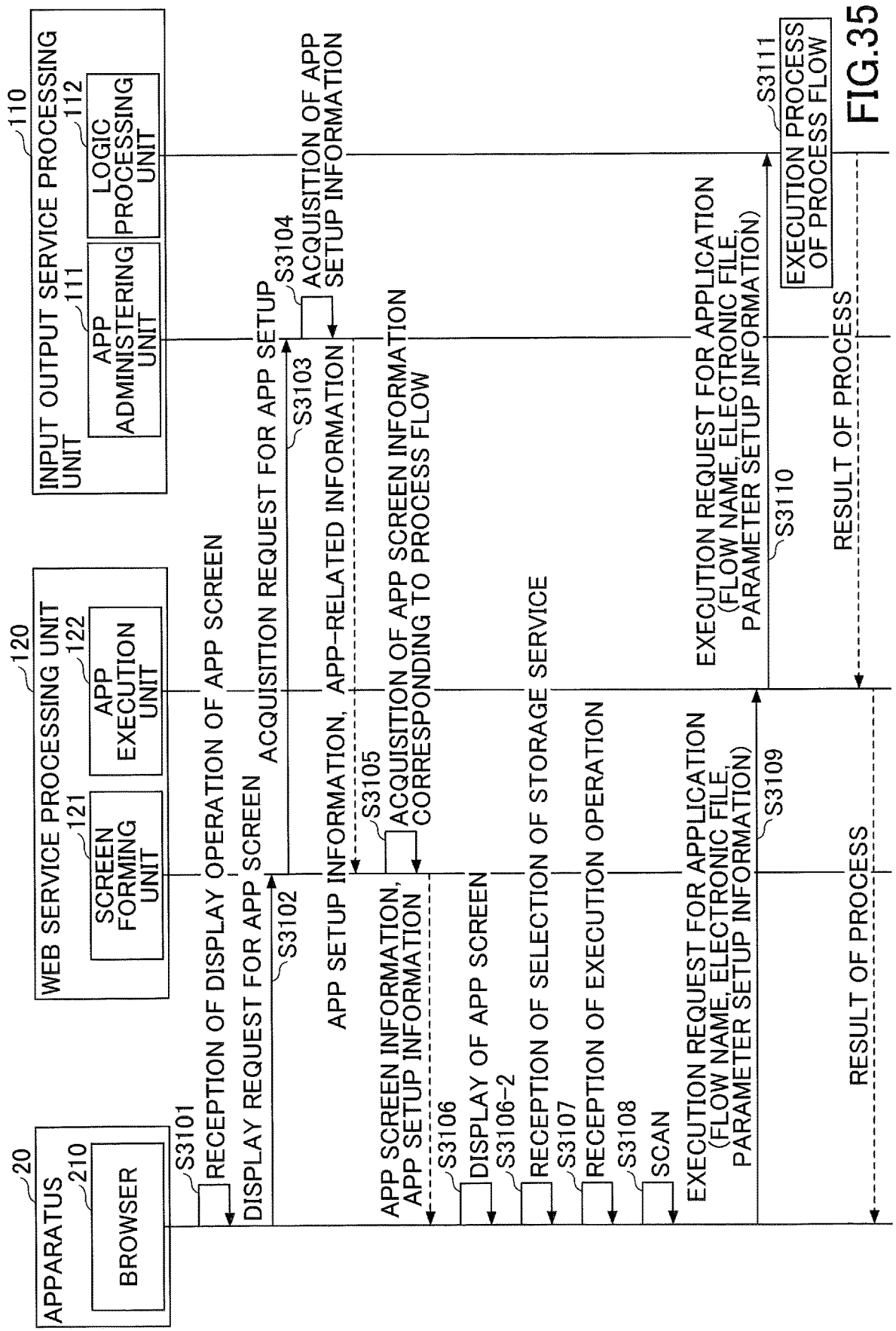
FIG. 35 is a sequence diagram illustrating an example of the overall process when the application is executed.

FIG. 35 is a sequence diagram illustrating an example of the overall process when the application is executed. In FIG. 35, the difference from FIG. 31 will be mainly explained.

In step S3105, the screen forming unit 121 of the web service processing unit 120 acquires the app screen information 2000 stored in association with the app ID of the app information 1000 providing the application to be executed from the app screen information memory unit 160 (step S3105). If the process flow contains the component group, the app screen information 2000 contains screen information for selecting multiple components included in the group of components.

When the app screen is displayed in step S3106, the end user displays the screen for selecting the storage service. The operation reception unit 212 of the apparatus 20 receives this operation, and the display control unit 213 displays a screen for selecting the storage service based on the screen information for selecting multiple components.

When the end user selects the storage service, the operation reception unit 212 receives the selection of the storage service from the browser 210 of the apparatus 20 (step S3106-2).

Because the selection result of the storage service by the end user is transmitted to the logic processing unit 112 in step S3110, the data is stored in the storage service selected by the end user as described in FIG. 34.

Figure 36A:
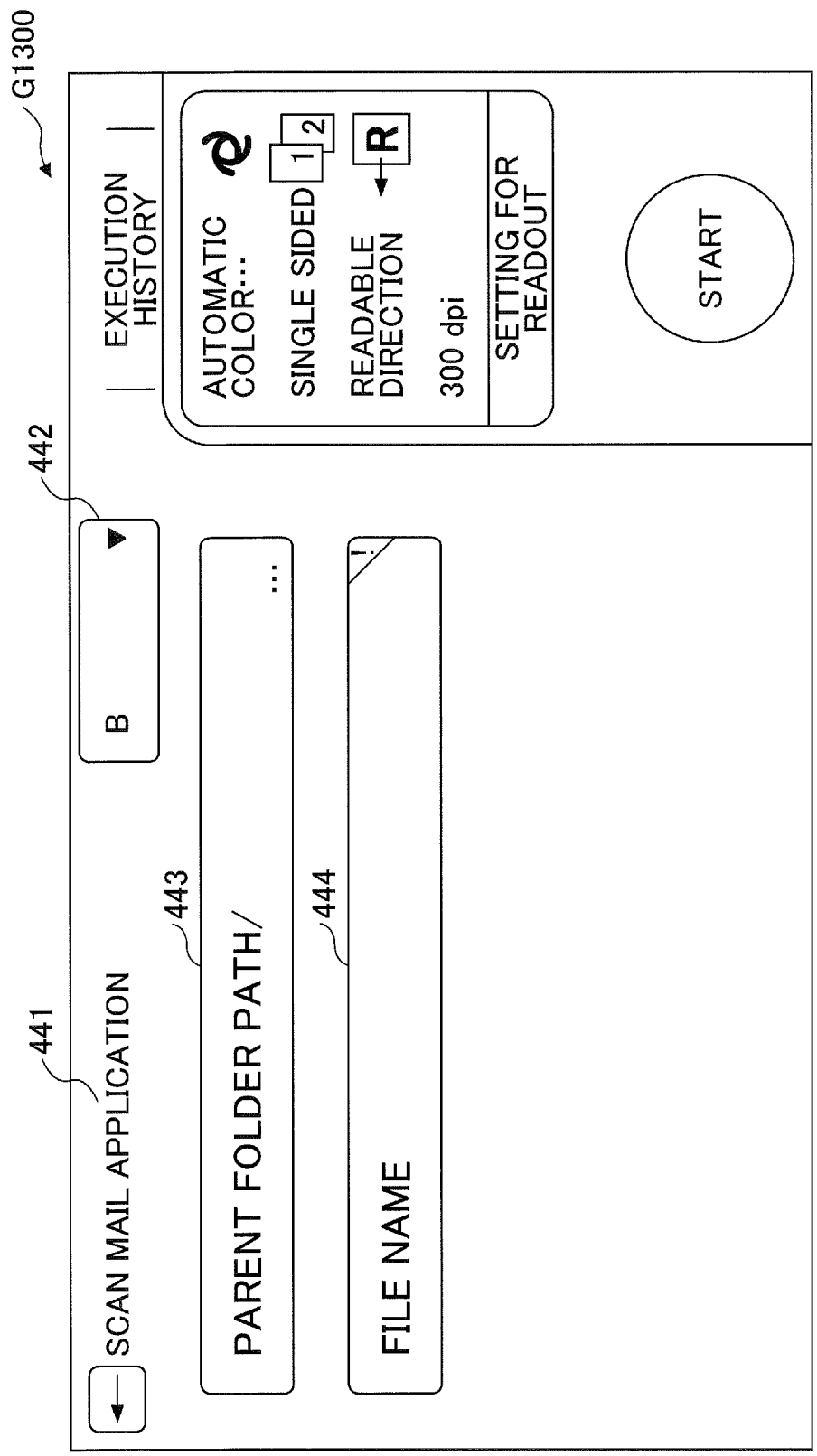

FIGS. 36A and 36B are examples of a component selection screen G1300 that receives the selection of the component displayed by the browser 210 of the apparatus 20. The component selection screen G1300 of FIG. 36A includes an application name field 441 and a component selection field 442. The application name field 441 is a field in which the name of the application executed by the end user is displayed. In the component selection field 442, the multiple components of the component group are displayed in a pull-down format. In FIG. 36A, "external storage service B" is selected.

When the operation reception unit 212 of the apparatus 20 receives the choice of "external storage service B", the display control unit 213 displays a parent folder path setup field 443 and a file name setup field 444 based on the screen information for selecting the components. Accordingly, the end user can set a parent folder and file name that can be set by the storage service called "external storage service B".

In the component selection field 442 of FIG. 36B, "external storage service A" is selected. For this reason, the display control unit 213 of the apparatus 20 displays the parent folder ID setup field 445 that can be set by the "external storage service A".

In this manner, in the service providing system 10 of this embodiment, the end user can select the storage service when executing the application.

SUMMARY

As described above, the service providing system 10 of this embodiment can combine multiple services whose process contents are similar into one process flow. Therefore, the burden on the developer can be reduced. The end user can select the storage service that end user uses before and during executing the application.

<Other Applicable Examples>

Although the best embodiments for carrying out the present invention have been described with reference to examples, the present invention is not limited to these examples, and various modifications and substitutions may be made without departing from the spirit of the present invention.

«How a User Arranges a Frame First and Then a Component in a Partition»

Figure 37A:
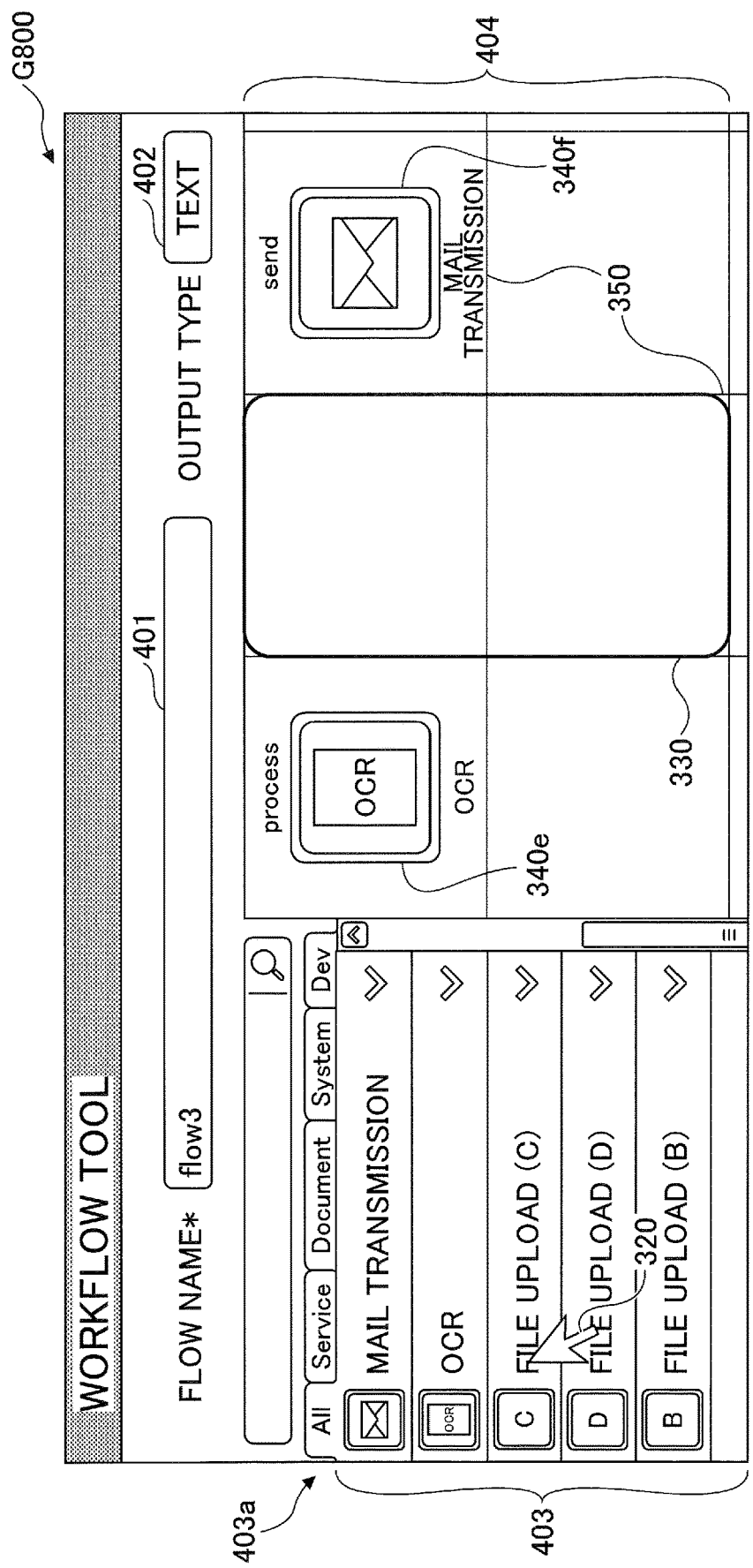
FIGS. 37A to 37C illustrate examples of a method of setting the process flow in a process flow setup screen.
Figure 37B:
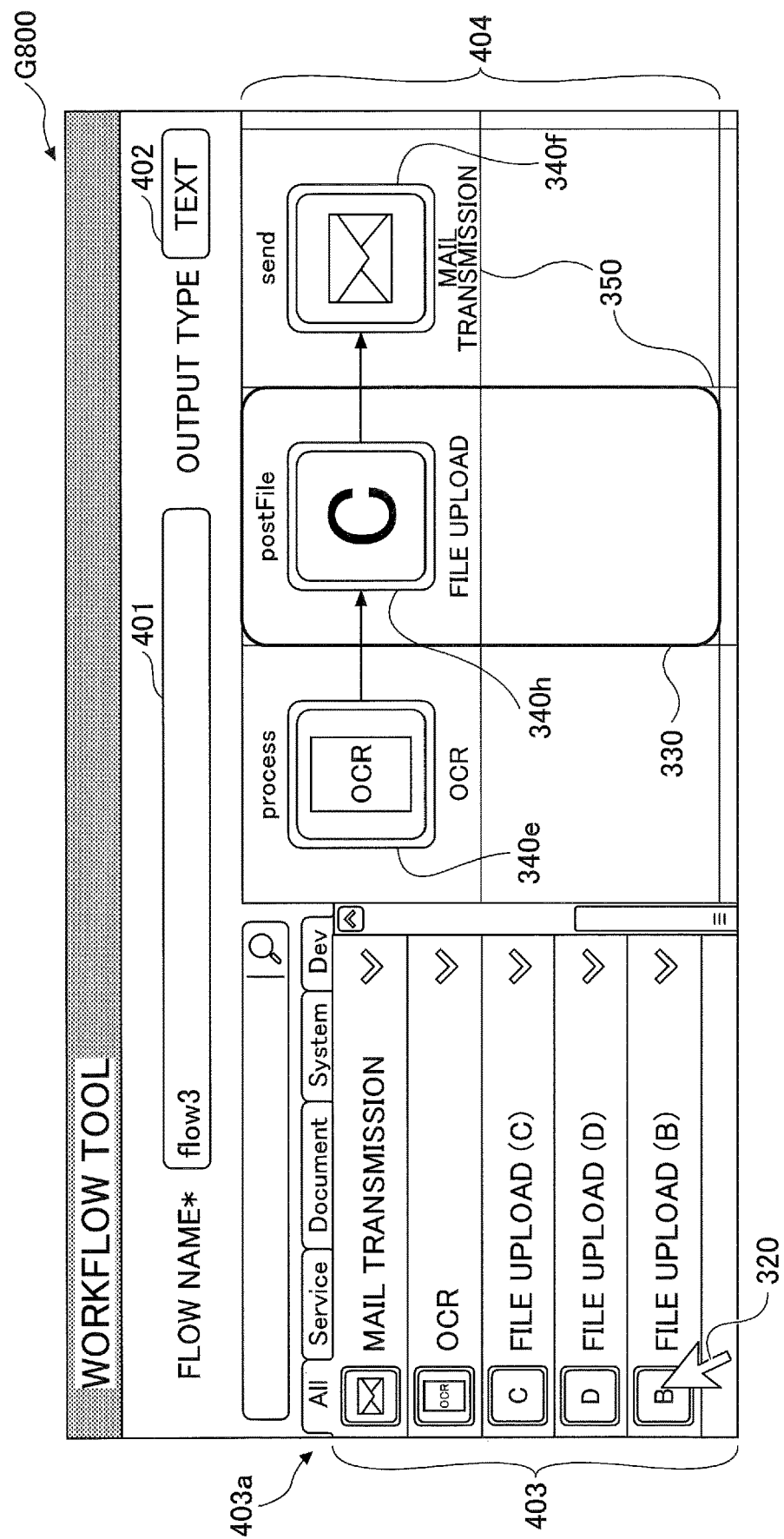
Figure 37C:
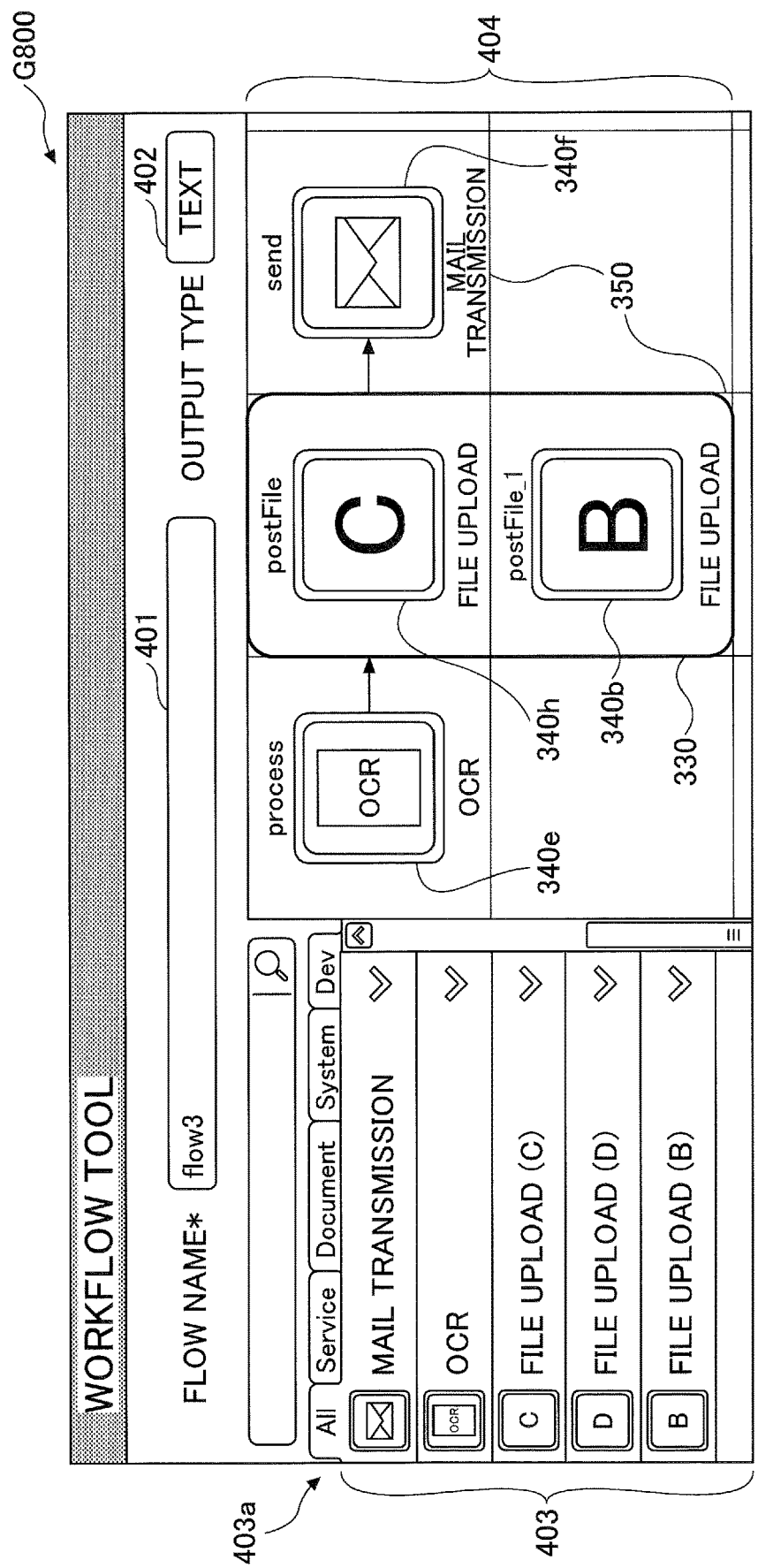

For example, as illustrated in FIGS. 37A to 37C, a user may first set a frame 330 and then arrange the component in a partition 350. FIGS. 37A to 37C illustrate an example of a method for setting a process flow in the process flow setup screen G800. As illustrated in FIG. 37A, the user drags the pointing device 320 to designate the frame 330 such that the order in which it is executed surrounds the same longitudinal segment. At this stage, the component icons are not arranged in the partition 350 within the frame 330. The operation reception unit 312 of the PC terminal 30 receives this operation, and the display control unit 313 displays the frame 330.

The user then selects the component from the component list field 403. The operation reception unit 312 of the PC terminal 30 receives this operation and, as illustrated in FIG. 37B, the display control unit 313 arranges the icon 340h of the selected component in the top partition 350 of the frame 330.

The user then selects a component from the component list field 403 that belongs to the Component Group. The operation reception unit 312 of the PC terminal 30 receives this operation and, as illustrated in FIG. 37(c), the display control unit 313 disposes the icon 340b of the selected component in the second partition 350 from the top of the frame 330.

The size of frame 330 can be arbitrarily enlarged by the user later, so that more than one component can be grouped.

<Other>

In this embodiment, the storage service "external storage service A" and "external storage service B" were used in the description, but other storage services such as "Google Drive (registered trademark)", "Sharepoint Online (registered trademark)", "Onedrive (registered trademark) for business" and the like may be set to the process flow.

In this embodiment, the image forming apparatus 20 is mainly used as the apparatus 20. However, the apparatus for executing the application is not limited to the image forming apparatus. For example, PJ (Projector), IWB (Interactive White Board; a white board having an electronic blackboard function capable of intercommunicating), or the like.

Further, configuration examples such as FIGS. 5 and 6 are divided in conformity with the main functions in order to facilitate understanding of the processes by the service providing system 10. The claimed invention is not limited by the name or the means of the division of the processing units. The processes of the service providing system 10 can also be divided into more processing units depending on the process content. Alternatively, one processing unit can be divided to include more processes.

Each of the functions of the embodiments described above can be implemented by one or multiple processing circuitries. Here, the term "processing circuitry" as used herein includes devices such as processors programmed to perform each function by software, such as processors implemented by electronic circuitry, ASICs (Application Specific Integrated Circuit), DSP (Digital Signal Processor), FPGAs (Field Programmable Gate Array), and conventional circuit modules designed to perform each of the functions described above.

The UI providing unit 141 is an example of a screen information transmission unit, the operation reception unit 312 is an example of a setup receiving means, the display control unit 313 is an example of a display processing means, the logic processing unit 112 is an example of a process flow execution unit, the communication unit 211 is an example of a receiving means, and the communication unit 311 is an example of a transmission means.

It is possible to provide an information processing system that reduces the burden when the developer creates a process flow, etc.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

What is claimed is:

1. An information processing system comprising:
    an information processing circuitry; and
    a service providing system communicating with the information processing circuitry through a network,
    the information processing circuitry including
        a display process unit configured to cause a screen of a display device to display a process flow that defines an execution order of a plurality of processes executed by the service providing system; and
        a setup reception unit configured to receive a setup, in which a first predetermined process related to a first external service and a second predetermined process related to the second external service are associated, on the screen displayed by the display process unit,
    wherein the display process unit
        displays, on the screen, the plurality of processes to be executed in the execution order, and an issue that the setup reception unit has received the first predetermined process and the second predetermined process in association with each other, the first predetermined process and the second predetermined process being executed at a same sequence in the execution order of the process flow, whereby execution of one of the first and second predetermined processes excludes execution of the other of the first and second processes, and
        causes the screen to display
            the plurality of processes in the process flow arranged along a lateral direction of the screen based on the execution order of the plurality of processes, and
            the first predetermined process and the second predetermined process arranged in a vertical direction of the screen based on the execution at the same sequence in the execution order of the process flow and to indicate the issue that the first predetermined process and the second predetermined process are set in association with each other,
a frame surrounding the first predetermined process and the second predetermined process to indicate that the first predetermined process and the second predetermined process form a component group, and the service providing system includes
a process flow execution unit configured to execute the plurality of processes included in the process flow transmitted from the information processing circuitry in the defined execution order.

2. The information processing system according to claim 1, wherein
the display process unit causes the screen to display while arranging the plurality of processes in the execution order along a lateral direction of the screen, and
the first predetermined process and the second predetermined process are displayed so as to be arranged in a vertical direction of the screen, and surrounded by the frame to indicate an issue that the plurality of predetermined processes have been received.

3. The information processing system according to claim 1, wherein
the display process unit causes the screen to display while arranging the plurality of processes into partitions arranged in the execution order along a lateral direction of the screen, and
the first predetermined process and the second predetermined process are arranged in one of the partitions to indicate that the plurality of predetermined processes have been received.

4. The information processing system according to claim 1, wherein
in response to a selection of a second process that is already arranged after receiving the selection of the first process set to the process flow, the setup reception unit receives a setup of the second process in an execution order that is the same as the execution order of the first process in the process flow.

5. The information processing system according to claim 1, wherein
in response to a selection of a second process that is already arranged after receiving the selection of the first process set to the process flow, process contents of the selected first and second processes are compared to determine whether the process contents resemble each other, wherein
in a case where it is determined that the process contents of the selected first process resemble the process contents of the selected second process
an execution order of the selected second process and an execution order of the selected first process are determined to be associated so as to be in a same execution order in the process flow, and
the setup reception unit receives a setup of the selected second process in the same execution order as the execution order of the selected first process in the process flow.

6. The information processing system according to claim 1, wherein
the setup reception unit receives the setup of an application using the process flow, and the setup reception unit receives the setup of the predetermined process executed by the process flow from among the predetermined processes included in the process flow used for the application.

7. The information processing system according to claim 6, wherein the circuitry including the setup reception unit further includes
a transmitting unit configured to transmit information related to the predetermined process executed by the process flow received by the setup reception unit, and wherein
the process flow execution unit executes the process flow in the execution order in a case where the execution request of the application is received from the apparatus through the network, the process flow is executed in the execution order, and
the predetermined process, which is set to be executed by the process flow, is executed and the predetermined process, which is not set to be executed by the process flow, is not executed.

8. The information processing system according to claim 6, wherein
the application is distinguished from a shared application used by a plurality of users and an individual application used by an individual user,
the display process unit displays a setup field of user account information using the predetermined process executed in the process flow when the setup reception unit receives the setup of the predetermined process executed by the process flow for the shared application, and
the setup reception unit receives the setup of the account information.

9. The information processing system according to claim 6, wherein
in a case where the setup reception unit receives a setup of the predetermined process executed in the process flow from among the plurality of predetermined processes included in the process flow used in the application, the display process unit displays an item that can be set by the predetermined process that receives the setup, and the setup reception unit receives the setup of the item.

10. The information processing system according to claim 6, the information processing system further comprises
an apparatus configured to communicate through the network,
wherein the apparatus includes circuitry that performs the function of
a receiving unit configured to receive information related to the application,
a setup reception unit configured to receive a setup of the predetermined process executed in the process flow from among the plurality of predetermined processes included in the process flow used for the application, and
a transmitting unit configured to transmit information on the predetermined process executed in the process flow accepted by the setup reception unit and an application execution request for executing the application to the service providing system.

11. A service providing system that communicates with an information processing circuitry through a network, the information processing circuitry receiving a setup, in which a first predetermined process related to a first external service and a second predetermined process related to a second external service are associated, in a setup of a process flow that defines an execution order a plurality of processes are executed by the service providing system, the service providing system comprising circuitry that performs the function of:
- a screen information transmission unit configured to transmit, to the information processing circuitry, screen information for causing a display device to display the plurality of processes in the execution order and display an issue that the first predetermined process and the second predetermined process in association with each other have been received, the first predetermined process and the second predetermined process being executed at a same sequence in the execution order of the process flow, whereby execution of one of the first and second predetermined processes excludes execution of the other of the first and second processes; and
- a process flow execution unit configured to execute the plurality of processes included in the process flow transmitted from the information processing circuitry in the execution order that is defined, wherein
  - the information processing circuitry displays, on a screen of a display device the process flow defining the execution order of the plurality of processes executed by the service providing system, the process flow being displayed such that
    - the plurality of processes in the process flow is arranged along a lateral direction of the screen based on the execution order of the plurality of processes,
    - the first predetermined process and the second predetermined process are arranged in a vertical direction of the screen based on the execution at the same sequence in the execution order of the process flow and to indicate the issue that the first predetermined process and the second predetermined process are set in association with each other, and
    - a frame surrounds the first predetermined process and the second predetermined process to indicate that the first predetermined process and the second predetermined process form a component group.

12. A method performed by an information processing system, in which an information processing circuitry and a service providing system communicate through a network, the method comprising:

- displaying, by the information processing circuitry, a screen on a display device that receives a setup of a process flow that defines an execution order of executing a plurality of processes executed by the service providing system;
- receiving, by the information processing circuitry, a setup associating a first predetermined process related to a first external service and a second predetermined process related to a second external service on the screen displayed in the step of displaying;
- displaying, by the information processing circuitry, on the screen of the display device the plurality of processes in the execution order, and displaying an issue that the first predetermined process and the second predetermined process are received in association with each other, the first predetermined process and the second predetermined process being executed at a same sequence in the execution order of the process flow, whereby execution of one of the first and second predetermined processes excludes execution of the other of the first and second processes;
- displaying, by the information processing circuitry, on the screen of the display device
  - the plurality of processes in the process flow arranged along a lateral direction of the screen based on the execution order of the plurality of processes, and
  - the first predetermined process and the second predetermined process arranged in a vertical direction of the screen based on the execution at the same sequence in the execution order of the process flow and to indicate the issue that the first predetermined process and the second predetermined process are set in association with each other;
- a frame surrounding the first predetermined process and the second predetermined process to indicate that the first predetermined process and the second predetermined process form a component group; and
- executing, by the service providing system, the plurality of processes included in the process flow transmitted from the information processing circuitry in the defined execution order.

\* \* \* \* \*